(12) United States Patent  
Yu et al.

(10) Patent No.: US 12,495,282 B2
(45) Date of Patent: Dec. 9, 2025

(54) COMMUNICATION METHOD AND APPARATUS

(71) Applicant: HUAWEI TECHNOLOGIES CO., LTD., Shenzhen (CN)

(72) Inventors: Haifeng Yu, Beijing (CN); Bingzhao Li, Beijing (CN); Zhenzhen Cao, Boulogne Billancourt (FR)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 364 days.

(21) Appl. No.: 18/295,327

(22) Filed: Apr. 4, 2023

(65) Prior Publication Data
US 2023/0247401 A1 Aug. 3, 2023

Related U.S. Application Data

(63) Continuation of application No. PCT/CN2020/120247, filed on Oct. 10, 2020.

(51) Int. Cl.
| H04W 68/00 | (2009.01) |
| H04W 4/50 | (2018.01) |
| H04W 8/22 | (2009.01) |
| H04W 72/20 | (2023.01) |
| H04W 72/54 | (2023.01) |

(52) U.S. Cl.
CPC ............ *H04W 4/50* (2018.02); *H04W 8/22* (2013.01); *H04W 68/005* (2013.01); *H04W 72/20* (2023.01); *H04W 72/54* (2023.01)

(58) Field of Classification Search
CPC ... H04W 68/00; H04W 68/005; H04W 72/54; H04W 8/22; H04W 72/20; H04W 4/50
See application file for complete search history.

(56) References Cited

U.S. PATENT DOCUMENTS 9,820,259 B2 * 11/2017 Wang .................. H04L 12/189
2018/0199163 A1 * 7/2018 Chen .................... H04W 48/14

FOREIGN PATENT DOCUMENTS

| CN | 102547592 A | 7/2012 |
| CN | 108476142 A | 8/2018 |
| CN | 108781479 A | 11/2018 |

(Continued)

OTHER PUBLICATIONS

Qualcomm Inc., "NR Multicast dynamic PTM PTP switch with service continuity", 3GPP Draft; R2-2006794,Aug. 7, 2020, XP052359915, 5 pages.

(Continued)

*Primary Examiner* — Tuan H Nguyen
(74) *Attorney, Agent, or Firm* — Maier & Maier, PLLC

(57) ABSTRACT

A communication method and apparatus, so that a terminal device can flexibly determine, based on at least one of an identifier of a multicast service, a probability of each multicast configuration information obtaining manner, level information of the terminal device, indication information of an obtaining manner of multicast configuration information, information used to indicate that data of the multicast service is to be sent, or signal quality information, a manner for obtaining multicast configuration information of each multicast service, instead of obtaining configuration information of different multicast services in a fixed manner.

20 Claims, 16 Drawing Sheets

(56) References Cited

FOREIGN PATENT DOCUMENTS

CN    109644480 A    4/2019
WO    2019223780 A1    11/2019

OTHER PUBLICATIONS

CMCC., "Discussion on group scheduling mechanisms in NR MBS", 3GPP Draft; R1-2006233, Aug. 7, 2020, XP052347607, 9 pages.
3GPP TS 23.401 V16.8.0: "3rd Generation Partnership Project; Technical Specification Group Services and System Aspects; General Packet Radio Service (GPRS) enhancements for Evolved Universal Terrestrial Radio Access Network (E-UTRAN) access (Release 16)", Sep. 2020, 440 pages.
3GPP TS 36.304 V16.2.0: "3rd Generation Partnership Project; Technical Specification Group Radio Access Network; Evolved Universal Terrestrial Radio Access (E-UTRA); User Equipment (UE) procedures in idle mode (Release 16)", Sep. 2020, 64 pages.
3GPP TS 36.331 V16.2.1: "3rd Generation Partnership Project; Technical Specification Group Radio Access Network; Evolved Universal Terrestrial Radio Access (E-UTRA); Radio Resource Control (RRC); Protocol specification (Release 16)", Sep. 2020, 1081 pages.
3GPP TS 38.304 V16.2.0: "3rd Generation Partnership Project; Technical Specification Group Radio Access Network; NR; User Equipment (UE) procedures in Idle mode and RRC Inactive state (Release 16)", Sep. 2020, 39 pages.
3GPP TS 38.321 V16.2.1: "3rd Generation Partnership Project; Technical Specification Group Radio Access Network; NR; Medium Access Control (MAC) protocol specification (Release 16)", Sep. 2020, 154 pages.

* cited by examiner

COMMUNICATION METHOD AND APPARATUS

CROSS-REFERENCE TO RELATED APPLICATIONS

This application is a continuation of International Application No. PCT/CN2020/120247, filed on Oct. 10, 2020, the disclosure of which is hereby incorporated by reference in its entirety.

TECHNICAL FIELD

The embodiments relate to the field of wireless communication technologies, and a communication method and apparatus.

BACKGROUND

In a wireless communication system, a multicast transmission technology is a transmission technology in which one sender sends data and a plurality of receivers receive the data. For example, a network device sends data, and a plurality of terminal devices receive the data. A possible multicast transmission technology is a single-cell point-to-multipoint (SC-PTM) technology.

When the multicast transmission technology (for example, the SC-PTM technology) is used to transmit a multicast service, the terminal device needs to first obtain multicast configuration information, and then receive the multicast service based on the multicast configuration information.

However, in the conventional technology, a manner in which the terminal device obtains the multicast configuration information is not flexible enough, and further research is still required.

SUMMARY

The embodiments may provide a communication method and apparatus, to more flexibly obtain multicast configuration information.

According to a first aspect, a communication method is provided. The method may be performed by a first communication apparatus. The first communication apparatus may be a communication device or a communication apparatus, for example, a chip that can support the communication device in implementing a function required in the method. For example, the first communication apparatus is a terminal device, a chip that is disposed in the terminal device and that is configured to implement a function of the terminal device, or another component configured to implement a function of the terminal device. In the following description process, an example in which the first communication apparatus is the terminal device is used for description.

The method includes: The terminal device may obtain first information, and determine a target obtaining manner based on the first information. The target obtaining manner is used to obtain multicast configuration information, the multicast configuration information is used to receive a multicast service, and the first information includes at least one of an identifier of the multicast service (or briefly referred to as an identifier), probabilities corresponding to different obtaining manners, level information of the terminal device, indication information of the target obtaining manner, information used to indicate that data of the multicast service is to be sent, or signal quality information. The terminal device may further obtain the multicast configuration information in the target obtaining manner. The target obtaining manner includes one of a first manner, a second manner, a third manner, a fourth manner, a fifth manner, a sixth manner, or a seventh manner.

The first manner is obtaining the multicast configuration information by using unicast information or obtaining the multicast configuration information by receiving unicast information. The second manner includes obtaining the multicast configuration information by using multicast information, or obtaining the multicast configuration information by receiving multicast information. The third manner includes obtaining the multicast configuration information by using broadcast information, or obtaining the multicast configuration information by receiving broadcast information. The fourth manner includes obtaining the multicast configuration information in two sub-manners: using unicast information and using multicast information, or referred to as obtaining the multicast configuration information in two sub-manners: receiving unicast information and receiving multicast information. The fifth manner includes obtaining the multicast configuration information in two sub-manners: using multicast information and using broadcast information, or referred to as obtaining the multicast configuration information in two sub-manners: receiving multicast information and receiving broadcast information. The sixth manner includes obtaining the multicast configuration information in two sub-manners: using unicast information and using broadcast information, or obtaining the multicast configuration information in two sub-manners: receiving unicast information and receiving broadcast information. The seventh manner includes obtaining the multicast configuration information in three sub-manners: using unicast information, using multicast information, and using broadcast information, or referred to as obtaining the multicast configuration information in three sub-manners: receiving unicast information, receiving multicast information, and receiving broadcast information.

According to the foregoing method, the terminal device can flexibly determine, based on at least one of the identifier of the multicast service, a probability of each obtaining manner, the level information of the terminal device, the indication information of the target obtaining manner, the information used to indicate that the data of the multicast service is to be sent, or the signal quality information, a manner for obtaining multicast configuration information of each multicast service, instead of obtaining configuration information of different multicast services in a fixed manner.

The first information may include the identifier of the multicast service and the level information, and the terminal device may determine that obtaining manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target obtaining manner from the eighth manner and the ninth manner based on the level information. Therefore, flexible obtaining of the multicast configuration information can be further implemented.

The first information may include the identifier of the multicast service, a probability of an eighth manner, and a probability of a ninth manner, and the terminal device may determine that obtaining manners corresponding to the identifier include the eighth manner and the ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target obtaining manner from the eighth manner and the ninth manner based on the probability of the eighth manner and the probability of the ninth manner. Therefore, flexible obtaining of the multicast configuration information can be further implemented.

The first information may include the identifier of the multicast service and the signal quality information, and the terminal device may determine that obtaining manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target obtaining manner from the eighth manner and the ninth manner based on the signal quality information. Therefore, flexible obtaining of the multicast configuration information can be further implemented.

The terminal device may obtain, based on a first correspondence, the target obtaining manner corresponding to the multicast identifier, where the first correspondence includes a correspondence between at least one multicast service identifier and at least one multicast configuration information obtaining manner, the identifier is in the at least one multicast service identifier, and the target obtaining manner is in the at least one multicast configuration information obtaining manner.

The terminal device may receive the first correspondence and/or the identifier of the multicast service from a network device.

The first correspondence may be carried in a system information block (SIB), a multicast control channel (MCCH), a PDSCH message for paging, or a NAS message. The PDSCH for paging is alternatively referred to as a physical resource indicated by scheduling information (for example, DCI) of a paging message. That the first information is carried on the PDSCH for paging includes that the first correspondence is carried in the paging message or includes that the first correspondence carried on the PDSCH but the first correspondence is not carried in the paging message.

The terminal device may receive third information from the network device, where the third information indicates the indication information. Therefore, the multicast configuration information may be flexibly obtained based on the third information from the network device.

The third information may further indicate the identifier of the multicast service.

The third information may be carried in first downlink control information from the network device, and the first downlink control information may be used to schedule a paging message; or the third information may be carried in a paging message from the network device.

The first information may include the information used to indicate that the data of the multicast service is to be sent (or referred to as information indicating start of the multicast service), and the terminal device may determine, based on a second correspondence, the target obtaining manner corresponding to a first time-frequency resource, where first downlink control information is transmitted by using the first time-frequency resource, the second correspondence is a correspondence between at least one time-frequency resource and at least one multicast configuration information obtaining manner, the first time-frequency resource is in the at least one time-frequency resource, and the target obtaining manner is in the at least one multicast configuration information obtaining manner; or determine, based on a third correspondence, the target obtaining manner corresponding to a first RNTI, where the first RNTI is an RNTI used to scramble first downlink control information, the third correspondence is a correspondence between at least one RNTI and at least one multicast configuration information obtaining manner, the first RNTI is in the at least one RNTI, and the target obtaining manner is in the at least one multicast configuration information obtaining manner. The first downlink control information is used to schedule a paging message, and the paging message includes the information used to indicate that the data of the multicast service is to be sent. Therefore, the multicast configuration information may be flexibly obtained based on the paging message from the network device and/or the first downlink control information used to schedule the paging message.

When the target obtaining manner includes the fourth manner, the fifth manner, the sixth manner, or the seventh manner, different pieces of configuration information obtained in sub-manners of the target obtaining manner may be different in at least one item. A configuration obtained in a sub-manner of each obtaining manner includes at least one of a G-RNTI, the identifier of the multicast service, a PDCP layer configuration parameter, an RLC layer configuration parameter, a logical channel set corresponding to the identifier of the multicast service, a first identifier, a PUCCH configuration, a PDCP status report configuration, a BWP configuration, and a DAPS configuration. The first identifier is used to associate different pieces of multicast configuration information separately obtained in different sub-manners of the target obtaining manner. This may enrich content of the multicast configuration information.

Configuration information obtained in each sub-manner of the target obtaining manner may include the first identifier.

The terminal device may determine that the terminal device is in an RRC idle mode or an RRC inactive mode. Therefore, a success rate of obtaining the multicast configuration information by the terminal device in the RRC idle mode or the RRC inactive mode can be improved.

The terminal device may further receive information used to indicate modification of the multicast configuration information; obtain modified multicast configuration information of the multicast service; and receive the multicast service based on the modified multicast configuration information.

The terminal device may determine an obtaining manner of the modified multicast configuration information based on fourth information or fifth information, where the fourth information includes the first information; and the fifth information includes information from the network device. Therefore, the terminal device may flexibly receive the modified multicast configuration information.

According to a second aspect, a communication method is provided. The method may be performed by a second communication apparatus. The second communication apparatus may be a communication device or a communication apparatus, for example, a chip that can support the communication device in implementing a function required in the method. For example, the second communication apparatus is a network device (for example, a base station), a chip that is disposed in the network device and that is configured to implement a function of the network device, or another component configured to implement a function of the network device. In the following description process, an example in which the second communication apparatus is the network device is used for description.

The method includes: The network device obtains first information, determines a target sending manner based on the first information, and sends multicast configuration information in the target sending manner. The network device sends a multicast service based on the multicast configuration information. A terminal device receives the multicast service based on the multicast configuration information (that is, the multicast configuration information is used by the terminal device to receive the multicast service). The first information includes at least one of an identifier of the multicast service, level information of the terminal device, indication information of the target sending manner, information used to indicate that data of the multicast service is to be sent, or signal quality information. The target sending manner includes at least one of a first manner, a second manner, a third manner, a fourth manner, a fifth manner, a sixth manner, or a seventh manner.

The first manner includes sending the multicast configuration information by using unicast information. The second manner includes sending the multicast configuration information by using multicast information. The third manner includes sending the multicast configuration information by using broadcast information. The fourth manner includes sending the multicast configuration information in two sub-manners: using unicast information and using multicast information. The fifth manner includes sending the multicast configuration information in two sub-manners: using multicast information and using broadcast information. The sixth manner includes sending the multicast configuration information in two sub-manners: using unicast information and using broadcast information. The seventh manner includes sending the multicast configuration information in three sub-manners: using unicast information, using multicast information, and using broadcast information.

The first information may include the identifier of the multicast service and the level information, and the network device may determine that sending manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target sending manner from the eighth manner and the ninth manner based on the level information.

The first information may include the identifier of the multicast service and the signal quality information, and the network device may determine that sending manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target sending manner from the eighth manner and the ninth manner based on the signal quality information.

The first information may include the identifier of the multicast service, and the network device may obtain, based on a first correspondence, the target sending manner corresponding to the identifier, where the first correspondence includes a correspondence between at least one multicast service identifier and at least one multicast configuration information sending manner, the identifier is in the at least one multicast service identifier, and the target sending manner is in the at least one multicast configuration information sending manner.

The network device may send the first correspondence and/or the identifier of the multicast service.

The first correspondence may be carried in a SIB, an MCCH, a PDSCH for paging, or a NAS message.

The network device may further send third information and the third information may include the indication information.

The third information may further include the identifier of the multicast service.

The third information may be carried in first downlink control information and the first downlink control information may be used to schedule a paging message; or the third information may be carried in a paging message.

The network device may determine, based on a second correspondence, first downlink control information corresponding to the target sending manner, and send the first downlink control information by using a first time-frequency resource. The second correspondence is a correspondence between at least one time-frequency resource and at least one multicast configuration information sending manner, the first time-frequency resource is in the at least one time-frequency resource, and the target sending manner is in the at least one multicast configuration information sending manner. Alternatively, the network device may determine, based on a third correspondence, a first RNTI corresponding to the target sending manner, and send first downlink control information scrambled by using the first RNTI, where the third correspondence is a correspondence between at least one RNTI and at least one multicast configuration information sending manner, the first RNTI is in the at least one RNTI, and the target sending manner is in the at least one multicast configuration information sending manner. The first downlink control information is used to schedule a paging message, and the paging message includes the information used to indicate that the data of the multicast service is to be sent.

When the target sending manner includes the fourth manner, the fifth manner, the sixth manner, or the seventh manner, different pieces of configuration information sent in sub-manners of the target sending manner may be different in at least one item. A configuration sent in a sub-manner of each sending manner includes at least one of a G-RNTI, the identifier of the multicast service, a PDCP layer configuration parameter, an RLC layer configuration parameter, a logical channel set corresponding to the identifier of the multicast service, a first identifier, a PUCCH configuration, a PDCP status report configuration, a BWP configuration, and a DAPS configuration. The first identifier is used to associate different pieces of multicast configuration information separately sent in different sub-manners of the target sending manner.

Multicast configuration information sent in each sub-manner of the target sending manner may include the first identifier.

The network device may send information used to indicate modification of the multicast configuration information and may send modified multicast configuration information of the multicast service.

The network device may determine a sending manner of the modified multicast configuration information based on fourth information or fifth information, where the fourth information includes the first information.

The network device may send fifth information, where the fifth information is used to indicate an obtaining manner of the modified multicast configuration information.

For beneficial effects of the method shown in the second aspect, refer to the beneficial effects in the first aspect.

According to a third aspect, a communication apparatus is provided. For example, the communication apparatus is the first communication apparatus shown above. The first communication apparatus is configured to perform the method according to any one of the first aspect or the possible implementations of the first aspect. The first communication apparatus may include modules configured to perform the method according to any one of the first aspect or the possible implementations of the first aspect. For example, the first communication apparatus includes a processing module and a transceiver module. For example, the transceiver module may include a sending module and a receiving module. The sending module and the receiving module may be different function modules or may be a same function module that can implement different functions. For example, the first communication apparatus is a communication device, or a chip or another component disposed in the communication device. For example, the communication device is a terminal device. The following uses an example in which the first communication apparatus is the terminal device. For example, the transceiver module may be implemented by using a transceiver, and the processing module may be implemented by using a processor. Alternatively, the sending module may be implemented by using a transmitter, and the receiving module may be implemented by using a receiver. If the first communication apparatus is a communication device, the transceiver may be implemented by using an antenna, a feeder, a codec, and the like in the communication device. Alternatively, if the first communication apparatus is a chip disposed in the communication device, the transceiver (or the transmitter and the receiver) may be a communication interface in the chip. The communication interface is connected to a radio frequency transceiver component in the communication device, to implement information receiving and sending through the radio frequency transceiver component. In the description process of the third aspect, an example in which the first communication apparatus is a terminal device and includes the processing module and the transceiver module is still used for description.

When performing the method shown in the first aspect, the processing module may obtain first information, and determine a target obtaining manner based on the first information. The target obtaining manner is used to obtain multicast configuration information, the multicast configuration information is used to receive a multicast service, and the first information includes at least one of an identifier of the multicast service, probabilities corresponding to different obtaining manners, level information of the terminal device, indication information of the target obtaining manner, information used to indicate that data of the multicast service is to be sent, or signal quality information. The transceiver module may obtain the multicast configuration information in the target obtaining manner. The target obtaining manner includes one of a first manner, a second manner, a third manner, a fourth manner, a fifth manner, a sixth manner, or a seventh manner.

The first manner includes obtaining the multicast configuration information by receiving unicast information. The second manner includes obtaining the multicast configuration information by receiving multicast information. The third manner includes obtaining the multicast configuration information by receiving broadcast information. The fourth manner includes obtaining the multicast configuration information in two sub-manners: receiving unicast information and receiving multicast information. The fifth manner includes obtaining the multicast configuration information in two sub-manners: receiving multicast information and receiving broadcast information. The sixth manner includes obtaining the multicast configuration information in two sub-manners: receiving unicast information and receiving broadcast information. The seventh manner includes obtaining the multicast configuration information in three sub-manners: receiving unicast information, receiving multicast information, and receiving broadcast information.

The first information may include the identifier of the multicast service and the level information, and the processing module may determine that obtaining manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target obtaining manner from the eighth manner and the ninth manner based on the level information.

The first information may include the identifier of the multicast service, a probability of an eighth manner, and a probability of a ninth manner, and the processing module may determine that obtaining manners corresponding to the identifier include the eighth manner and the ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target obtaining manner from the eighth manner and the ninth manner based on the probability of the eighth manner and the probability of the ninth manner.

The first information may include the identifier of the multicast service and the signal quality information, and the processing module may determine that obtaining manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target obtaining manner from the eighth manner and the ninth manner based on the signal quality information.

The terminal device may obtain, based on a first correspondence, the target obtaining manner corresponding to the identifier, where the first correspondence includes a correspondence between at least one multicast service identifier and at least one multicast configuration information obtaining manner, the identifier is in the at least one multicast service identifier, and the target obtaining manner is in the at least one multicast configuration information obtaining manner.

The transceiver module may receive the first correspondence and/or the identifier of the multicast service from a network device.

The first correspondence may be carried in a system information block (SIB), a multicast control channel (MCCH), a PDSCH message for paging, or a NAS message.

The transceiver module may receive third information from the network device, where the third information includes the indication information of the target obtaining manner.

The third information may further indicate the identifier of the multicast service.

The third information may be carried in first downlink control information from the network device, and the first downlink control information may be used to schedule a paging message; or the third information may be carried in a paging message from the network device.

The first information may include the information used to indicate that the data of the multicast service is to be sent, and the processing module may determine, based on a second correspondence, the target obtaining manner corresponding to a first time-frequency resource, where first downlink control information is transmitted by using the first time-frequency resource, the second correspondence is a correspondence between at least one time-frequency resource and at least one multicast configuration information obtaining manner, the first time-frequency resource is in the at least one time-frequency resource, and the target obtaining manner is in the at least one multicast configuration information obtaining manner; or determine, based on a third correspondence, the target obtaining manner corresponding to a first RNTI, where the first RNTI is an RNTI used to scramble first downlink control information, the third correspondence is a correspondence between at least one RNTI and at least one multicast configuration information obtaining manner, the first RNTI is in the at least one RNTI, and the target obtaining manner is in the at least one multicast configuration information obtaining manner. The first downlink control information is used to schedule a paging message, and the paging message includes the information used to indicate that the data of the multicast service is to be sent.

When the target obtaining manner includes the fourth manner, the fifth manner, the sixth manner, or the seventh manner, different pieces of configuration information obtained in sub-manners of the target obtaining manner may be different in at least one item. A configuration obtained in a sub-manner of each obtaining manner includes at least one of a G-RNTI, the identifier of the multicast service, a PDCP layer configuration parameter, an RLC layer configuration parameter, a logical channel set corresponding to the identifier of the multicast service, a first identifier, a PUCCH configuration, a PDCP status report configuration, a BWP configuration, and a DAPS configuration. The first identifier is used to associate different pieces of multicast configuration information separately obtained in different sub-manners of the target obtaining manner.

Configuration information content of different multicast services may be differentiated to meet requirements of different multicast services. In addition, a configuration is sent through broadcast/multicast, so that a plurality of UEs can receive the configuration at a time. This reduces signaling overheads and provides flexibility of a sending manner. In addition, the first identifier is used to associate same multicast configuration information. After receiving a multicast configuration in broadcast/multicast information, UE may learn, by using the first identifier, whether there is a remaining configuration, to determine whether to further receive a unicast configuration. This avoids power consumption and signaling overheads caused by performing an unnecessary operation by the UE (for example, UE in an idle mode or an inactive mode may trigger random access). In addition, the first identifier can avoid confusion of the UE and a base station in understanding the same multicast configuration information.

Configuration information obtained in each sub-manner of the target obtaining manner may include the first identifier.

The processing module may determine that the terminal device is in an RRC idle mode or an RRC inactive mode.

The transceiver module may further receive information used to indicate modification of the multicast configuration information; obtain modified multicast configuration information of the multicast service; and receive the multicast service based on the modified multicast configuration information.

The processing module may determine an obtaining manner of the modified multicast configuration information based on fourth information or fifth information, where the fourth information includes the first information; and the fifth information includes information from the network device.

For beneficial effects of the method shown in the third aspect and the possible designs of the third aspect, refer to the beneficial effects in the first aspect and the possible designs of the first aspect.

According to a fourth aspect, a communication apparatus is provided. For example, the communication apparatus is the second communication apparatus shown above. The second communication apparatus is configured to perform the method according to any one of the second aspect or the possible implementations of the second aspect. The second communication apparatus may include modules configured to perform the method according to any one of the second aspect or the possible implementations of the second aspect. For example, the second communication apparatus includes a processing module and a transceiver module. For example, the transceiver module may include a sending module and a receiving module. The sending module and the receiving module may be different function modules or may be a same function module that can implement different functions. For example, the second communication apparatus is a communication device, or a chip or another component disposed in the communication device. For example, the communication device is a network device. The following uses an example in which the second communication apparatus is the network device. For example, the transceiver module may be implemented by using a transceiver, and the processing module may be implemented by using a processor. Alternatively, the sending module may be implemented by using a transmitter, and the receiving module may be implemented by using a receiver. If the second communication apparatus is a communication device, the transceiver may be implemented by using an antenna, a feeder, a codec, and the like in the communication device. Alternatively, if the second communication apparatus is a chip disposed in the communication device, the transceiver (or the transmitter and the receiver) may be a communication interface in the chip. The communication interface is connected to a radio frequency transceiver component in the communication device, to implement information receiving and sending through the radio frequency transceiver component. In the description process of the fourth aspect, an example in which the second communication apparatus is a network device and includes the processing module and the transceiver module is still used for description.

When performing the method shown in the second aspect, the processing module may obtain first information, and determine a target sending manner based on the first information. The transceiver module may send multicast configuration information in the target sending manner. The multicast configuration information is used by a terminal device to receive a multicast service. The first information includes at least one of an identifier of the multicast service, level information of the terminal device, indication information of the target sending manner, information used to indicate that data of the multicast service is to be sent, or signal quality information. The target sending manner includes at least one of a first manner, a second manner, a third manner, a fourth manner, a fifth manner, a sixth manner, or a seventh manner.

The first manner includes sending the multicast configuration information by using unicast information. The second manner includes sending the multicast configuration information by using multicast information. The third manner includes sending the multicast configuration information by using broadcast information. The fourth manner includes sending the multicast configuration information in two sub-manners: using unicast information and using multicast information. The fifth manner includes sending the multicast configuration information in two sub-manners: using multicast information and using broadcast information. The sixth manner includes sending the multicast configuration information in two sub-manners: using unicast information and using broadcast information. The seventh manner includes sending the multicast configuration information in three sub-manners: using unicast information, using multicast information, and using broadcast information.

The first information may include the identifier of the multicast service and the level information, and the processing module may determine that sending manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target sending manner from the eighth manner and the ninth manner based on the level information.

The first information may include the identifier of the multicast service and the signal quality information, and the processing module may determine that sending manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target sending manner from the eighth manner and the ninth manner based on the signal quality information.

The first information may include the identifier of the multicast service, and the processing module may obtain, based on a first correspondence, the target sending manner corresponding to the identifier, where the first correspondence includes a correspondence between at least one multicast service identifier and at least one multicast configuration information sending manner, the identifier is in the at least one multicast service identifier, and the target sending manner is in the at least one multicast configuration information sending manner.

The transceiver module may send the first correspondence and/or the identifier of the multicast service.

The first correspondence may be carried in a SIB, an MCCH, a PDSCH for paging, or a NAS message.

The transceiver module may further send third information, where the third information includes the indication information of the target sending manner.

The third information may further indicate the identifier of the multicast service.

The third information may be carried in first downlink control information, and the first downlink control information may be used to schedule a paging message; or the third information may be carried in a paging message.

The processing module may determine, based on a second correspondence, first downlink control information corresponding to the target sending manner, and the transceiver module may send the first downlink control information by using a first time-frequency resource. The second correspondence is a correspondence between at least one time-frequency resource and at least one multicast configuration information sending manner, the first time-frequency resource is in the at least one time-frequency resource, and the target sending manner is in the at least one multicast configuration information sending manner. Alternatively, the processing module may determine, based on a third correspondence, a first RNTI corresponding to the target sending manner, and the transceiver module may send first downlink control information scrambled by using the first RNTI, where the third correspondence is a correspondence between at least one RNTI and at least one multicast configuration information sending manner, the first RNTI is in the at least one RNTI, and the target sending manner is in the at least one multicast configuration information sending manner. The first downlink control information is used to schedule a paging message, and the paging message includes the information used to indicate that the data of the multicast service is to be sent.

When the target sending manner includes the fourth manner, the fifth manner, the sixth manner, or the seventh manner, different pieces of configuration information sent in sub-manners of the target sending manner may be different in at least one item. A configuration sent in a sub-manner of each sending manner includes at least one of a G-RNTI, the identifier of the multicast service, a PDCP layer configuration parameter, an RLC layer configuration parameter, a logical channel set corresponding to the identifier of the multicast service, a first identifier, a PUCCH configuration, a PDCP status report configuration, a BWP configuration, and a DAPS configuration. The first identifier is used to associate different pieces of multicast configuration information separately sent in different sub-manners of the target sending manner.

Multicast configuration information sent in each sub-manner of the target sending manner may include the first identifier.

The transceiver module may send information used to indicate modification of the multicast configuration information and may send modified multicast configuration information of the multicast service.

The processing module may determine a sending manner of the modified multicast configuration information based on fourth information or fifth information, where the fourth information includes the first information.

The transceiver module may send fifth information, where the fifth information is used to indicate an obtaining manner of the modified multicast configuration information.

For beneficial effects of the method shown in the fourth, refer to the beneficial effects in the first aspect.

According to a fifth aspect, a communication system is provided. The communication system includes the communication apparatuses shown in the third aspect and the fourth aspect.

According to a sixth aspect, a non-transitory computer-readable storage medium is provided. The non-transitory computer-readable storage medium is configured to store computer instructions, and when the computer instructions are run on a computer, the computer is enabled to perform the method according to any one of the first aspect, the second aspect, or the possible implementations of the first aspect or the second aspect.

According to a seventh aspect, a computer program product including instructions is provided. The computer program product is configured to store computer instructions, and when the computer instructions are run on a computer, the computer is enabled to perform the method according to any one of the first aspect, the second aspect, or the possible implementations of the first aspect or the second aspect.

According to an eighth aspect, a circuit is provided. The circuit is coupled to a memory, and the circuit is configured to perform the method according to any one of the first aspect, the second aspect, or the possible implementations of the first aspect or the second aspect. The circuit may include a chip circuit.

DETAILED DESCRIPTION OF THE EMBODIMENTS

To following describes the embodiments in detail with reference to the accompanying drawings. Operation methods, function descriptions, and the like in method embodiments may also be applied to apparatus embodiments or system embodiments.

Figure 1:
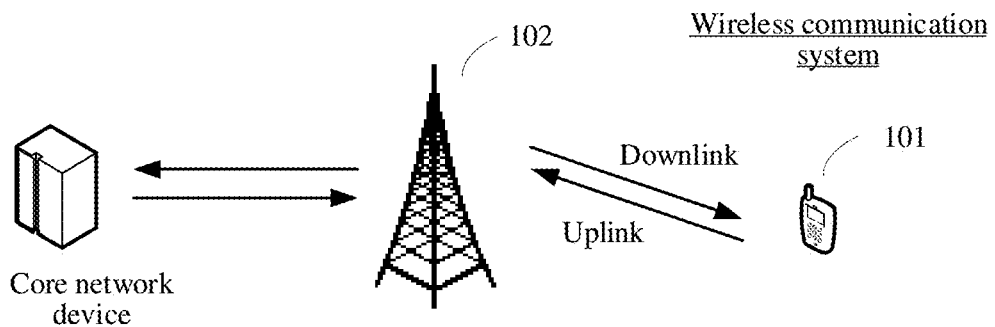
FIG. 1 is a schematic diagram of an architecture of a communication system according to an embodiment.

As shown in FIG. 1, a communication method provided in the embodiments may be applied to a wireless communication system, and the wireless communication system may include a terminal device 101 and a network device 102.

It should be understood that the wireless communication system is applicable to both a low-band scenario (sub 6G) and a high-band scenario (above 6G). An application scenario of the wireless communication system includes, but is not limited to, an existing communication system such as a 5th generation (5G) system or a new radio (NR) communication system, a future evolved public land mobile network (PLMN) system, or the like.

The terminal device 101 shown above may be user equipment (UE), a terminal, an access terminal, a terminal unit, a terminal station, a mobile station (MS), a remote station, a remote terminal, a mobile terminal, a wireless communication device, a terminal agent, a terminal device, or the like. The terminal device 101 may alternatively be a communication chip having a communication module, or may be a vehicle having a communication function, a vehicle-mounted device (for example, a vehicle-mounted communication apparatus or a vehicle-mounted communication chip), or the like. The terminal device 101 may have wireless sending and receiving functions, and can perform communication (for example, wireless communication) with one or more network devices in one or more communication systems, and accept a network service provided by the network device. The network device herein includes, but is not limited to, the network device 102 shown in the figure.

The terminal device 101 may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, a terminal apparatus in a future 5G network, a terminal apparatus in a future evolved PLMN, or the like.

The terminal device 101 may be a mobile phone, a tablet computer (pad), a computer having wireless sending and receiving functions, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like.

In addition, the terminal device 101 may be deployed on land, and include an indoor terminal device, an outdoor terminal device, a handheld terminal device, or a vehicle-mounted terminal device; or the terminal device 101 may be deployed on a water surface (for example, on a ship); or the terminal device 101 may be deployed in the air (for example, on an aircraft, a balloon, or a satellite). The network device 102 may be an access network device (or referred to as an access network site). The access network device is a device that provides a network access function, for example, a radio access network (RAN) base station. The network device 102 may include a base station (BS), or include a base station, a radio resource management device configured to control the base station, and the like. The network device 102 may alternatively include a relay node, an access point, a base station or an NR base station in a 5G network, a base station in a future evolved PLMN, or the like. The network device 102 may be a wearable device or a vehicle-mounted device. Alternatively, the network device 102 may be a communication chip having a communication module.

For example, the network device 102 includes, but is not limited to: a gNodeB (gNB) in 5G, an evolved NodeB (eNB) in a long term evolution (LTE) system, a radio network controller (RNC), a radio controller in a cloud radio access network (CRAN) system, a base station controller (BSC), a home base station (HNB), a baseband unit (BBU), a transmitting and receiving point (TRP), a transmitting point (TP), a mobile switching center, a base transceiver station (BTS) in a global system for mobile communications (GSM) or code division multiple access (CDMA) network, a node base station (NB) in wideband code division multiple access (WCDMA), an evolved NB (eNB) in LTE, a base station device in a future 5G network, an access network device in a future evolved PLMN, a wearable device, or a vehicle-mounted device.

In some deployments, the network device may include a centralized unit (centralized unit, CU) and a distributed unit (DU). The network device may further include an active antenna unit (AAU). The CU implements some functions of the network device, and the DU implements some functions of the network device. For example, the CU is responsible for processing a non-real-time protocol and service, and implements functions of a radio resource control (RRC) layer and a packet data convergence protocol (PDCP) layer. The DU is responsible for processing a physical layer protocol and a real-time service and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited.

In addition, the network device 102 may be connected to a core network (CN) device, and the core network device may be configured to provide a core network service for the terminal device 101 accessing the network device 102. The core network device may correspond to different devices in different systems. For example, in 3G, the core network device may correspond to a serving general packet radio service (GPRS) support node (SGSN) and/or a gateway GPRS support node (GGSN). In 4G, the core network device may correspond to a mobility management entity (MME) and/or a serving gateway (S-GW). In 5G, the core network device may correspond to an access and mobility management function (AMF), a session management function (SMF), or a user plane function (UPF).

Figure 2:
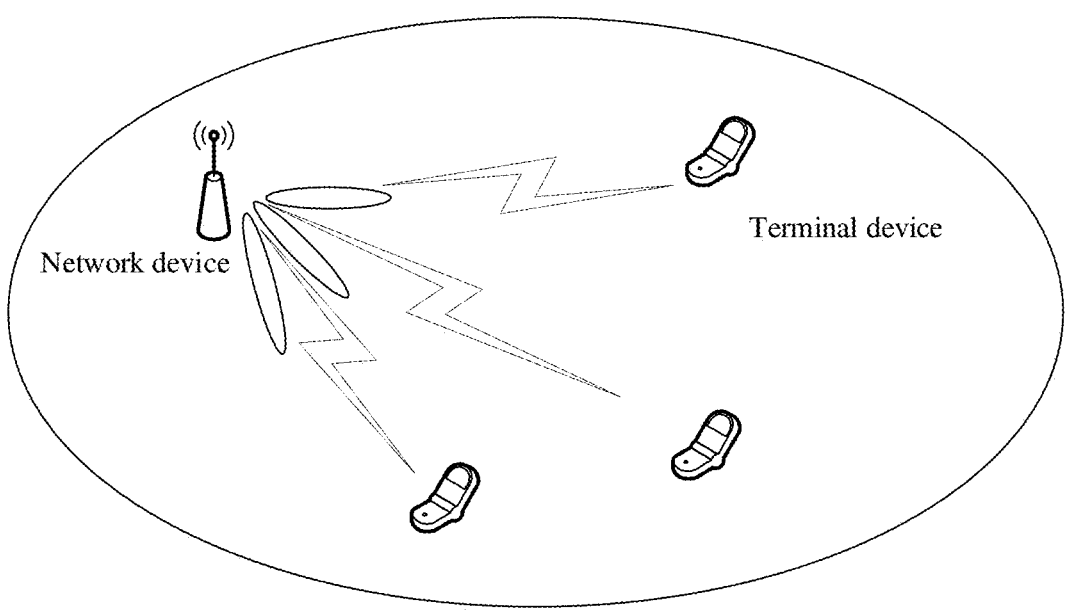
FIG. 2 is a schematic diagram of an architecture of another communication system according to an embodiment.

As shown in FIG. 2, in the embodiments, a network device may transmit data or control signaling to a plurality of terminal devices, to transmit a multicast service. It should be understood that the multicast service herein is a service in which data is transmitted by using a multicast or broadcast transmission technology. The "multicast service" may be replaced with a broadcast multicast service, or may be replaced with a "multimedia broadcast multicast service".

The following uses the multimedia broadcast multicast service (MBMS) as an example to describe the multicast service. It should be understood that the MBMS is a type of multicast service. The MBMS may be applicable to services oriented to a plurality of terminal devices, for example, live broadcast and scheduled program playing. The MBMS may be provided in a multicast or broadcast form. For example, in an LTE system, each cell may have several subframes for sending MBMS data, and all terminal devices may receive the MBMS data by receiving the subframes. The terminal device may receive an MBMS subframe in an idle mode or a connected mode, and a network side may not necessarily know terminal devices that receive the MBMS subframe. Before the MBMS service is sent, a network may further configure and send configuration information of the MBMS service, and the terminal device receives the MBMS data by using the configuration information.

In addition, a multimedia broadcast multicast service single frequency network (MBMSFN) technology or a single-cell point-to-multipoint (SC-PTM) technology is used for a multicast service in LTE.

The MBMSFN requires simultaneous transmission of identical waveforms from a plurality of cells. In this way, a receiver of the terminal device can consider a plurality of MBSFN cells as one large cell. In addition, the terminal device does not suffer from inter-cell interference during transmission in neighboring cells, and benefits from superimposition of signals from the plurality of MBSFN cells. A plurality of cells in which identical waveforms are transmitted form one MBSFN area. A plurality of physical multicast channels (PMCH) may be configured in one area, and each channel may carry several multicast services.

Figure 3:
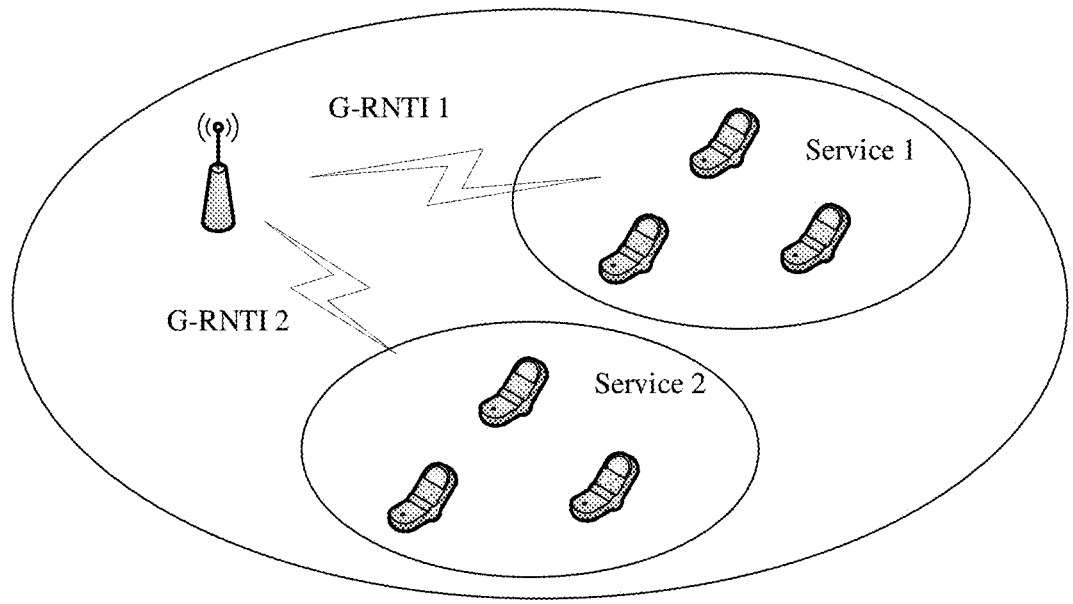
FIG. 3 is a schematic diagram of an architecture of another communication system according to an embodiment.

SC-PTM is a multicast transmission technology. A multicast technology first introduced in LTE is an evolved multimedia broadcast/multicast service (eMBMS). In the eMBMS technology, all cells in one area are required to send same content at the same time. If terminal devices are distributed in only some cells, transmission efficiency of the eMBMS technology is relatively low. Therefore, the 3GPP standard further proposes the SC-PTM technology. In the SC-PTM technology, as shown in FIG. 3, a cell schedules service data to a plurality of terminal devices at the same time by using a group radio network temporary identifier (G-RNTI), and each G-RNTI may be associated with one multicast service. In this way, in one area, only a cell including a user needs to send data, and a cell not including a user does not need to send data, so that air interface resources are saved.

In the SC-PTM technology, a multicast service is transmitted on a physical downlink shared channel (PDSCH). Different from a PDSCH that carries unicast data, a PDSCH that carries multicast data is referred to as a multicast PDSCH. In an SC-PTM transmission process, a network device (for example, a base station) sends, to a group of terminal devices in one cell, downlink control information (DCI) carried on a physical downlink control channel (PDCCH), and then the group of terminal devices receive a multicast PDSCH based on scheduling information included in the DCI. For SC-PTM transmission, a base station may configure a DCI format as a DCI format 1A, and the DCI format 1A is used for allocation of consecutive resource blocks (RB).

Figure 4:
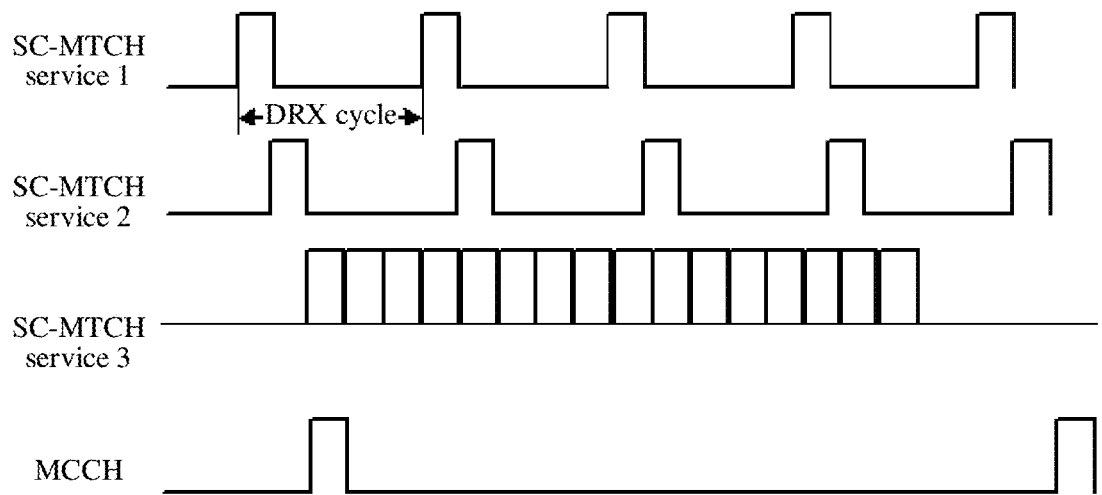
FIG. 4 is a schematic diagram of a multicast traffic channel according to an embodiment.
Figure 5:
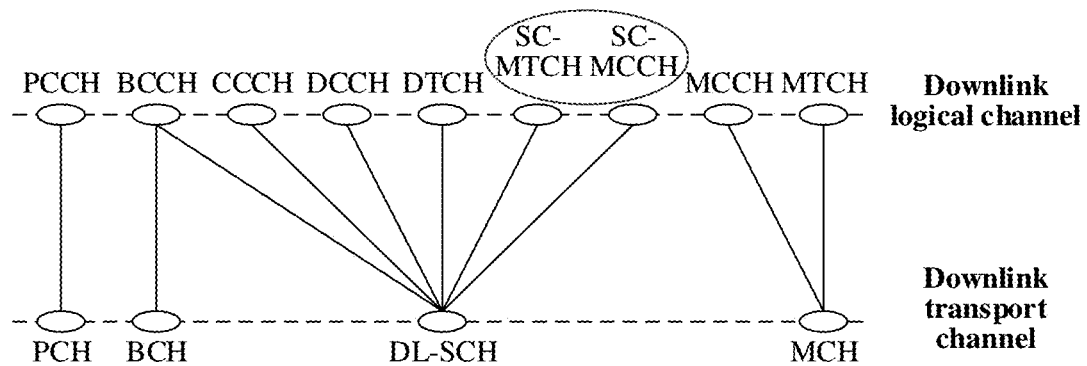
FIG. 5 is a schematic diagram of another multicast traffic channel according to an embodiment.

Two types of logical channels are introduced in the SC-PTM technology, that is, a single-cell MBMS point-to-multipoint control channel (SC-MCCH) and a single-cell MBMS traffic channel (SC-MTCH) shown in FIG. 4. As shown in FIG. 5, both the SC-MCCH and the SC-MTCH are mapped to a downlink shared channel (DL-SCH).

The SC-MCCH is used to transmit control information, including configuration information of the SC-MTCH, for example, a G-RNTI and a discontinuous reception (DRX) parameter corresponding to the SC-MTCH. The SC-MCCH is sent periodically. An SC-MCCH period includes a repetition period (RP) and a modification period (MP). One SC-MCCH is sent in each repetition period. One modification period includes several repetition periods, and content of the SC-MCCH remains unchanged in the modification period. Content of the SC-MCCH in different modification periods may be different.

The SC-MTCH is used to transmit a service. Each service corresponds to one SC-MTCH. The SC-MTCH may be used for continuous transmission, for example, a service 3 shown in FIG. 4, or may be configured with discontinuous transmission, for example, a service 1 and a service 2 shown in FIG. 4.

The following describes a general process in which a terminal device receives an SC-PTM service. First, the terminal device obtains system information (for example, SIB20) from a network device (for example, a base station). The system information includes control information for transmitting the SC-PTM service, that is, configuration information of an SC-MCCH. The configuration information of the SC-MCCH is used to configure a receiving parameter of the SC-MCCH. The terminal device may learn, by using the system information, how to receive the SC-MCCH. The SC-MCCH is transmitted by using a PDSCH, and a PDCCH corresponding to the SC-MCCH is scrambled by using a single cell RNTI (SC-RNTI). A value of the SC-RNTI may be specified in a protocol, and does not need to be configured in a broadcast.

The configuration information of the SC-MCCH may include the following information.

Figure 6:
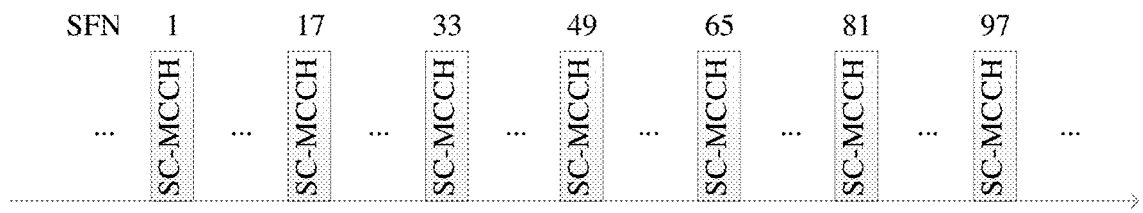
FIG. 6 is a schematic diagram of another multicast traffic channel according to an embodiment.

The configuration information of the SC-MCCH may include a repetition period sc-mcch-RepetitionPeriod and an offset sc-mcch-Offset of the SC-MCCH, that is, a boundary of occurrence of an SC-MCCH period. The SC-MCCH occurs in each system frame that satisfies SFN mod sc-mcch-RepetitionPeriod=sc-mcch-Offset, where SFN represents a system frame number (SFN). For example, if sc-mcch-RepetitionPeriod is rf16, that is, there are 16 radio frames (rf), and sc-mcch-Offset=1, a system frame in which the SC-MCCH occurs is shown in FIG. 6. mod represents a modulo operation.

The configuration information of the SC-MCCH may include SC-MCCH transmission duration (sc-mcch-duration), indicating duration of SC-MCCH transmission.

Figure 7:
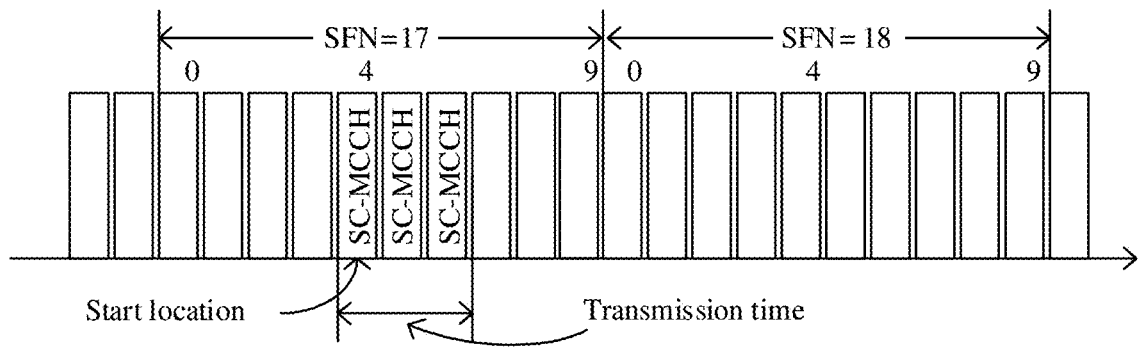
FIG. 7 is a schematic diagram of another multicast traffic channel according to an embodiment.

The configuration information of the SC-MCCH may include an SC-MCCH start location (sc-mcch-FirstSubframe), indicating a start location at which the SC-MCCH occurs. For example, in a system frame including the SC-MCCH, if sc-mcch-FirstSubframe=4, and sc-mcch-duration=3, a subframe location at which the SC-MCCH occurs is shown in FIG. 7.

Figure 8:
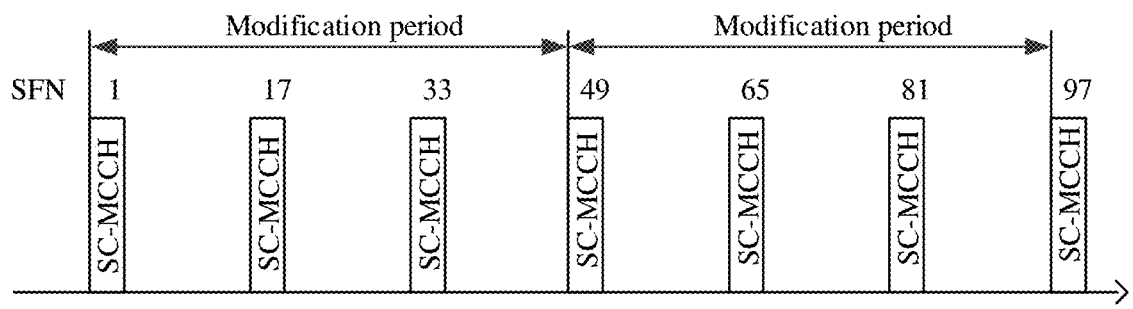
FIG. 8 is a schematic diagram of another multicast traffic channel according to an embodiment.

The configuration information of the SC-MCCH may include a modification period. For example, MP=48. In this case, as shown in FIG. 8, if a repetition period RP of the SC-MCCH is one radio frame, 48 SC-MCCHs are included in one modification period. If a repetition period RP of the SC-MCCH is 16 radio frames, three SC-MCCHs are included in one modification period.

In addition, configuration information of the SC-MTCH may be transmitted by using the SC-MCCH. The configuration information of the SC-MTCH may include configuration information of a multicast service. Configuration information of each service may include a temporary multicast group identifier (TMGI) of the service, a corresponding G-RNTI, a DRX parameter, and information about a neighboring cell for sending the configuration information of the service. The SC-MTCH is also carried on a PDSCH, and a PDCCH corresponding to the SC-MTCH is scrambled by using a G-RNTI.

Optionally, the configuration information of the SC-MTCH may include the following configuration information:

MBMS session information (MBMSSessionInfo), indicating an identifier of the SC-PTM service, for example, including a TMGI and a session identifier (session ID);

a G-RNTI used to receive the SC-MTCH; and

SC-MTCH scheduling information (sc-mtch-scheduling-Info), indicating information about time for receiving the SC-MTCH.

Figure 9:
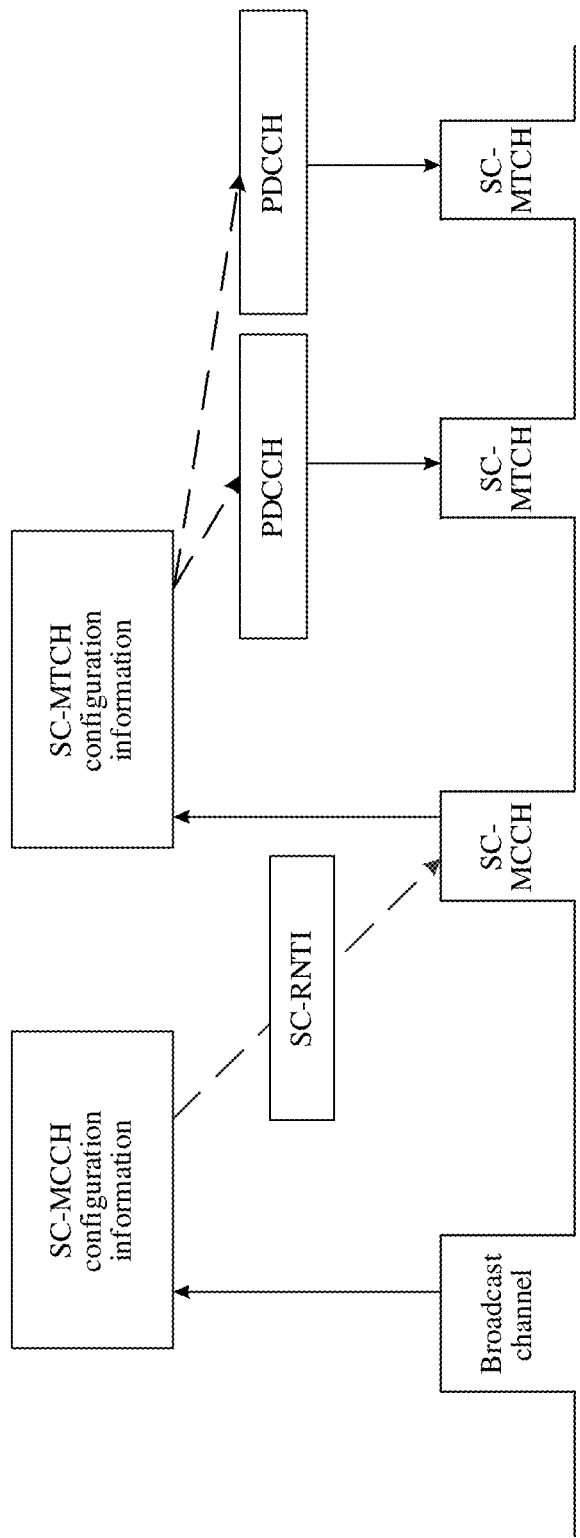
FIG. 9 is a schematic diagram of another multicast traffic channel according to an embodiment.

As shown in FIG. 9, the terminal may receive multicast service data in the SC-MTCH based on the SC-MCCH scheduling information and the PDCCH.

Figure 10:
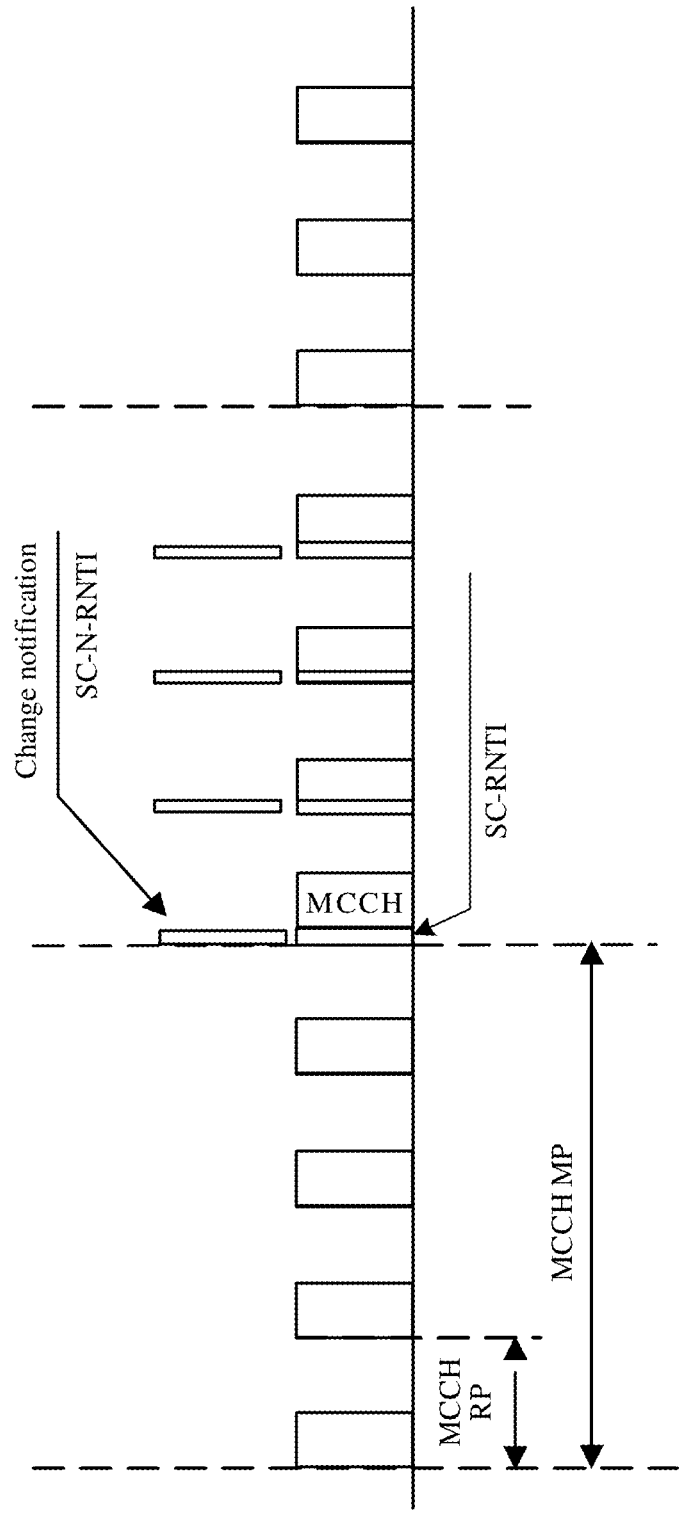
FIG. 10 is a schematic diagram of another multicast traffic channel according to an embodiment.

A detailed SC-MCCH configuration is shown in FIG. 10. The SC-MCCH is repeatedly sent in each MP, and a repetition period is an MCCH RP. Content of the SC-MCCH in a same MP is the same. When the SC-MCCH changes, a PDCCH including a change notification (MCCH change notification) is sent. When the terminal device detects a single-cell notification RNTI (SC-N-RNTI) on the PDCCH, it is considered that the change notification is detected, and the terminal device re-obtains an SC-MCCH. The SC-N-RNTI is used to scramble the change notification. When obtaining the SC-MCCH, the terminal device needs to detect the PDCCH scrambled by the SC-RNTI, to obtain scheduling information of the SC-MCCH.

In the SC-PTM technology, when establishing a multicast channel, a core network device and a network device (for example, a base station) each are not associated with a terminal device, and the network device notifies, by using an SC-MCCH, terminal devices in all RRC connection modes to receive a multicast service. All the RRC connection modes may include an RRC idle mode, an RRC connected mode, and an RRC inactive mode. In the RRC idle mode (briefly referred to as an idle mode below), a terminal device does not have an RRC connection, and the terminal device may perform cell selection and reselection, listen to a paging channel, and perform tracking area update (TAU). In the RRC connected mode (briefly referred to as a connected mode below), a terminal device establishes an RRC connection, the terminal device may receive and send dedicated data, and air interface resources may be saved and power consumption of the terminal device may be reduced through DRX based on activity of the terminal device. In the RRC inactive mode (briefly referred to as an inactive mode below), a terminal device can quickly restore to an RRC connected mode.

Further, a same multicast procedure is used when the terminal device in the connected mode, the idle mode, or the inactive mode receives the multicast service. To support the same multicast procedure, the core network device and the network device need to have a separate multicast startup procedure.

Figure 11:
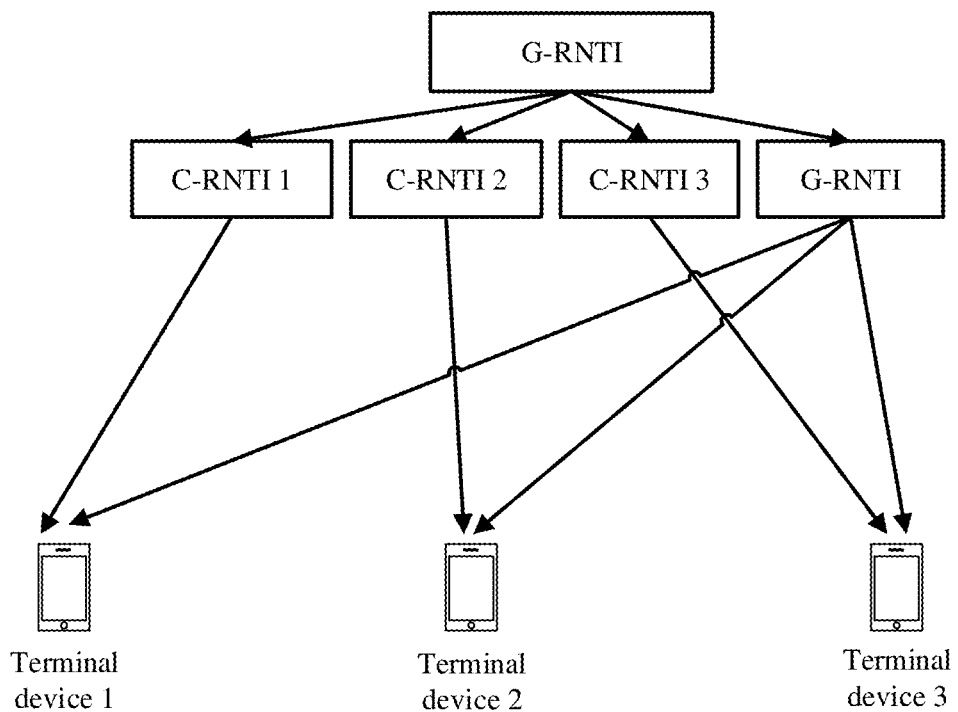
FIG. 11 is a schematic diagram of an architecture of another communication system according to an embodiment.

As shown in FIG. 11, a terminal device 1, a terminal device 2, and a terminal device 3 are all connected to a network device. The network device may configure a cell radio network temporary identifier (C-RNTI) and a data radio bearer (DRB) for each terminal device. In addition, the DRB is further associated with a G-RNTI, and dynamic conversion between unicast and multicast is implemented through G-RNTI scheduling and C-RNTI scheduling. The terminal device 1, the terminal device 2, and the terminal device 3 in FIG. 11 receive a same multicast service. Each terminal device has an RRC connection, that is, a channel for receiving data based on the C-RNTI. The network device configures a same G-RNTI for the three terminal devices. When the C-RNTI is used for scheduling, the network device may separately schedule same data to the three terminal devices. In this case, unicast scheduling is performed. When the G-RNTI is used to schedule data, the network device schedules one piece of data, and all the three terminal devices can receive the data.

Figure 12:
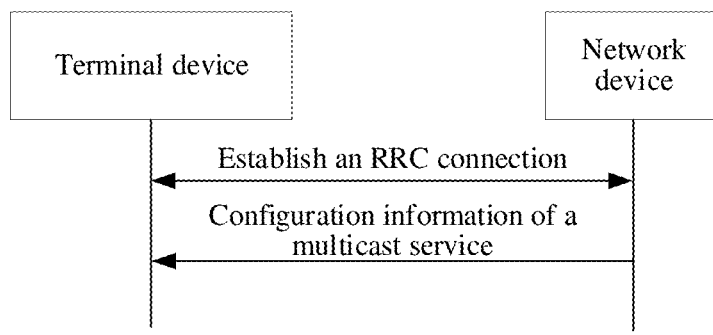
FIG. 12 is a schematic flowchart of a method for obtaining multicast service configuration information.

Currently, when a terminal device in an idle mode or an inactive mode needs to obtain configuration information of a multicast service, the terminal device needs to enter a connected mode, and then a network device (for example, a base station) sends the configuration information (or referred to as multicast configuration information or multicast configuration, which may be interchangeably used in the embodiments, unless otherwise specified) of the multicast service to the terminal device in a unicast manner. For example, this process is shown in FIG. 12. When a terminal device is in an idle mode or an inactive mode, the terminal device needs to first establish an RRC connection to a network device, and then obtain multicast configuration information from the network device after the RRC connection is established. When there may be a large quantity of terminal devices in an idle mode or an inactive mode in a network, overheads of signaling required for establishing an RRC connection between each terminal device and a network device and signaling used by the network device to sequentially send multicast configuration information to each terminal device may be high.

Figure 13:
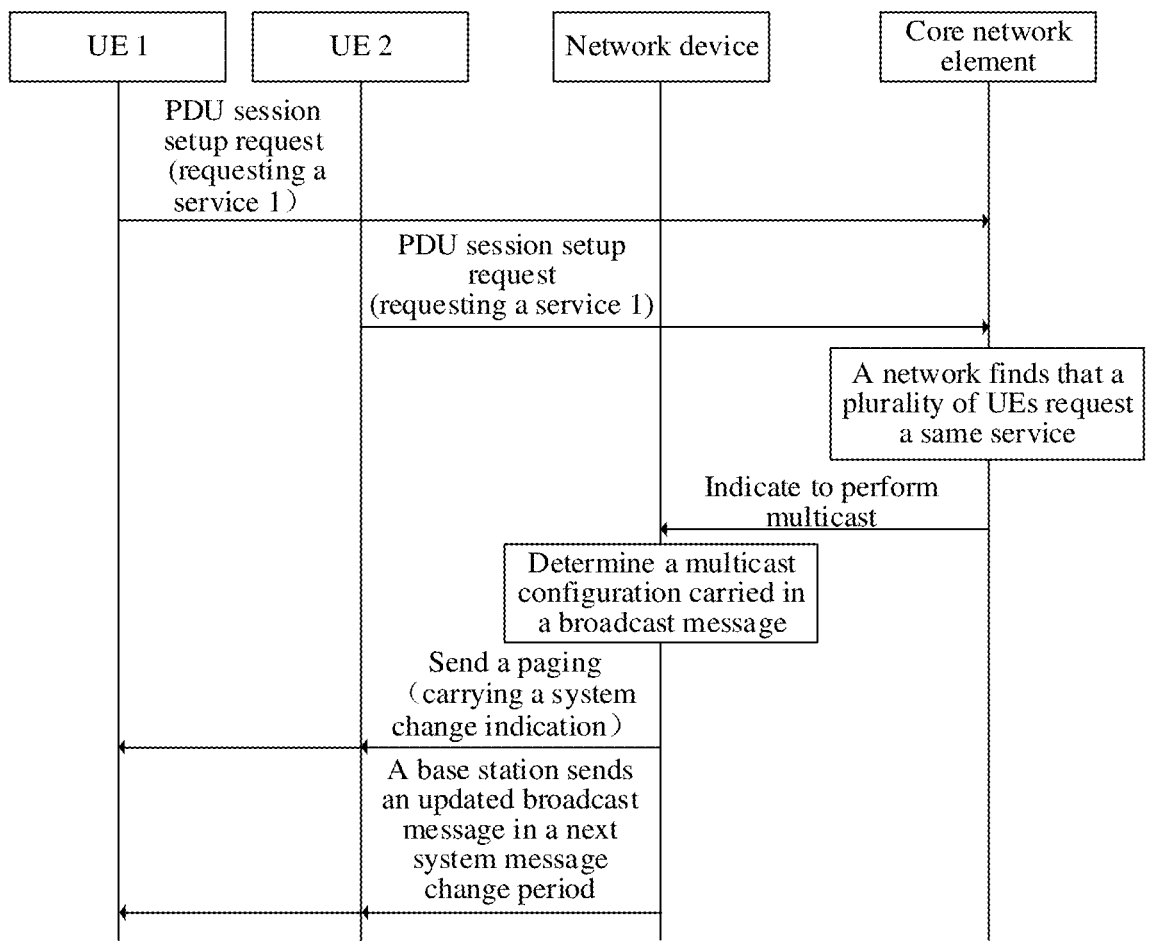
FIG. 13 is a schematic flowchart of a method for sending a multicast service.

In addition, another manner for obtaining configuration information of a multicast service is to notify, in a paging manner, terminal devices in an idle mode or an inactive mode that system information changes. In this case, these terminal devices re-obtain system information in a next system information change period. As shown in FIG. 13, when establishing a protocol data unit (PDU) session, UE 1 and UE 2 each add an indication for requesting a service 1. Different terminal devices independently initiate requests. When finding that a plurality of terminal devices may request a same service, a core network element may indicate, to a base station, that services of PDU sessions established for these terminal devices are the same. The base station may select a multicast manner for transmission when learning that the services of these terminal devices are the same. In this case, the base station may use a broadcast to carry multicast configuration information. This is equivalent to that system information changes. A network device may notify, by using a paging message, all terminal devices that current system information changes. A terminal device that receives a system information change indication re-obtains system information in a next system information change period. The network device sends an updated broadcast message, that is, a broadcast message that carries the multicast configuration information, in the next system information change period.

However, when the paging message carries the system information change indication, the base station sends the paging message at all possible paging locations, resulting in high paging overheads. In addition, some terminal devices that do not need to receive the multicast configuration information re-obtain the broadcast message, resulting in an energy consumption increase. Further, the system information may not change frequently. Therefore, the system information change period is long. When the system information changes because new multicast configuration information is added, the terminal device re-receives the broadcast message in the next system information change period according to an indication of the base station. Consequently, a delay in obtaining the multicast configuration information is long. It can be understood that the foregoing several manners for obtaining multicast configuration information are fixed and not flexible enough, and each manner has a limitation. Therefore, a current manner for obtaining configuration information of a multicast service needs to be optimized.

Figures 14, 15:
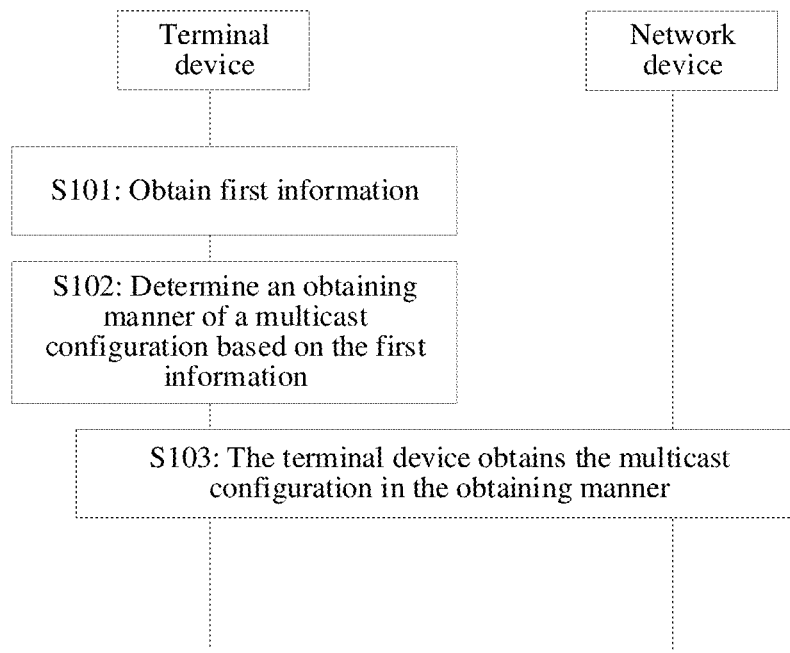
FIG. 14 is a schematic flowchart of a communication method according to an embodiment.
FIG. 15 is a schematic diagram of a structure of indication information according to an embodiment.

To optimize the current manner for obtaining configuration information of a multicast service, an embodiment may provide a communication method. The communication method may be implemented by a terminal device and a network device. Optionally, the terminal device includes the terminal device 101 shown in FIG. 1, and the network device includes the network device 102 shown in FIG. 1. As shown in FIG. 14, the method may include the following steps.

S101: The terminal device obtains first information.

The first information may include at least one of an identifier of a multicast service, probabilities corresponding to different obtaining manners, level information of the terminal device, indication information of a target obtaining manner, information used to indicate that data of the multicast service is to be sent, or signal quality information.

The "information used to indicate that the data of the multicast service is to be sent" may include "information used to indicate start of the multicast service", "information used to indicate arrival of the multicast service", "information used to indicate that data of a multicast service is to be sent on a network side", or the like. It may be understood that the "information used to indicate that the data of the multicast service is to be sent" may also be referred to as "information used to indicate that the data of the multicast service is to be received".

A manner in which the terminal device obtains the first information includes: The terminal device autonomously obtains the first information (for example, the first information is preset in a subscriber identity module (SIM) card, or the first information is preset in a protocol). Alternatively, the terminal device obtains the first information from a network device. The terminal device may obtain the first information from an access network device (for example, the first information is carried in system information, an RRC message, DCI, or a media access control (MAC) control element (CE)). The first information may be carried in a paging message or a physical resource indicated by DCI for scheduling a paging message. For example, the physical resource may carry the paging message and/or the first information. Alternatively, the first information may be carried in DCI for scheduling a paging message. Alternatively, the terminal device obtains the first information from a core network device, for example, receives the first information by using a NAS message.

S102: The terminal device determines an obtaining manner (which is also referred to as the target obtaining manner in the embodiments) of multicast configuration information based on the first information, where the multicast configuration information is used to receive the multicast service.

The target obtaining manner includes one of a first manner, a second manner, a third manner, a fourth manner, a fifth manner, a sixth manner, or a seventh manner.

The first manner includes obtaining the multicast configuration information by receiving unicast information. The second manner includes obtaining the multicast configuration information by receiving multicast information. The third manner includes obtaining the multicast configuration information by receiving broadcast information. The fourth manner includes obtaining the multicast configuration information in two sub-manners: receiving unicast information and receiving multicast information. The fifth manner includes obtaining the multicast configuration information in two sub-manners: receiving multicast information and receiving broadcast information. The sixth manner includes obtaining the multicast configuration information in two sub-manners: receiving unicast information and receiving broadcast information. The seventh manner includes obtaining the multicast configuration information in three sub-manners: receiving unicast information, receiving multicast information, and receiving broadcast information.

The following separately describes the unicast information, the multicast information, and the broadcast information.

The unicast information may be understood as information sent by the network device to the terminal device in a unicast manner. The unicast information may be carried in dedicated signaling. For example, the unicast information may be carried in RRC signaling, a MAC CE, a PDSCH scheduled by DCI scrambled by a UE RNTI, or DCI scrambled by a dedicated RNTI. The terminal device RNTI may be a cell-level terminal identifier and may be unique in a cell. For example, the terminal device RNTI may be a C-RNTI, a modulation and coding scheme (MCS)-C-RNTI or a configured scheduling RNTI (CS-RNTI), a temporary cell radio network temporary identifier (TC-RNTI), or a message B (MSGB/MsgB) radio network temporary identifier (MSGB-RNTI). The MSGB-RNTI is used to listen to a random access response in 2-step random access (RA). This is not limited.

The multicast configuration information may be carried in a downlink message in a random access procedure performed by the terminal device. The random access procedure herein may be a 2-step random access procedure (2-step random access procedure) or a 4-step random access procedure (4-step random access procedure). When the random access procedure is the 4-step random access procedure, the multicast configuration information may be carried on a PDSCH for scheduling a contention resolution message, or the multicast configuration information is carried on a PDSCH scheduled by DCI scrambled by a TC-RNTI. When the random access procedure is the 2-step random access procedure, the multicast configuration information may be carried on a PDSCH scheduled by DCI scrambled by an MSGB-RNTI.

The multicast configuration information may be carried in a downlink message generated after the terminal device completes a random access procedure. The downlink message herein may be an RRC message, or a PDSCH scheduled by DCI scrambled by a C-RNTI. For example, the RRC message may be an RRC reconfiguration message.

The multicast information may be understood as information sent by the network device to the terminal device in a multicast manner. When unicast information is sent in a multicast manner (for example, the multicast configuration may be sent), the solution shown in the background may be used. For example, the SC-PTM technology may be used. In an implementation, the multicast information may be carried in an RRC message corresponding to a multicast common control channel (the RRC message may be understood as an RRC message sent on a resource corresponding to the multicast common control channel). In another implementation, the multicast information may be carried on a PDSCH scheduled by DCI scrambled by a multicast RNTI. The multicast RNTI may be a G-RNTI, an SC-RNTI, or an SC-N-RNTI. This is not limited.

It may be understood that the broadcast information is sent by the network device to the terminal device in a broadcast manner, and the broadcast information may be carried in a system information block (SIB). For the broadcast information carried in the SIB, in one manner, multicast configuration information content is added to an existing SIB; or in another manner, a new system information block, for example, SIBx, is introduced, and the multicast configuration information is carried in SIBx.

Optionally, before receiving the multicast configuration information (sent in a unicast, multicast, or broadcast manner) from the network device, the terminal device may send multicast configuration request information to the network device. The multicast configuration request information includes an identifier of the terminal device and/or the identifier of the multicast service. The multicast configuration request information may be carried in an uplink message in a random access procedure performed by the terminal device or another uplink RRC message. The random access procedure herein may be a 2-step random access procedure or a 4-step random access procedure. When the random access procedure is the 4-step random access procedure, the multicast configuration request information may be carried in a message 1 (Msg1) or a message 3 (Msg3). The Msg3 may include common control channel (CCCH) information. For example, the Msg3 may be an RRC connection setup request message, an RRC connection reestablishment request message, or an RRC connection resume request message. When the random access procedure is the 2-step random access procedure, the multicast configuration request information may be carried in an MsgA. Herein, the MsgA may also be referred to as a message A and may include a random access preamble and uplink signaling. This is equivalent to that a Msg1 and a Msg3 are "sent together" in the 4-step random access procedure, or may be understood as that a Msg1 and a Msg3 are sent at the same time or sent at different time.

In addition, the multicast configuration request information may be carried in an RRC message. The multicast configuration request information may be carried in an RRC message for requesting system information by the terminal device, for example, an RRC system information request (RRCSystemInfoRequest) message. The multicast configuration request information may include one bit or a plurality of bits.

As described above, the multicast configuration may include configuration information of a plurality of multicast services. Therefore, when the terminal device sends the multicast configuration request information, 1-bit information may be used to indicate that configuration information of all multicast services is requested, or a plurality of bits may be used to indicate that configuration information of a multicast service or multicast services is requested. For example, if there are three multicast services, 3 bits may be used for indication, and a correspondence between the 3 bits and three multicast service configurations is one-to-one. The 3 bits may be arranged from left to right in ascending order of multicast service IDs or in descending order of service IDs; or the 3 bits may be arranged from left to right in ascending or descending order of subscripts corresponding to SIBx (for example, SIB15, SIB16, and SIB17) carrying the multicast configurations. Alternatively, a correspondence between multicast configuration request information and configuration information of a multicast service may be predetermined by the terminal device and the network device in another manner. This is not limited herein.

S103: Obtain the multicast configuration information in the target obtaining manner.

Optionally, the terminal device may receive the multicast configuration information from the network device in the obtaining manner and may subsequently receive the multicast service based on the multicast configuration information.

The network device may send the multicast configuration information in a sending manner (the sending manner may be referred to as a target sending manner) corresponding to the target obtaining manner, so that the terminal device can receive the multicast configuration information in the target obtaining manner. It should be understood that a sending manner corresponding to the first manner (for the network device, the sending manner corresponding to the first manner may be briefly referred to as a first manner, and the following is similar) is sending the multicast configuration information by using unicast information. A sending manner corresponding to the second manner is sending the multicast configuration information by using multicast information. A sending manner corresponding to the third manner is sending the multicast configuration information by using broadcast information. A sending manner corresponding to the fourth manner is sending the multicast configuration information in two sub-manners: using unicast information and using multicast information. A sending manner corresponding to the fifth manner is sending the multicast configuration information in two sub-manners: using multicast information and using broadcast information. A sending manner corresponding to the sixth manner is sending the multicast configuration information in two sub-manners: using unicast information and using broadcast information. A sending manner corresponding to the seventh manner is sending the multicast configuration information in three sub-manners: using unicast information, using multicast information, and using broadcast information. In addition, it should be understood that the target sending manner is at least one of the sending manners corresponding to the first manner to the seventh manner.

In the foregoing manner, the terminal device can flexibly determine, based on at least one of the identifier of the multicast service, a probability of each obtaining manner, the level information of the terminal device, the indication information of the target obtaining manner, the information used to indicate that the data of the multicast service is to be sent, or the signal quality information, a manner for obtaining the multicast configuration information, instead of obtaining configuration information of different multicast services in a fixed manner.

It should be understood that, in the foregoing procedure, the network device may determine the target sending manner based on the first information, and send the multicast configuration information in the target sending manner. At least one sending manner included in the target sending manner is corresponding to the target obtaining manner.

Optionally, in the foregoing procedure, the multicast service may be a multicast service to be performed by the terminal device, a multicast service that the terminal device is interested in, or a multicast service being performed by the terminal device.

Optionally, before step S102 or after step S101, the terminal device determines that the multicast configuration information needs to be obtained. A determining method includes the following.

Method 1: The terminal device is interested in the multicast service but has no corresponding multicast configuration information. In this case, the terminal device determines that the multicast configuration information needs to be obtained.

Method 2: The terminal device is interested in the multicast service, but multicast configuration information corresponding to the multicast service is incomplete. In this case, the terminal device determines that the multicast configuration information needs to be obtained.

The information used to indicate that the data of the multicast service is to be sent is information used to indicate arrival of the multicast service (or referred to as to-be-sent information).

For example, the information used to indicate arrival of the multicast service may be carried in a paging message. For example, the paging message may carry an identifier or a group identifier (used to page a group of terminal devices) of the multicast service, to indicate start of the multicast service. For another example, the paging message may carry indication information, to indicate the terminal device to obtain the multicast configuration information of the multicast service. The indication information may include 1 bit. For another example, the paging message may carry the identifier of the terminal device, to page the corresponding terminal device. In this case, a paging reason may be uplink service arrival or downlink service arrival. The terminal device obtains a corresponding configuration as long as the terminal device receives the paging message, to prepare for receiving the service.

There may be a plurality of manners for determining the target obtaining manner based on the first information. The following provides descriptions based on different content included in the first information.

Manner 1

When the first information includes the identifier of the multicast service, the terminal device may determine, based on a correspondence between at least one multicast service identifier and at least one multicast configuration information obtaining manner (which may be referred to as a first correspondence below), the target obtaining manner corresponding to the identifier.

Similarly, the network device may determine, based on a correspondence between at least one multicast service identifier and at least one multicast configuration information sending manner, the target sending manner corresponding to the identifier.

It should be understood that the identifier of the multicast service herein may be an MBMS service identifier (MBMS service ID), a TMGI, a G-RNTI, a multicast service session identifier, a PDU session identifier used to transmit the multicast service, and/or other identification information used to indicate the multicast service. The identifier of the multicast service may be obtained by the terminal device from a message used to indicate arrival of the multicast service.

For example, the terminal device may receive a paging message from the network device, and the paging message may carry a TMGI 1 as an identifier of a multicast service, to indicate arrival of the multicast service whose identifier is the TMGI 1.

For example, the first correspondence may be sent by the network device to the terminal device, or the first correspondence may be preconfigured in the terminal device, or may be stored in a SIM card of the terminal device. For example, the first correspondence may be carried in a broadcast message (for example, system information or a broadcast message carried on an MCCH), a paging message, or a non-access stratum (NAS) message. The broadcast message may be carried in system information or an MCCH (for example, an SC-MCCH), and the paging message may be carried on a PDSCH for paging. Information and/or a message including, but not limited to, a paging message may be transmitted on the PDSCH for paging, and the PDSCH for paging may be indicated by using DCI.

The first correspondence includes a table of a mapping relationship between a multicast configuration information obtaining manner and a TMGI shown in Table 1.

TABLE 1

| TMGI list | Obtaining manner |
| --- | --- |
| TMGI 1 | First manner |
| TMGI 2 | Second manner |
| TMGI 3 | Third manner |
| TMGI 4 | Fourth manner |
| TMGI 5 | Fifth manner |
| TMGI 6 | Sixth manner |
| TMGI 7 | Seventh manner |
| TMGI 8 | First manner and second manner |

As shown in Table 1, if the terminal device is interested in a multicast service, the terminal device may determine, based on a TMGI of the multicast service that the terminal device is interested in and the first correspondence, that an obtaining manner of multicast configuration information is the first manner.

It should be understood that services may be further classified into an enhanced-mode service (or referred to as an enhanced multicast mode) and a normal-mode service (or referred to as a normal broadcast/multicast mode) based on obtaining manners of multicast configuration information. When it is determined, based on the identifier of the multicast service, that the obtaining manner of the multicast configuration information is the first manner, the fourth manner, the sixth manner, or the seventh manner (or the first manner, the second manner, the third manner, the fourth manner, the sixth manner, or the seventh manner; or the first manner, the fourth manner, the fifth manner, the sixth manner, or the seventh manner; or the first manner, the second manner, the third manner, the fourth manner, the fifth manner, the sixth manner, or the seventh manner), the service to which the multicast configuration information belongs is an enhanced-mode service. When it is determined, based on the identifier of the multicast service, that the obtaining manner of the multicast configuration information is the second manner or the third manner (or the second manner, the third manner, or the fifth manner; or the fifth manner), the service to which the multicast configuration information belongs is a normal-mode service.

In addition, the first correspondence may further include multicast configuration information corresponding to the obtaining manner. For example, when the obtaining manner includes obtaining multicast configuration information by using broadcast information, the first correspondence may further include the multicast configuration information obtained by using the broadcast information. For description of the multicast configuration information, refer to the following description. Details are not described herein.

As shown in Table 2, the enhanced-mode service and the normal-mode service may be distinguished from each other from dimensions such as service functions, service registration manners, service notification manners, and possible service types. It should be noted that Table 2 is merely an example, and the embodiments do not specify classification of the enhanced-mode service and the normal-mode service. During implementation, an operator or a content provider classifies modes of different multicast services (that is, classification into the enhanced-mode service or the normal-mode service) according to a policy of the operator or the content provider, a service feature, a provided function, and the like.

TABLE 2

| | Enhanced-mode service | Normal-mode service |
| --- | --- | --- |
| RRC connection mode for receiving a configuration | Connected mode | RRC idle mode/RRC connected mode |
| Function | Provided functions include multicast receiving, dynamic unicast/multicast, hybrid automatic repeat request (HARQ) feedback, and service continuity (lossless) | Provided functions include multicast/broadcast receiving and a simple service continuity function |
| Service registration manner | Registration is required, and a registration manner includes: using a non-access stratum (NAS) or an internet group multicast protocol (IGMP) | If multicast is used for receiving, registration is required; or if broadcast is used for receiving, registration is not required |
| Service notification | Service notification is performed based on a paging message (for example, a UE ID is carried in a paging message or a TMGI is used for notification) | MCCH change notification |

TABLE 2-continued

| | Enhanced-mode service | Normal-mode service |
|---|---|---|
| Multicast configuration information/update | Unicast information, or at least two of unicast information, multicast information, or broadcast information | Multicast information or broadcast information |
| Possible service | Vehicle-to-everything (V2X), mission-critical push to talk (MCPTT), and video | Television (TV), public safety, and video |

In addition, the first correspondence may alternatively be determined in a preconfiguration manner.

Manner 2

When determining, based on the identifier of the multicast service, that the obtaining manner corresponding to the identifier of the multicast service includes any two or more of the first manner to the seventh manner, the terminal device needs to determine one obtaining manner (the target obtaining manner) based on at least one of probabilities corresponding to different obtaining manners, the level information of the terminal device, or the signal quality information, and obtain the multicast configuration information in the target obtaining manner. In this case, the service to which the multicast configuration information belongs may also be referred to as a hybrid-mode service. The terminal device may determine one obtaining manner based on at least one of the probabilities corresponding to the different obtaining manners, the level information of the terminal device, or the signal quality information in a manner preset in a protocol, a preconfigured manner, or a manner indicated by the network device by using system information or a broadcast message carried on an MCCH. For example, the network device indicates the terminal device to determine the obtaining manner of the multicast configuration information based on a probability of the obtaining manner.

For example, if the identifier of the multicast service is the TMGI 8, according to Table 1, an obtaining manner that corresponds to the TMGI 8 and that is determined by the terminal device includes the first manner and the second manner. In this case, the terminal device may determine, based on at least one of the following information: a probability corresponding to the first manner and a probability corresponding to the second manner, the level information of the terminal device, or the signal quality information, an obtaining manner of multicast configuration information of a service to which the TMGI 8 belongs. The following describes various obtaining manners by using examples.

(1) The terminal device determines the obtaining manner of the multicast configuration information based on the probabilities corresponding to the different obtaining manners.

Optionally, when determining, based on the identifier of the multicast service, that obtaining manners corresponding to the identifier of the multicast service include an eighth manner and a ninth manner, where the eighth manner and the ninth manner each are one of the first manner to the seventh manner, and the eighth manner is different from the ninth manner, the terminal device may select, based on probabilities of the eighth manner and the ninth manner, one of the eighth manner and the ninth manner as the obtaining manner of the multicast configuration information. It should be understood that, in this case, the first information may include the service identifier of the multicast service, the probability corresponding to the eighth manner, and the probability corresponding to the ninth manner.

It should be understood that, in this case, the network device may determine, based on the identifier of the multicast service, that sending manners corresponding to the identifier of the multicast service include sending manners corresponding to the eighth manner and the ninth manner. For the network device, a final sending manner does not need to be determined based on a probability, but the multicast configuration information of the multicast service is separately sent in the sending manner corresponding to the eighth manner and the sending manner corresponding to the ninth manner. The multicast configuration information sent in the eighth manner and the multicast configuration information sent in the ninth manner may carry a same TMGI.

For example, the network device may configure a probability of each of the first manner to the seventh manner. For example, probability factors of the eighth manner and the ninth manner are 0.6 and 0.4 respectively. In this case, the terminal device may select, based on a probability of 60%, the eighth manner as the obtaining manner of the multicast configuration information, and select, based on a probability of 40%, the ninth manner as the obtaining manner of the multicast configuration information. Alternatively, a probability of each of the first manner to the seventh manner may be preset.

In another example, the network device may configure a probability. For example, the network device configures a probability of the eighth manner as 0.6, and the terminal device randomly selects a value from 0 to 1. If the selected value is greater than 0.6, the terminal device selects the ninth manner as the obtaining manner of the multicast configuration information. Otherwise, if the selected value is not greater than 0.6, the terminal device selects the eighth manner as the obtaining manner of the multicast configuration information. Alternatively, the network device may configure probabilities of the eighth manner and the ninth manner. For example, the probability of the eighth manner is 0.6, and the probability of the ninth manner is 0.4.

When sending the multicast configuration information, the network device may separately send the same multicast configuration information in the eighth manner and the ninth manner. The terminal device selects one of the eighth manner and the ninth manner as the target manner based on a probability, and receives the multicast configuration information in the target manner. Because the multicast configuration information that may be separately sent by the network device in the eighth manner and the ninth manner corresponds to a same TMGI, the terminal device obtains a configuration of a same multicast service in either of the two manners.

An advantage of this implementation is as follows: When the eighth manner and the ninth manner are respectively a manner that includes obtaining the multicast configuration information by receiving the unicast information and a manner that does not includes obtaining the multicast configuration information by receiving the unicast information, the network device configures a probability, so that some terminal devices obtain a configuration in a broadcast/multicast manner, and some terminal devices enter a connected mode to obtain a configuration. This avoids an access delay and signaling overheads caused when a large quantity of terminal devices may initiate random access.

Optionally, the eighth manner may be one of obtaining manners of multicast configuration information corresponding to the enhanced-mode service, for example, one of the first manner, the fourth manner, the sixth manner, or the seventh manner (or the first manner, the second manner, the third manner, the fourth manner, the sixth manner, or the seventh manner; or the first manner, the fourth manner, the fifth manner, the sixth manner, or the seventh manner; or the first manner, the second manner, the third manner, the fourth manner, the fifth manner, the sixth manner, or the seventh manner). The ninth manner may be an obtaining manner of multicast configuration information corresponding to the normal-mode service, for example, one of the second manner or the third manner (or the second manner, the third manner, or the fifth manner; or the fifth manner).

(2) The terminal device determines the obtaining manner of the multicast configuration information based on the level information of the terminal device.

Optionally, when determining, based on the identifier of the multicast service, that obtaining manners corresponding to the identifier of the multicast service include the eighth manner and the ninth manner, the terminal device may select, based on the level information of the terminal device, one of the eighth manner and the ninth manner as the obtaining manner of the multicast configuration information. It should be understood that, in this case, the first information may include the service identifier of the multicast service and the level information of the terminal device.

It should be understood that, in this case, the network device may determine, based on the identifier of the multicast service, that sending manners corresponding to the identifier of the multicast service include sending manners corresponding to the eighth manner and the ninth manner. The network device may select, based on the level information of the terminal device, one of the sending manner corresponding to the eighth manner and the sending manner corresponding to the ninth manner as the sending manner of the multicast configuration information. It should be understood that, in this case, the first information may include the service identifier of the multicast service and the level information of the terminal device. In addition, the network device may separately send the same multicast configuration information in the eighth manner and the ninth manner.

The level information of the terminal device may include an allocation and retention priority (ARP) and/or an access class (AC). For example, when the terminal device has high level information, the terminal device may select the eighth manner as the obtaining manner of the multicast configuration information. In this case, the eighth manner may include one of the first manner, the fourth manner, the sixth manner, or the seventh manner (or the first manner, the second manner, the third manner, the fourth manner, the sixth manner, or the seventh manner; or the first manner, the fourth manner, the fifth manner, the sixth manner, or the seventh manner; or the first manner, the second manner, the third manner, the fourth manner, the fifth manner, the sixth manner, or the seventh manner). In other words, in this case, the eighth manner includes one of the obtaining manners of the multicast configuration information corresponding to the enhanced-mode service. On the contrary, when the terminal device has low level information, the terminal device may select the ninth manner as the obtaining manner of the multicast configuration information. In this case, the ninth manner includes, for example, one of the second manner or the third manner (or the second manner, the third manner, or the fifth manner; or the fifth manner). In other words, in this case, the ninth manner includes one of the obtaining manners of the multicast configuration information corresponding to the normal-mode service.

(3) The terminal device determines the obtaining manner of the multicast configuration information based on the signal quality information.

Optionally, when determining, based on the identifier of the multicast service, that obtaining manners of the multicast configuration information include the eighth manner and the ninth manner, the terminal device may select, based on the signal quality information, one of the eighth manner and the ninth manner as the obtaining manner of the multicast configuration information. It should be understood that, in this case, the first information may include the service identifier of the multicast service and the signal quality information.

It should be understood that, in this case, the network device may determine, based on the identifier of the multicast service, that sending manners corresponding to the identifier of the multicast service include sending manners corresponding to the eighth manner and the ninth manner. The network device may select, based on the signal quality information, one of the sending manner corresponding to the eighth manner and the sending manner corresponding to the ninth manner as the sending manner of the multicast configuration information. It should be understood that, in this case, the first information may include the service identifier of the multicast service and the signal quality information. In addition, the network device may separately send the same multicast configuration information in the eighth manner and the ninth manner.

The signal quality information is information used to represent signal quality, for example, reference signal received power (RSRP) obtained by the terminal device through measurement. The signal quality information includes at least one of the following: RSRP, reference signal received quality (RSRQ), a received signal strength indicator (RSSI), and channel quality information (CQI).

For example, the terminal device may compare the RSRP obtained through measurement with an RSRP threshold. If the RSRP obtained through measurement is less than (or less than or equal to) the RSRP threshold, the terminal device may select the eighth manner as the obtaining manner of the multicast configuration information. In this case, the eighth manner may include one of the first manner, the fourth manner, the sixth manner, or the seventh manner (or the first manner, the second manner, the third manner, the fourth manner, the sixth manner, or the seventh manner; or the first manner, the fourth manner, the fifth manner, the sixth manner, or the seventh manner; or the first manner, the second manner, the third manner, the fourth manner, the fifth manner, the sixth manner, or the seventh manner). On the contrary, if the RSRP obtained through measurement is greater than or equal to (or greater than) the RSRP threshold, the terminal device may select the ninth manner as the obtaining manner of the multicast configuration information. In this case, the ninth manner may include one of the second manner or the third manner (or the second manner, the third manner, or the fifth manner; or the fifth manner).

Similarly, when the terminal device determines, based on the identifier of the multicast service, that obtaining manners corresponding to the identifier include the eighth manner, the ninth manner, and a tenth manner (or the eighth manner, the ninth manner, a tenth manner, and more obtaining manners), the terminal device may determine the obtaining manner of the multicast configuration information based on at least one of a probability of each obtaining manner, the level information of the terminal device, or the signal quality information. In this case, the first information may include the identifier of the multicast service, and the at least one of the probability of each obtaining manner, the level information of the terminal device, or the signal quality information. The tenth manner (or the tenth manner and more obtaining manners) is one of the first manner to the seventh manner, and the eighth manner, the ninth manner, and the tenth manner (or the eighth manner, the ninth manner, the tenth manner, and more obtaining manners) are different.

Manner 3

Similar to manner 1, the terminal device may determine the obtaining manner of the multicast configuration information according to a correspondence between level information and an obtaining manner and/or a correspondence between signal quality information and an obtaining manner based on the level information of the terminal device and/or the signal quality information detected by the terminal device. For an implementation of manner 3, refer to the description in manner 1. Details are not described herein again.

Manner 4

When the first information includes the indication information of the obtaining manner of the multicast configuration information, the terminal device determines the obtaining manner of the multicast configuration information based on the indication information.

The indication information of the obtaining manner of the multicast configuration information may be used to indicate one or more of the first manner to the seventh manner.

If the indication information of the obtaining manner of the multicast configuration information indicates one of the first manner to the seventh manner, the indicated manner is the obtaining manner of the multicast configuration information. If the indication information of the obtaining manner of the multicast configuration information indicates at least two of the first manner to the seventh manner, the terminal device may determine the obtaining manner of the multicast configuration information based on at least one of a probability, the level information, or the signal quality information. For a manner, refer to the description in manner 2.

For example, the terminal device may receive third information from the network device, and the third information includes the indication information of the obtaining manner of the multicast configuration information. In this case, the first information includes the indication information of the target obtaining manner (or it is understood that the indication information that is of the target obtaining manner and that is included in the first information is obtained by receiving the third information). In addition, the third information may further include identification information of the multicast service, to indicate the multicast service corresponding to the obtaining manner of the multicast configuration information (or it is understood that the identification information that is of the multicast service and that is included in the first information is obtained by receiving the third information). The third information may be sent to the terminal device by using unicast information, multicast information, or broadcast information. For a manner of sending the unicast information, the multicast information, or the broadcast information, refer to the foregoing descriptions.

In a possible example, when the third information is carried on a PDSCH for paging (on a resource indicated by DCI for scheduling a paging message), the third information may indicate that the obtaining manner of the multicast configuration information is an obtaining manner corresponding to the enhanced-mode service, for example, including the first manner, the fourth manner, the sixth manner, or the seventh manner. When the third information is carried on an MCCH, the third information may indicate that the obtaining manner of the multicast configuration information is an obtaining manner corresponding to the normal-mode service, for example, including the second manner or the third manner.

In another possible example, the third information is carried in first DCI, the first DCI is used to schedule a paging message (therefore, the DCI may also be referred to as scheduling information), and the paging message may be used to indicate arrival of the multicast service. Therefore, the first DCI may be used to indicate the obtaining manner of the multicast configuration information of the multicast service. This improves efficiency of obtaining the multicast configuration information. Alternatively, the third information may be carried by using the paging message. Therefore, the paging message may indicate arrival of the multicast service, and indicate the obtaining manner of the multicast configuration information.

Optionally, three bits in the first DCI may be used as the indication information, to respectively correspond to the enhanced-mode service, the normal-mode service, and the hybrid-mode service. Alternatively, a plurality of bits may be used to respectively correspond to a plurality of multicast configuration information obtaining manners. A corresponding sequence is not limited. When a bit is set to "1", it indicates that a corresponding multicast configuration information obtaining manner is used. Alternatively, 2 bits may be used as the indication information. For example, 11 corresponds to the enhanced-mode service, 01 identifies the hybrid-mode service, and 00 indicates the normal-mode service. After it is determined that the multicast service is corresponding to one of the enhanced-mode service, the normal-mode service, or the hybrid-mode service, the obtaining manner of the multicast configuration information may be determined based on an obtaining manner in the mode. For example, the multicast service is the enhanced-mode service, and an obtaining manner corresponding to the enhanced-mode service includes the first manner, the fourth manner, the sixth manner, or the seventh manner. The terminal device may select one of the manners as the obtaining manner of the multicast configuration information. For a selection manner, refer to the descriptions.

In addition, for the network device, the indication information of the target obtaining manner in the first information is indication information of the target sending manner. For example, the indication information may be from an AMF, another core network device, or another non-core network device, and is used to indicate the target sending manner. For description of the indication information of the target sending manner, refer to the description of the indication information of the target obtaining manner.

Manner 5

The terminal device determines the obtaining manner of the multicast configuration information of the multicast service based on the information used to indicate that the data of the multicast service is to be sent. In other words, the terminal device determines the obtaining manner of the multicast configuration information of the multicast service based on information for scheduling the information used to indicate that the data of the multicast service is to be sent.

For example, the terminal device may receive first DCI from the network device, the first DCI may be used to schedule a paging message, and the information used to indicate that the data of the multicast service is to be sent may be included in the paging message.

Optionally, the terminal device may determine, based on a second correspondence, a multicast configuration information obtaining manner corresponding to a time-frequency resource (which may be referred to as a first time-frequency resource) carrying the first DCI. The second correspondence is a correspondence between at least one time-frequency resource and a multicast configuration information obtaining manner. The second correspondence may be represented as a table of a mapping relationship between a time-frequency resource and a multicast configuration information obtaining manner. The relationship between the time-frequency resource and the multicast configuration information obtaining manner in the second correspondence may be one-to-one, one-to-many, many-to-one, or many-to-many. Therefore, after receiving the first DCI, the terminal device may determine the obtaining manner of the multicast configuration information based on the second correspondence. In addition, when there may be a plurality of obtaining manners determined based on the second correspondence and the time-frequency resource of the first DCI, the terminal device may determine the obtaining manner of the multicast configuration information from the plurality of obtaining manners based on at least one of a probability, the level information, or the signal quality information. For a manner, refer to the description in manner 2.

For example, different obtaining manners correspond to different paging occasions (PO). The terminal device attempts to receive a paging message on a PO in time domain but does not need to listen to a paging message at another time domain position, to save energy. Therefore, the network device needs to send, at a time domain position of the PO, the DCI used to schedule the paging message, so that the terminal device can receive the paging message. In addition, the network device may further send a configuration of the paging message to the terminal device, to indicate a parameter such as a paging occasion of the paging message. In this example, the network device may set different configuration parameters of the paging message for different obtaining manners. When a PO indicated by a parameter is used to send the paging message, the terminal device may determine, based on the second correspondence, an obtaining manner corresponding to the PO.

The configuration of the paging message may include a configuration related to a paging frame (paging frame, PF) and a paging occasion. The paging frame is a radio frame, and includes one or more paging occasions. In NR, an SFN of the PF is obtained by using the following formula:

(SFN+PF_offset)mod $T=(T$ div $N)*($UE_ID mod $N)$.

The paging occasion is a subframe, and may be used to transmit a PDCCH scrambled by a P-RNTI and carry the paging message. i_s of the PO is obtained by using the following formula:

i_s=floor(UE_ID/$N$)mod $Ns$.

i_s is a number of a PO corresponding to a PF and i_s of a terminal device may indicate that the terminal device needs to receive a paging message on an $(i\_s+1)^{th}$ PO in the PF.

The paging frame and the paging occasion may be obtained by using the following parameters.

T indicates a DRX cycle, that is, a paging cycle. nB has a value of 4T, 2T, T, T/2, T/4, T/8, T/16, or T/32, and indicates a higher layer configuration parameter. N has a value of min(T, nB), and indicates a quantity of paging frames in a paging cycle. Ns is max(1, nB/T), and indicates a quantity of paging subframes in a paging frame. UE_ID has a value of IMSI mod 1024. mod represents a modulo operation.

Optionally, the terminal device may determine, based on a third correspondence, a multicast configuration information obtaining manner corresponding to an RNTI used to scramble the first DCI. The third correspondence is a correspondence between at least one RNTI and at least one multicast configuration information obtaining manner. The third correspondence may be represented as a table of a mapping relationship between an RNTI and a multicast configuration information obtaining manner. The relationship between the RNTI and the multicast configuration information obtaining manner in the third correspondence may be one-to-one, one-to-many, many-to-one, or many-to-many. Therefore, after receiving the first DCI, the terminal device may determine the obtaining manner of the multicast configuration information based on the third correspondence. In addition, when there may be a plurality of obtaining manners determined based on the third correspondence and the RNTI for scrambling the first DCI, the terminal device may determine the obtaining manner of the multicast configuration information from the plurality of obtaining manners based on at least one of a probability, the level information, or the signal quality information. For a manner, refer to the description in manner 2.

In addition, for the network device, the information that is in the first information and that is used to indicate that the data of the multicast service is to be sent may be used to indicate, to the network device, that the multicast service is to be sent. The information used to indicate that the data of the multicast service is to be sent may be from an AMF, another core network device, or another non-core network device, and the information may be further used to determine the target sending manner. For example, a transmission resource (for example, an interface) of the information used to indicate that the data of the multicast service is to be sent corresponds to the target sending manner, or a transmission occasion of the information used to indicate that the data of the multicast service is to be sent corresponds to the target sending manner. Alternatively, the network device may receive, from an AMF, another core network device, or another non-core network device, information used to explicitly indicate the target sending manner.

It should be understood that the network device may determine the sending manner of the multicast configuration information with reference to manner 1, manner 2, or manner 3. The level information of the terminal device and/or the channel quality information may be determined in an existing manner, for example, reported by the terminal device or sent by a core network device to the network device. A manner in which the network device determines the level information of the terminal device and/or the channel quality information is not limited.

It should be understood that parameters such as the probability and the level information of the terminal device that are used by the terminal device to determine the obtaining manner of the multicast configuration information may alternatively be indicated by a core network device to the network device. For example, the network device may determine the probability and the level information in a preconfigured manner (or another manner), and then send these parameters to the terminal device by using system information, a paging message, or the like.

The network device may alternatively indicate the sending manner of the multicast configuration information to the terminal device in manner 4 and/or manner 5. The sending manner is corresponding to the obtaining manner. For example, if the sending manner is sending the multicast configuration information by using unicast information, the corresponding obtaining manner is obtaining the multicast configuration information by using unicast information.

The following describes the multicast configuration information in this embodiment.

For the enhanced-mode service, the multicast configuration information may include at least one of a G-RNTI associated with the multicast service, the identifier of the multicast service, a packet data convergence protocol (PDCP) layer configuration parameter, a radio link control (RLC) layer configuration parameter, a logical channel (LCH) set corresponding to the identifier of the multicast service, a physical uplink control channel (PUCCH) configuration, a PDCP status report configuration, a bandwidth part (BWP) configuration, or a dual active protocol stack (DAPS) configuration.

The PDCP layer configuration parameter includes at least one of a PDCP sequence number length, an encryption parameter, or a header compression parameter. The RLC layer configuration parameter may include a parameter such as an RLC sequence number length or an RLC mode. The RLC mode may be an acknowledged mode (AM), an unacknowledged mode (UM), or a transparent mode (TM). The logical channel set corresponding to the identifier of the multicast service may include a logical channel number list. The list may include a correspondence between one or more multicast services and a logical channel set, and one or more logical channels corresponding to an identifier of each multicast service. An implementation is not limited herein. The DAPS configuration is introduced for mobility enhancement. Such a mechanism is enabled, so that 0-millisecond (ms) interruption can be ensured during handover of the terminal device, to ensure service transmission performance. When the terminal device is handed over, protocol stacks of both a source base station and a target base station are activated. In other words, in a period of time, the terminal device keeps a connection to each of the source base station and the target base station. Only after the terminal device is handed over to the target base station, the connection to the source base station is disconnected. In this way, data can be kept uninterrupted in a handover process, and 0-ms interruption is implemented.

For example, if the multicast configuration information obtaining manner corresponding to the enhanced-mode service includes the first manner, the terminal device may obtain at least one of the G-RNTI associated with the multicast service, the identifier of the multicast service, the PDCP layer configuration parameter, the RLC layer configuration parameter, the logical channel set corresponding to the identifier of the multicast service, the PUCCH configuration, the PDCP status report configuration, the BWP configuration, or the DAPS configuration by using unicast information. It should be understood that, in the first manner, the unicast information carrying the multicast configuration information needs to be obtained in a connected mode.

It should be understood that, for the enhanced-mode service, the network device may send some or all of multicast configuration information to the terminal device by using unicast information or multicast information. The unicast information herein is, for example, RRC signaling, or information carried on a PDSCH scheduled by unicast DCI, and the multicast information is, for example, information carried on a PDSCH scheduled by multicast DCI.

For the normal-mode service, the multicast configuration information may include at least one of a PDCP layer configuration parameter, an RLC layer configuration parameter, or a G-RNTI. For example, if the multicast configuration information obtaining manner corresponding to the enhanced-mode service includes the first manner, the terminal device may obtain at least one of the PDCP layer configuration parameter, the RLC layer configuration parameter, or the G-RNTI by using multicast information.

The following separately describes procedures of obtaining the multicast configuration information in the foregoing first manner to seventh manner.

1. For the First Manner:

When the multicast configuration information obtaining manner determined by the terminal device includes obtaining the multicast configuration information by using unicast information (that is, the first manner), before obtaining the multicast configuration information, the terminal device may determine an RRC connection mode of the terminal device, and determine, based on the RRC connection mode of the terminal device, a procedure of obtaining the multicast configuration information. Details are as follows.

If the terminal device is in a connected mode, the terminal device may wait for dedicated signaling sent by the network device and may receive the dedicated signaling to obtain the multicast configuration information. Alternatively, the terminal device may send a multicast configuration information obtaining request to the network device, and after receiving the request, the network device sends the multicast configuration information to the terminal device. The configuration obtaining request is carried in an RRC message or a MAC CE, the configuration request is identified by using one or more bits, and a correspondence between each bit and a multicast configuration information obtaining manner is not limited.

If the terminal device is in an idle mode or an inactive mode, in a possible implementation, after the terminal device enters a connected mode, the network device sends the multicast configuration information to the terminal device by using RRC signaling, where the RRC signaling may be an RRC reconfiguration message or another RRC message; or in another possible implementation, the terminal device may obtain the multicast configuration information in a process of entering a connected mode.

For a manner in which the terminal device obtains the multicast configuration information in a process of entering the connected mode, in an example, when the terminal device determines to perform 4-step random access, the terminal device may use a Msg3 to carry a UE ID, and the network device learns of an access reason based on a prestored association relationship between a UE ID and an access reason. When a quantity of terminal devices that perform multicast access reaches a quantity, the network device may directly send the multicast configuration information to a terminal device that performs access subsequently, or send indication information to the terminal device, to indicate the terminal device to read the multicast configuration information carried in the system information, where the indication information may include a 1-bit enabling indication, or include identification information of the multicast service, and the indication information may be sent by using a Msg4 or DCI. In another example, when the terminal device determines to perform 2-step random access, the 2-step random access includes sending a MsgA and receiving a MsgB. The MsgA may carry a UE ID, so that the network device learns, based on the UE ID, that the terminal device needs the multicast configuration information. Then, the network device may send indication information or directly send the multicast configuration information to the terminal device. The indication information or the multicast configuration information herein may be carried in the MsgB, DCI for scheduling the MsgB, or another dedicated message. For content of the indication information, refer to the description of the indication information in the 4-step procedure. The dedicated message herein may be an RRC message, a media access control (MAC) control element (CE), or the like. A method in which the terminal device determines to perform 4-step random access or 2-step random access includes: The terminal device determines, based on a preset RSRP threshold, to perform 4-step random access or 2-step random access. For example, when an RSRP threshold measured by the terminal device is greater than the preset RSRP threshold, the terminal device determines to perform 2-step random access. On the contrary, when an RSRP threshold measured by the terminal device is less than or equal to the preset RSRP threshold, the terminal device determines to perform 4-step random access.

2. For the Second Manner:

When the multicast configuration information obtaining manner determined by the terminal device includes obtaining the multicast configuration information by using multicast information, the terminal device may read the multicast information to obtain the multicast configuration information. For example, the terminal device may read multicast information sent by using a multicast control channel (MCCH), to obtain the multicast configuration information carried in the multicast information; or the terminal device obtains, by using DCI scrambled by a group radio network temporary identifier (G-RNTI), the multicast configuration information carried on a scheduling resource indicated by the DCI.

Optionally, that the terminal device reads the multicast information includes: starting to read the multicast information in a same multicast configuration information change period, a same frame, a same subframe, a same slot, or a same sub-slot in which the indication information of the target obtaining manner is located, or immediately reading the multicast information after the terminal device receives the indication information of the target obtaining manner.

3. For the Third Manner:

When the multicast configuration information obtaining manner determined by the terminal device includes obtaining the multicast configuration information by using broadcast information, the terminal device may read the broadcast information, to receive the multicast configuration information sent by using the broadcast information.

Optionally, that the terminal device reads the broadcast information includes: starting to read the broadcast information in a same multicast configuration information change period, a same frame, a same subframe, a same slot, or a same sub-slot in which the indication information of the target obtaining manner is located, or immediately reading the broadcast information after the terminal device receives the indication information of the target obtaining manner.

4. For the Fourth Manner:

When the multicast configuration information obtaining manner determined by the terminal device includes obtaining the multicast configuration information in two sub-manners: using multicast information and using unicast information (that is, the fourth manner), the terminal device may separately obtain the complete multicast configuration information by using the multicast information and the unicast information. When the terminal device obtains a part of multicast configuration information through multicast, the terminal device further needs to obtain a part of multicast configuration information by using unicast information. The complete multicast configuration information may be obtained based on a sum of the two parts of multicast configuration information.

When obtaining the part of multicast configuration information corresponding to the unicast information, the terminal device needs to determine an RRC connection mode of the terminal device, and then the terminal device determines, based on the RRC connection mode of the terminal device, a procedure for obtaining the part of multicast configuration information. For a procedure, refer to the foregoing description of receiving the multicast configuration information by using unicast information. In an example, the terminal device may obtain first multicast configuration information (including a first identifier and/or a first multicast service identifier) by using the multicast information (or the unicast information), obtain second multicast configuration information (including the first identifier and/or the first multicast service identifier) by using the unicast information (or the multicast information), and then determine, based on the first identifier and/or the first multicast service identifier, that a sum of multicast configuration information separately carried in the first multicast configuration information and the second multicast configuration information includes complete multicast configuration information corresponding to the first multicast service identifier.

In another example, the terminal device may obtain first multicast configuration information (including a first multicast service identifier, a quantity of segments (or referred to as a quantity of sub-manners), or a first identifier) by using the multicast information (or the unicast information), where the first identifier is used to indicate that the first multicast configuration information is a part of complete multicast configuration information or configuration information corresponding to a sub-manner; and obtain second multicast configuration information (including the first multicast service identifier or the first identifier) by using the unicast information (or the multicast information). However, values of the first identifiers in the first multicast configuration information and the second multicast configuration information may be different. For example, when the multicast configuration information is obtained in the fourth manner, there are two sub-manners (which are obtaining the multicast configuration information by using unicast information and obtaining the multicast configuration information by using multicast information). When the terminal device receives the first multicast configuration information carried in the multicast information, the multicast information may indicate the identifier of the multicast service, the quantity of segments (in this example, it indicates that the complete multicast configuration information is divided into two segments), and the first identifier. In this case, the first identifier may indicate that the multicast configuration information carried in the multicast information is a segment of the multicast configuration information that is divided into a plurality of segments (in this example, it indicates that the segment of multicast configuration information is a first segment of multicast configuration information). Then, the terminal device may obtain another segment of multicast configuration information by using the unicast information.

5. For the Fifth Manner:

Optionally, when the multicast configuration information obtaining manner determined by the terminal device includes obtaining the multicast configuration information by using broadcast information and multicast information, the terminal device may separately obtain the complete multicast configuration information by using the broadcast information and the multicast information. When the terminal device obtains a part of multicast configuration information through broadcast, the terminal device further needs to obtain a part of multicast configuration information by using multicast information. The complete multicast configuration information may be obtained based on a sum of the two parts of multicast configuration information. For example, the terminal device may obtain first multicast configuration information (including a first identifier and a first multicast service identifier) by using the broadcast information, obtain second multicast configuration information (including the first identifier and the first multicast service identifier) by using the multicast information, and then determine, based on the first identifier and the first multicast service identifier, that a sum of multicast configuration information separately carried in the first multicast configuration information and the second multicast configuration information includes complete multicast configuration information corresponding to the first multicast service identifier.

In another example, the terminal device may obtain first multicast configuration information (including a first multicast service identifier, a quantity of segments (or referred to as a quantity of sub-manners), or a first identifier) by using the broadcast information (or the multicast information), where the first identifier is used to indicate that the first multicast configuration information is a part of complete multicast configuration information or multicast configuration information corresponding to a sub-manner; and obtain second multicast configuration information (including the first multicast service identifier or the first identifier) by using the multicast information (or the broadcast information). However, values of the first identifiers in the first multicast configuration information and the second multicast configuration information are different. For example, when the multicast configuration information is obtained in the fifth manner, there are two sub-manners (that is, the multicast configuration information is obtained in two sub-manners: using multicast information and using broadcast information). When the terminal device receives the first multicast configuration information carried in the broadcast information, the broadcast information may indicate the identifier of the multicast service, the quantity of segments (in this example, it indicates that the complete multicast configuration information is divided into two segments), and the first identifier. In this case, the first identifier may indicate that the multicast configuration information carried in the broadcast information is a segment of the multicast configuration information that is divided into a plurality of segments (in this example, it indicates that the segment of multicast configuration information is a first segment of multicast configuration information). Then, the terminal device may obtain a second segment of multicast configuration information by using the multicast information.

6. For the Sixth Manner:

When the multicast configuration information obtaining manner determined by the terminal device includes obtaining the multicast configuration information by using broadcast information and unicast information, the terminal device may separately obtain the complete multicast configuration information by using the broadcast information and the unicast information. When the terminal device obtains a part of multicast configuration information through broadcast, the terminal device further needs to obtain a part of multicast configuration information by using unicast information. The complete multicast configuration information may be obtained based on a sum of the two parts of multicast configuration information.

When obtaining the part of multicast configuration information corresponding to the unicast information, the terminal device needs to determine an RRC connection mode of the terminal device, and then the terminal device determines, based on the RRC connection mode of the terminal device, a procedure for obtaining the part of multicast configuration information. For a procedure, refer to the foregoing description of receiving the multicast configuration information by using unicast information. For example, the terminal device may obtain first multicast configuration information (including a first identifier and a first multicast service identifier) by using the broadcast information, obtain second multicast configuration information (including the first identifier and the first multicast service identifier) by using the unicast information, and then determine, based on the first identifier and the first multicast service identifier, that a sum of multicast configuration information separately carried in the first multicast configuration information and the second multicast configuration information includes complete multicast configuration information corresponding to the first multicast service identifier.

In another example, the terminal device may obtain first multicast configuration information (including a first multicast service identifier, a quantity of segments (or referred to as a quantity of sub-manners), or a first identifier) by using the broadcast information (or the unicast information), where the first identifier is used to indicate that the first multicast configuration information is a part of a complete multicast configuration or multicast configuration information corresponding to a sub-manner; and obtain second multicast configuration information (including the first multicast service identifier or the first identifier) by using the unicast information (or the broadcast information). However, values of the first identifiers in the first multicast configuration information and the second multicast configuration information are different. For example, when the multicast configuration information is obtained in the sixth manner, there are two sub-manners (which are obtaining the multicast configuration information by using broadcast information and obtaining the multicast configuration information by using unicast information). When the terminal device receives the first multicast configuration information carried in the broadcast information, the broadcast information may indicate the identifier of the multicast service, the quantity of segments (in this example, it indicates that the complete multicast configuration information is divided into two segments), and the first identifier. In this case, the first identifier may indicate that the multicast configuration information carried in the broadcast information is a segment of the multicast configuration information that is divided into a plurality of segments (in this example, it indicates that the segment of multicast configuration information is a first segment of multicast configuration information). Then, the terminal device may obtain a second segment of multicast configuration information by using the unicast information.

7. For the Seventh Manner:

When the multicast configuration information obtaining manner determined by the terminal device includes obtaining the multicast configuration information in three sub-manners: using broadcast information, using multicast information, and using unicast information, the terminal device may separately obtain the complete multicast configuration information by using the broadcast information, the multicast information, and the unicast information. When the terminal device separately obtains a part of multicast configuration information in the complete multicast configuration information by using each of broadcast information and multicast information, the terminal device further needs to obtain a part of multicast configuration information by using unicast information. The complete multicast configuration information may be obtained based on a sum of the several parts of multicast configuration information.

When obtaining the part of multicast configuration information corresponding to the unicast information, the terminal device needs to determine an RRC connection mode of the terminal device, and then the terminal device determines, based on the RRC connection mode of the terminal device, a procedure for obtaining the part of multicast configuration information. For a procedure, refer to the foregoing description of receiving the multicast configuration information by using unicast information. For example, the terminal device may obtain first multicast configuration information (including a first identifier and a first multicast service identifier) by using the multicast information, obtain second multicast configuration information (including the first identifier and the first multicast service identifier) by using the broadcast information, obtain third multicast configuration information (including the first identifier and the first multicast service identifier) by using the unicast information, and then determine, based on the first identifier and the first multicast service identifier, that a sum of multicast configuration information separately carried in the first multicast configuration information, the second multicast configuration information, and the third multicast configuration information is complete multicast configuration information corresponding to the first multicast service identifier.

In another example, the terminal device may obtain first multicast configuration information (including a first multicast service identifier, a quantity of segments (or referred to as a quantity of sub-manners), or a first identifier) by using the broadcast information (or the multicast information or the unicast information), where the first identifier is used to indicate that the first multicast configuration information is a part of complete multicast configuration information or multicast configuration information corresponding to a sub-manner; obtain second multicast configuration information (including the first multicast service identifier or the first identifier) by using the multicast information (or the unicast information or the broadcast information); and obtain third multicast configuration information (including the first multicast service identifier or the first identifier) by using the unicast information (or the broadcast information or the multicast information). However, values of the first identifiers in the first multicast configuration information, the second multicast configuration information, and the third multicast configuration information are different. For example, when the multicast configuration information is obtained in the seventh manner, there are three sub-manners (which are obtaining the multicast configuration information by using broadcast information, obtaining the multicast configuration information by using multicast information, and obtaining the multicast configuration information by using unicast information). When the terminal device receives the first multicast configuration information carried in the broadcast information, the broadcast information may indicate the identifier of the multicast service, the quantity of segments (in this example, it indicates that the complete multicast configuration information is divided into three segments), and the first identifier. In this case, the first identifier may indicate that the multicast configuration information carried in the broadcast information is a segment of the multicast configuration information that is divided into a plurality of segments (in this example, it indicates that the segment of multicast configuration information is a first segment of multicast configuration information). Then, the terminal device may obtain other segments of multicast configuration information in two sub-manners: using the multicast information and using the broadcast information. When the terminal device receives the first multicast configuration information carried in the multicast information, the multicast information may indicate the identifier of the multicast service, the quantity of segments (in this example, it indicates that the complete multicast configuration information is divided into three segments), and the first identifier. In this case, the first identifier may indicate that the multicast configuration information carried in the broadcast information is a segment of the multicast configuration information that is divided into a plurality of segments (in this example, it indicates that the segment of multicast configuration information is a second segment of multicast configuration information). Then, the terminal device may obtain a third segment of multicast configuration information by using the unicast information.

Optionally, each of the fourth manner to the seventh manner includes at least two sub-manners. For example, in the fourth manner, the multicast configuration information needs to be obtained by receiving both the unicast information and the multicast information. Obtaining the multicast configuration information by using the unicast information and obtaining the multicast configuration information by using the multicast information are two sub-manners for obtaining the multicast configuration information. When it is determined, based on the first information, to use any one of the fourth manner to the seventh manner, in an implementation of S103, at least one configuration in the multicast configuration information is obtained in a sub-manner of each obtaining manner, and all pieces of multicast configuration information obtained in all sub-manners are different in at least one item.

For example, a sub-manner of each obtaining manner includes at least one of obtaining the multicast configuration information by using unicast information, obtaining the multicast configuration information by using multicast information, or obtaining the multicast configuration information by using broadcast information. For example, the terminal device may obtain the multicast configuration information in two sub-manners: using unicast information and using multicast information, or obtain the multicast configuration information in two sub-manners: using multicast information and using broadcast information.

When the target obtaining manner includes any one of the fourth manner to the seventh manner, the first identifier needs to be obtained in each sub-manner of each obtaining manner. In other words, configuration information obtained in each sub-manner includes the first identifier. The first identifier may correspond to the multicast service (or a service of the multicast service), and is used to indicate that configurations obtained in different sub-manners of the target obtaining manner belong to multicast configuration information of a same multicast service. First identifiers of different multicast services may be the same or different. First identifiers carried in configuration information obtained in different sub-manners of the target obtaining manner may be the same or different.

When the first identifiers in the multicast configuration information obtained in the different sub-manners of the target obtaining manner are the same, multicast configuration information carrying the same first identifier belongs to the multicast configuration information obtained in the target obtaining manner. When the first identifiers in the multicast configuration information obtained in the different sub-manners of the target obtaining manner are different, all the first identifiers may be associated. For example, multicast configuration information obtained in each sub-manner includes segment information, and the segment information and the first identifier in the multicast configuration information obtained in each sub-manner may be used to determine that the multicast configuration information is a segment in a plurality of segments of multicast configuration information divided from the complete multicast configuration information, so that the terminal device obtains one or more segments of other unreceived multicast configuration information.

When different multicast services have a same first identifier, the terminal device may identify multicast configuration information with reference to identification information of a multicast service. A first identifier of a same multicast service may be 1 bit. That is, a bit is set to 1, to indicate that multicast configuration information is incomplete. For example, when the first identifier indicates that the multicast configuration information is incomplete, the terminal device may learn, based on the identification information of the multicast service, that the multicast configuration information of the multicast service received in the broadcast is incomplete. In this case, the terminal device further needs to obtain remaining multicast configuration information in another manner.

If different services have different first identifiers, the network device may allocate a different first identifier to each service.

In addition, each sub-manner of each obtaining manner is used to obtain at least one of the G-RNTI associated with the multicast service, the identifier of the multicast service, the PDCP layer configuration parameter, the RLC layer configuration parameter, the logical channel set corresponding to the identifier of the multicast service, the PUCCH configuration, the PDCP status report configuration, the BWP configuration, or the DAPS configuration.

For example, in the fifth manner, a first configuration obtained by the terminal device by using unicast information includes the first identifier, and a second configuration obtained by the terminal device by using broadcast information includes the first identifier. Because the first identifier in the first configuration is the same as the first identifier in the second configuration, the terminal device may learn that the first configuration and the second configuration belong to multicast configuration information of a same multicast service. The first configuration may be received by the terminal device by using dedicated signaling after the terminal device enters a connected mode. The second configuration may be received by the terminal device in an idle mode or an inactive mode by using system information or a broadcast message carried on an MCCH. In addition, the first configuration may further include at least one of the PUCCH configuration, the PDCP status report configuration, the BWP configuration, or the DAPS configuration, and the second configuration may further include at least one of the G-RNTI associated with the multicast service, the identifier of the multicast service, the PDCP layer configuration parameter, the RLC layer configuration parameter, or the logical channel set corresponding to the identifier of the multicast service.

For example, after a configuration of the multicast service changes, the network device sends information used to indicate modification of the multicast configuration information (which may be referred to as information used to indicate multicast configuration information modification, or second information), to notify the terminal device that the configuration of the multicast service changes. It should be understood that the second information herein may indicate modification of configurations of one or more multicast services. For example, the second information may carry identifiers of one or more modified multicast services.

For example, an update indication may include 1-bit indication information. In other words, 1 bit is used to notify that the multicast configuration information changes. Regardless of a mode to which the multicast service belongs, the terminal device needs to obtain the modified multicast configuration information based on the update indication. Alternatively, an update indication indicates each multicast mode (or an obtaining manner of multicast configuration information), that is, indicates modification of multicast configuration information of a multicast service in a target multicast mode (or an obtaining manner of target multicast configuration information). In this case, the network device may perform indication by using a plurality of bits. For example, each bit corresponds to one multicast mode, or each bit may correspond to one multicast configuration information obtaining manner, or a plurality of bits correspond to a plurality of multicast modes or obtaining manners. This is not limited. As shown in FIG. 15, the update indication may indicate one of the first manner to the seventh manner by using each of 7 bits.

The update indication may be carried by using a paging message or an MCCH change notification. If the update indication is carried by using the paging message, the update indication may be indicated by using DCI used to schedule paging or carried by using a PDSCH indicated by paging DCI. In this case, the DCI used to schedule paging is scrambled by using a P-RNTI. If the update indication is carried by using the MCCH change notification, the update indication may be indicated by using DCI for scheduling the MCCH change notification. In this case, the DCI is scrambled by using an M-RNTI, and the M-RNTI is an RNTI used to scramble a multicast MCCH change indication, or may have another name.

It should be understood that the terminal device may obtain the modified multicast configuration information in the obtaining manner of the modified multicast configuration information. For a manner, refer to the foregoing description of the manner of obtaining the multicast configuration information. For example, the terminal device may determine a sending manner of the modified multicast configuration information based on fourth information, and the fourth information may include the first information. Alternatively, the terminal device may determine a sending manner of the modified multicast configuration information based on fifth information from the network device, and the fifth information may indicate the sending manner (or the obtaining manner) of the modified multicast configuration information. For a manner, refer to the foregoing description of indicating the obtaining manner of the multicast configuration information by using the information used to indicate that the data of the multicast service is to be sent or the third information. The terminal device obtains the fifth information from the network device. The terminal device may obtain the fifth information from an access network device (for example, the fifth information is carried in system information, an RRC message, DCI, or a MAC CE).

It should be understood that the modified multicast configuration information obtained by the terminal device may include complete modified multicast configuration information or include only a modified unicast configuration.

Figure 16:
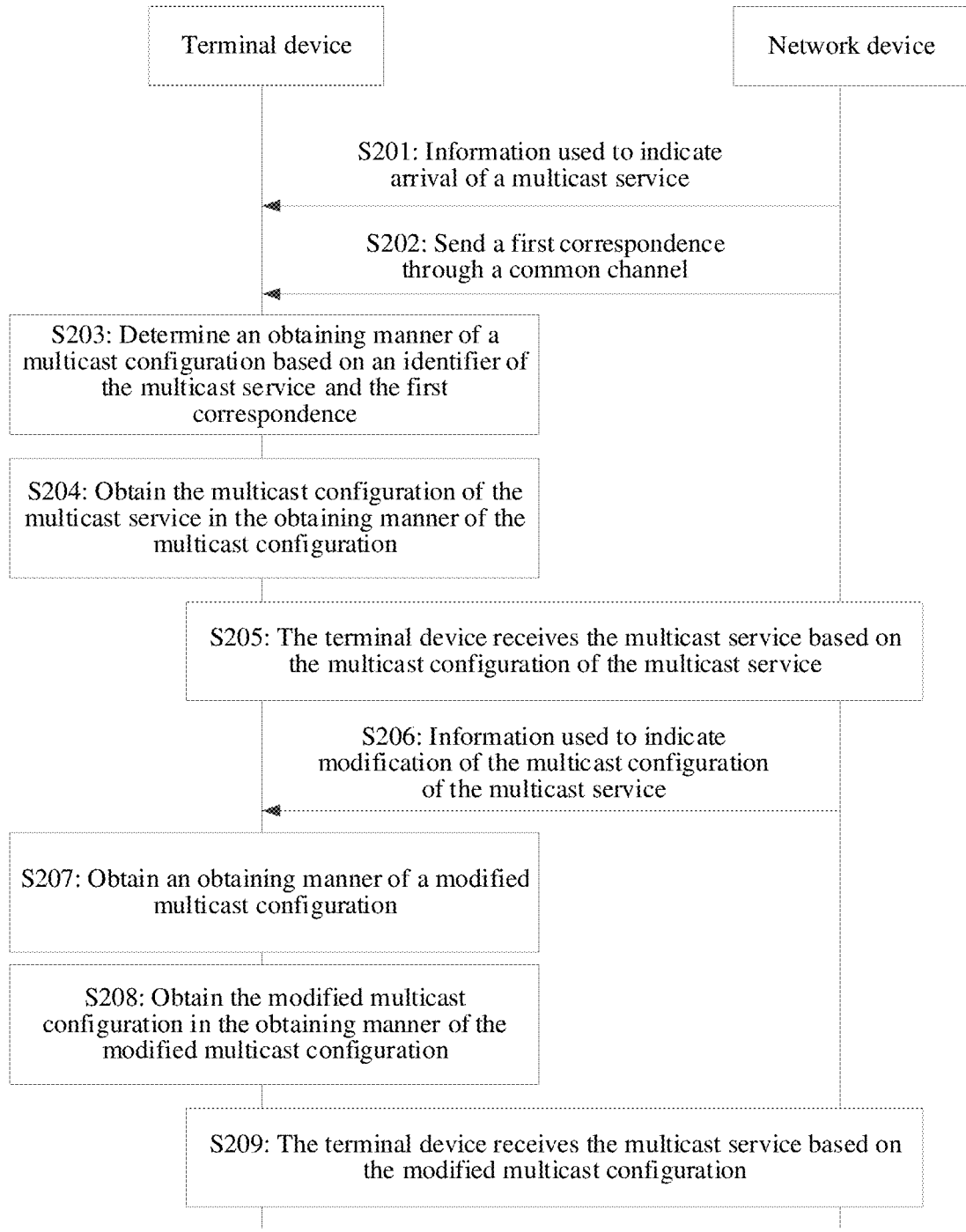
FIG. 16 is a schematic flowchart of another communication method according to an embodiment.

As shown in FIG. 16, in a communication method provided in an embodiment, a method for obtaining multicast configuration information by a terminal device may include the following steps.

S201: A network device sends information used to indicate that data of a multicast service is to be sent.

The information used to indicate that the data of the multicast service is to be sent may include information used to indicate arrival of the multicast service, information used to indicate start of the multicast service, information used to indicate that data of a multicast service is to be sent on a network side, or the like.

Correspondingly, the terminal device receives the information used to indicate arrival of the multicast service, and therefore learns that the multicast service is to arrive (or is to be sent).

The information used to indicate arrival of the multicast service may be carried in a paging message.

If the terminal device is interested in the multicast service, the terminal device determines whether multicast configuration information of the multicast service is received. If the multicast configuration information of the multicast service is not received, the terminal device needs to first obtain the multicast configuration information. On the contrary, the multicast service may be received by using an obtained unicast configuration.

For example, the network device may use the paging message to indicate arrival of the multicast service, or may use the paging message to carry the information used to indicate arrival of the multicast service.

S202: The network device sends a first correspondence through a common channel.

Correspondingly, the terminal device may obtain the first correspondence through the common channel.

The common channel herein is, for example, a broadcast channel or a multicast control channel (MCCH). It may be understood that, that the terminal device obtains the first correspondence through the broadcast channel means that the first correspondence is carried in a broadcast message, and that the terminal device obtains the first correspondence through the multicast control channel (MCCH) means that the first correspondence is carried in an RRC message corresponding to the MCCH.

The first correspondence includes a correspondence between at least one multicast service identifier and at least one multicast configuration information obtaining manner, an identifier is in the at least one multicast service identifier, and a target obtaining manner is in the at least one multicast configuration information obtaining manner. The first correspondence may be one-to-one, one-to-many, or many-to-many.

For example, the first correspondence is shown in Table 1.

It should be understood that a time sequence relationship between S201 and S202 is not limited. S202 may be performed before S201, or S202 may be performed after S201, or S201 and S202 may be performed at the same time.

S203: The terminal device determines an obtaining manner of the multicast configuration information based on an identifier of the multicast service and the first correspondence.

The identifier of the multicast service herein may be carried in the information used to indicate arrival of the multicast service in S201. After determining that the terminal device is interested in the multicast service, the terminal device may determine the obtaining manner of the multicast configuration information of the multicast service based on the identifier.

For example, the multicast configuration information obtaining manner determined by the terminal device in S203 may include at least one of the foregoing first manner to seventh manner. When the determined multicast configuration information obtaining manner includes at least two of the first manner to the seventh manner, the terminal device may determine one obtaining manner based on at least one of probabilities corresponding to different obtaining manners, level information of the terminal device, or signal quality information, to obtain the multicast configuration information in the obtaining manner. When the determined multicast configuration information obtaining manner includes one of the first manner to the seventh manner, the terminal device may obtain the multicast configuration information in the obtaining manner.

S204: The terminal device obtains the multicast configuration information of the multicast service in the obtaining manner of the multicast configuration information.

If the obtaining manner of the multicast configuration information includes obtaining the multicast configuration information of the multicast service by using unicast information, the terminal device may determine an RRC connection mode of the terminal device. If the terminal device is currently in an RRC idle mode or an RRC inactive mode, the terminal device may initiate random access to the network device and may receive the multicast configuration information of the multicast service after entering an RRC connected mode or in a random access procedure.

If the obtaining manner of the multicast configuration information is obtaining the multicast configuration information by using broadcast information (or multicast information), the terminal device may receive the multicast configuration information by using the broadcast information. In this case, the multicast configuration information obtained by the terminal device may include at least one of a PDCP layer configuration parameter, an RLC layer configuration parameter, or a G-RNTI.

If the obtaining manner of the multicast configuration information includes obtaining the multicast configuration information by using unicast information and obtaining the multicast configuration information by using broadcast information (or multicast information), the terminal device may obtain a first identifier by using the broadcast information (or the multicast information), and obtain at least one of a PDCP layer configuration parameter, an RLC layer configuration parameter, or an LCH set corresponding to the identifier of the multicast service. In addition, the multicast configuration information obtained by the terminal device by using the unicast information may include the first identifier, and include at least one of a PUCCH configuration, a PDCP status report configuration, a BWP configuration, or a DAPS configuration. The first identifier is used to indicate that the multicast configuration information obtained by using the broadcast information and a configuration obtained by using the unicast information correspond to a same multicast service.

S205: The terminal device receives the multicast service based on the multicast configuration information of the multicast service.

S206: The terminal device receives information (for example, the foregoing second information) used to indicate modification of the multicast configuration information of the multicast service.

S207: The terminal device obtains an obtaining manner of modified multicast configuration information of the multicast service.

The obtaining manner of the modified multicast configuration information may be indicated by using the information used to indicate the modification of the multicast configuration information of the multicast service, or the obtaining manner of the modified multicast configuration information may be the same as the obtaining manner determined in S203. In other words, the obtaining manner of the modified multicast configuration information may be the same as or different from the obtaining manner in which the terminal device initially obtains the multicast configuration information of the multicast service.

S208: The terminal device obtains the modified multicast configuration information in the obtaining manner of the modified multicast configuration information.

S209: The terminal device receives a modified multicast service based on the modified multicast configuration information.

It should be understood that, the procedure shown in FIG. 16 corresponds to an embodiment in which the first correspondence is carried by using the common channel, to flexibly obtain multicast configuration information in different obtaining manners.

Figure 17:
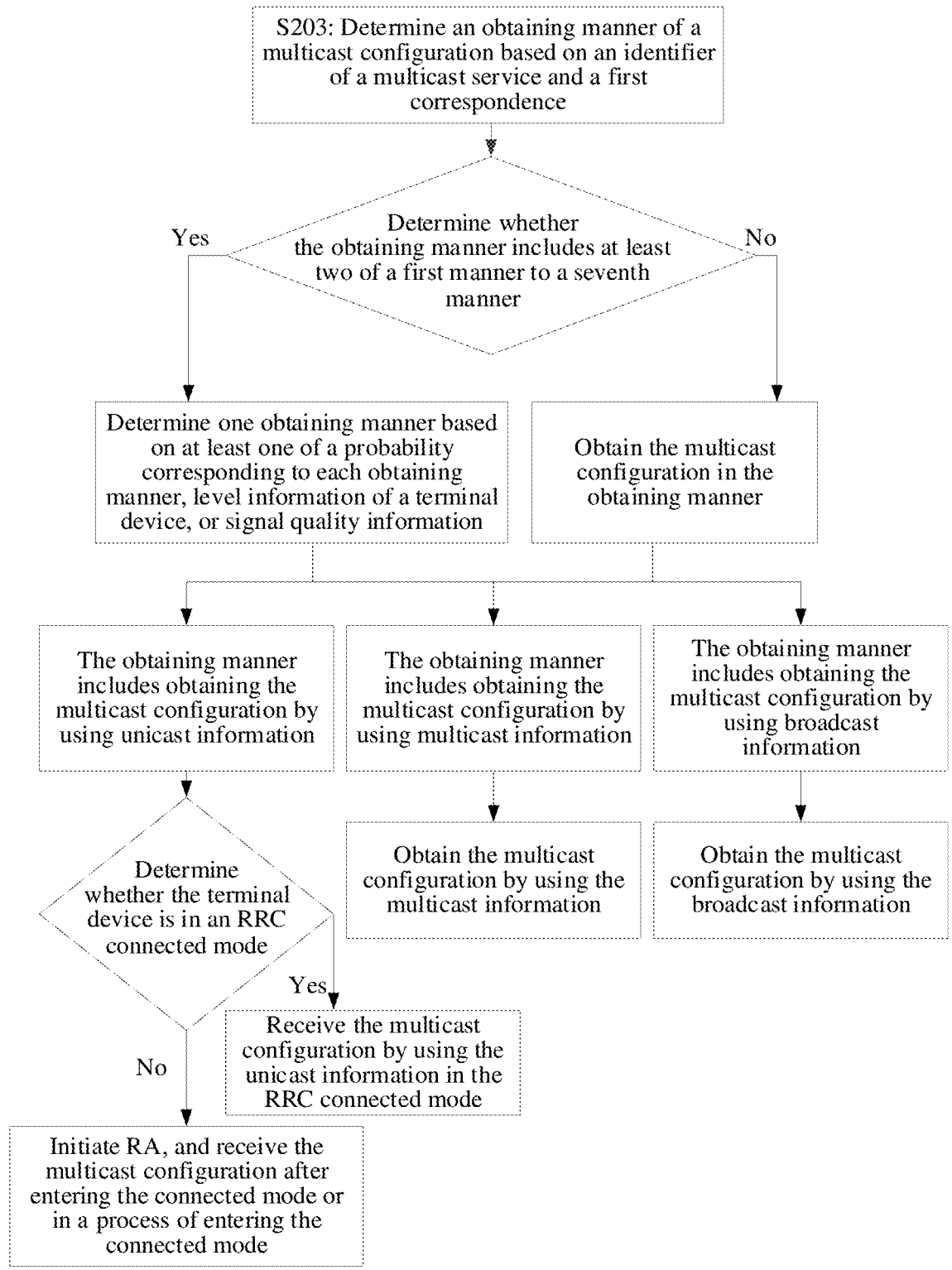
FIG. 17 is a schematic diagram of a logical architecture of a communication method according to an embodiment.

FIG. 17 is a logical block diagram of a terminal device corresponding to the procedure shown in FIG. 16. As shown in FIG. 17, when the obtaining manner that is of the multicast configuration information of the multicast service and that is determined by the terminal device in S203 includes at least two of the first manner to the seventh manner, which one of the at least two obtaining manners may be used to obtain the multicast configuration information needs to be further determined, and then the multicast configuration information is obtained in a corresponding obtaining manner. In addition, in S204, when the obtaining manner of the multicast configuration information includes the obtaining manner using the unicast information, the terminal device may determine whether the terminal device is in an RRC connected mode. If the terminal device is in the RRC connected mode, the terminal device may wait for the multicast configuration information sent by the network device by using the unicast information. Otherwise, if the terminal device is not in the RRC connected mode, the terminal device may initiate random access, and obtain the multicast configuration information when entering the RRC connected mode through random access or in a process of entering the RRC connected mode.

Figure 18:
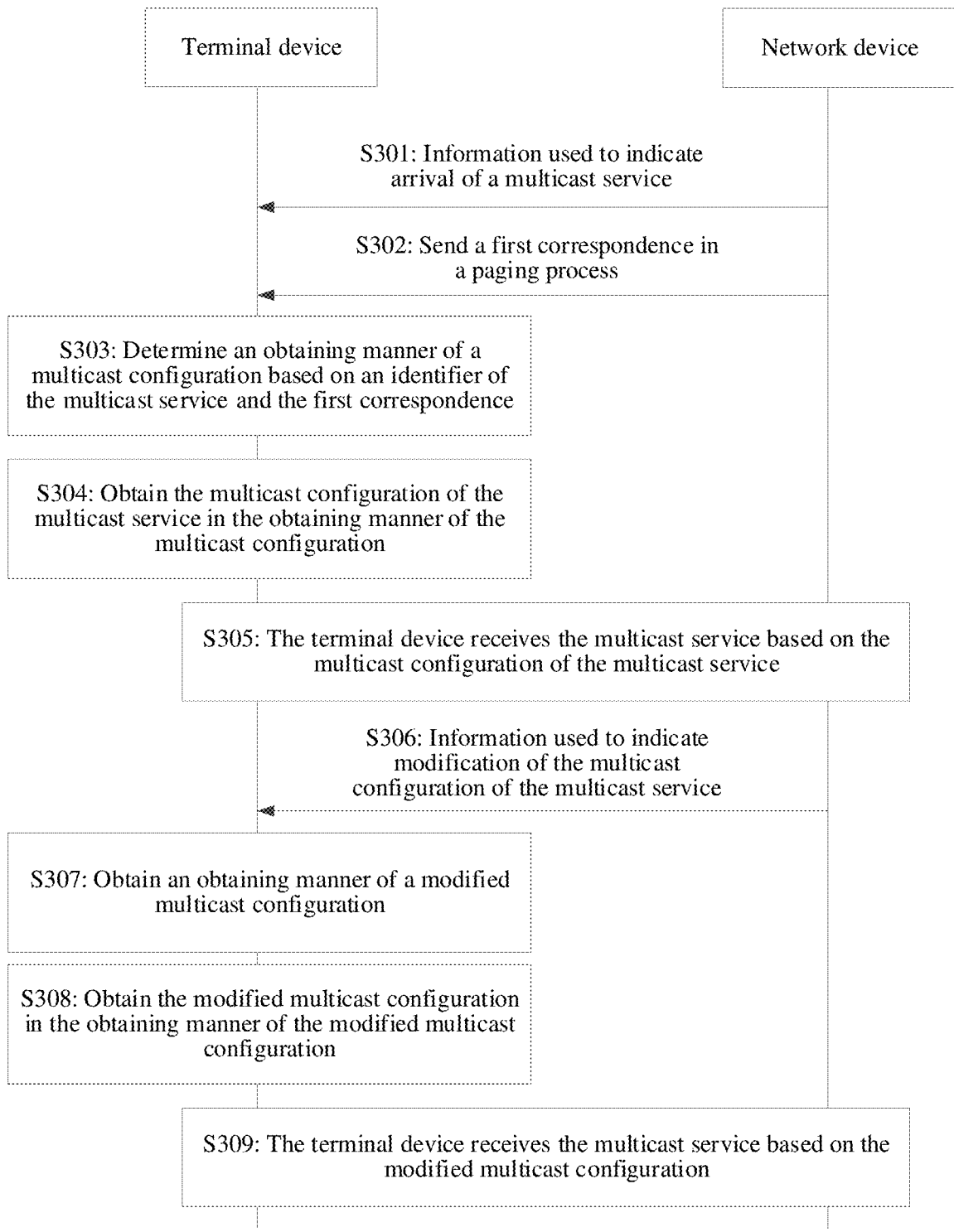
FIG. 18 is a schematic flowchart of another communication method according to an embodiment.

As shown in FIG. 18, in another communication method provided in an embodiment, a method for obtaining multicast configuration information by a terminal device may include the following steps.

S301: A network device sends information used to indicate arrival of a multicast service.

It should be understood that the information used to indicate arrival of the multicast service may also be replaced with information used to indicate that data of the multicast service is to be sent, information used to indicate start of the multicast service, information used to indicate that data of a multicast service is to be sent on a network side, or the like.

Correspondingly, the terminal device receives the information used to indicate arrival of the multicast service, and therefore learns that the multicast service is to arrive (or is to be sent).

If the terminal device is interested in the multicast service, the terminal device determines whether multicast configuration information of the multicast service is received. If the multicast configuration information of the multicast service is not received, the terminal device needs to first obtain the multicast configuration information. On the contrary, the multicast service may be received by using an obtained unicast configuration.

For example, the network device may use a paging message to indicate arrival of the multicast service, or may use a paging message to carry the information used to indicate arrival of the multicast service.

S302: The network device sends a first correspondence in a paging process.

Correspondingly, the terminal device may receive the first correspondence in the paging process.

Scheduling information may include the information used to indicate arrival of the multicast service in S301. Therefore, the network device may send the first correspondence to the terminal device when indicating that the multicast service arrives.

The first correspondence may be carried in a paging message, or carried in downlink control information from the network device, or carried in a resource indicated by downlink control information from the network device (for example, at least one of indicated PDSCH time domain, frequency domain, and space domain resources). The downlink control information is used to schedule a paging message.

The first correspondence includes a correspondence between at least one multicast service identifier and at least one multicast configuration information obtaining manner, an identifier is in the at least one multicast service identifier, and a target obtaining manner is in the at least one multicast configuration information obtaining manner. For example, the first correspondence is shown in Table 1.

S303: The terminal device determines an obtaining manner of the multicast configuration information based on an identifier of the multicast service and the first correspondence.

The identifier of the multicast service herein may be carried in the information used to indicate arrival of the multicast service in S301. After determining that the terminal device is interested in the multicast service, the terminal device may determine the obtaining manner of the multicast configuration information of the multicast service based on the identifier.

For example, the multicast configuration information obtaining manner determined by the terminal device in S303 may include at least one of the foregoing first manner to seventh manner. When the determined multicast configuration information obtaining manner includes at least two of the first manner to the seventh manner, the terminal device may determine one obtaining manner based on at least one of probabilities corresponding to different obtaining manners, level information of the terminal device, or signal quality information, to obtain the multicast configuration information in the obtaining manner. When the determined multicast configuration information obtaining manner includes one of the first manner to the seventh manner, the terminal device may obtain the multicast configuration information in the obtaining manner.

S304: The terminal device obtains the multicast configuration information of the multicast service in the obtaining manner of the multicast configuration information.

If the obtaining manner of the multicast configuration information includes obtaining the multicast configuration information of the multicast service by using unicast information, the terminal device may determine an RRC connection mode of the terminal device. If the terminal device is currently in an RRC idle mode or an RRC inactive mode, the terminal device may initiate random access to the network device, and receive the multicast configuration information of the multicast service after entering an RRC connected mode or in a random access procedure.

If the obtaining manner of the multicast configuration information is obtaining the multicast configuration information by using broadcast information (or multicast information), the terminal device may receive the multicast configuration information by using the broadcast information. In this case, the multicast configuration information obtained by the terminal device may include at least one of a PDCP layer configuration parameter, an RLC layer configuration parameter, or a G-RNTI.

If the obtaining manner of the multicast configuration information includes obtaining the multicast configuration information by using unicast information and obtaining the multicast configuration information by using broadcast information (or multicast information), the terminal device may obtain a first identifier by using the broadcast information (or the multicast information), and obtain at least one of a PDCP layer configuration parameter, an RLC layer configuration parameter, or an LCH set corresponding to the identifier of the multicast service. In addition, the multicast configuration information obtained by the terminal device by using the unicast information may include the first identifier, and include at least one of a PUCCH configuration, a PDCP status report configuration, a BWP configuration, or a DAPS configuration. The first identifier is used to indicate that the multicast configuration information obtained by using the broadcast information and a configuration obtained by using the unicast information correspond to a same multicast service.

In addition, if the obtaining manner of the multicast configuration information includes the fourth manner, the sixth manner, or the seventh manner, that is, the manner in which the terminal device receives the multicast configuration information includes obtaining the multicast configuration information by using the unicast information, and includes obtaining the multicast configuration information by using the multicast information and/or the broadcast information, an RRC connection mode in which the terminal device obtains the multicast configuration information by using the multicast information and/or the broadcast information may be an RRC connected mode, an RRC idle mode, or an RRC inactive mode, and the terminal device needs to be in the RRC connected mode when obtaining the multicast configuration information by using the unicast information.

S305: The terminal device receives the multicast service based on the multicast configuration information of the multicast service.

S306: The terminal device receives information (for example, the foregoing second information) used to indicate modification of the multicast configuration information of the multicast service.

S307: The terminal device obtains an obtaining manner of modified multicast configuration information of the multicast service.

The obtaining manner of the modified multicast configuration information may be indicated by using the information used to indicate the modification of the multicast configuration information of the multicast service, or the obtaining manner of the modified multicast configuration information may be the same as the obtaining manner determined in S303. In other words, the obtaining manner of the modified multicast configuration information may be the same as or different from the obtaining manner in which the terminal device initially obtains the multicast configuration information of the multicast service.

S308: The terminal device obtains the modified multicast configuration information in the obtaining manner of the modified multicast configuration information.

S309: The terminal device receives a modified multicast service based on the modified multicast configuration information.

It should be understood that, the procedure shown in FIG. 18 corresponds to an embodiment in which the first correspondence is carried by using the scheduling information (for example, DCI) of the paging message, to flexibly obtain multicast configuration information in different obtaining manners.

Figure 19A:
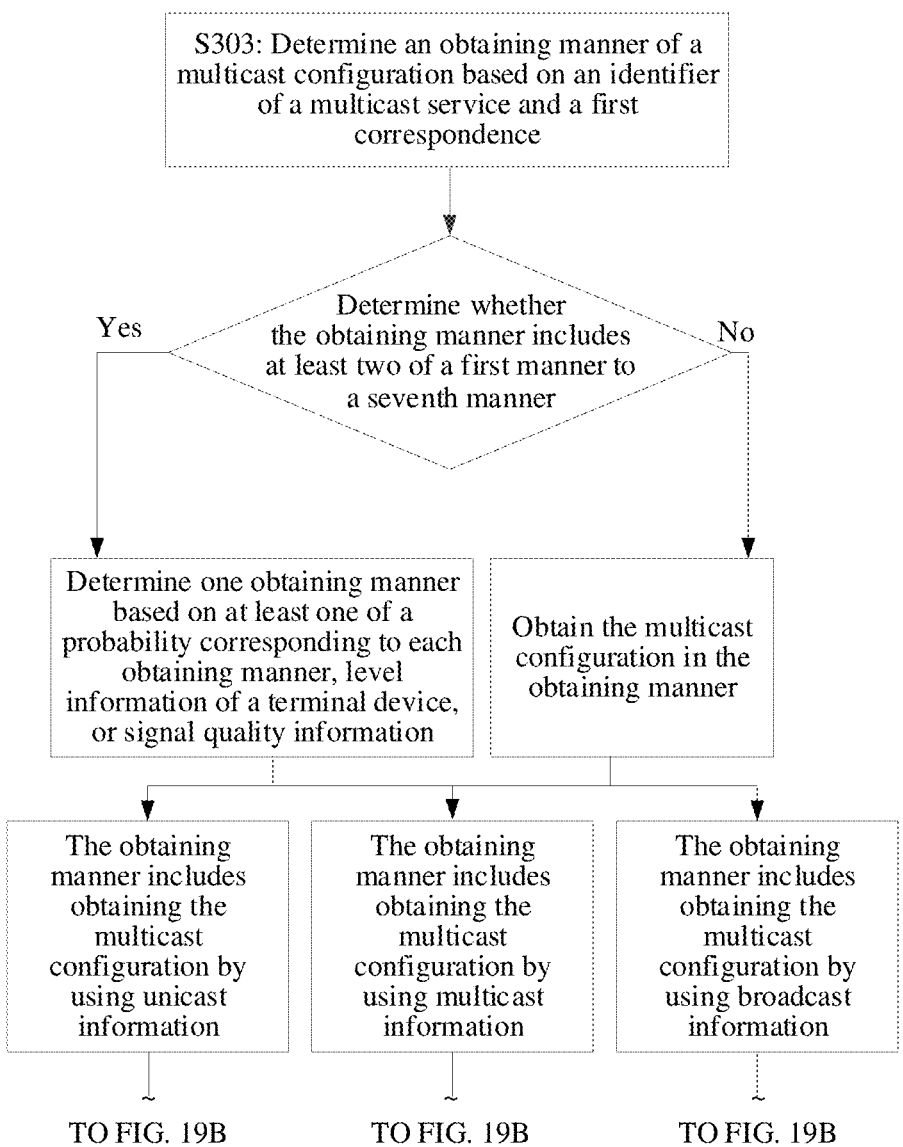
FIG. 19A and FIG. 19B are a schematic diagram of a logical architecture of a communication method according to an embodiment.
Figure 19B:
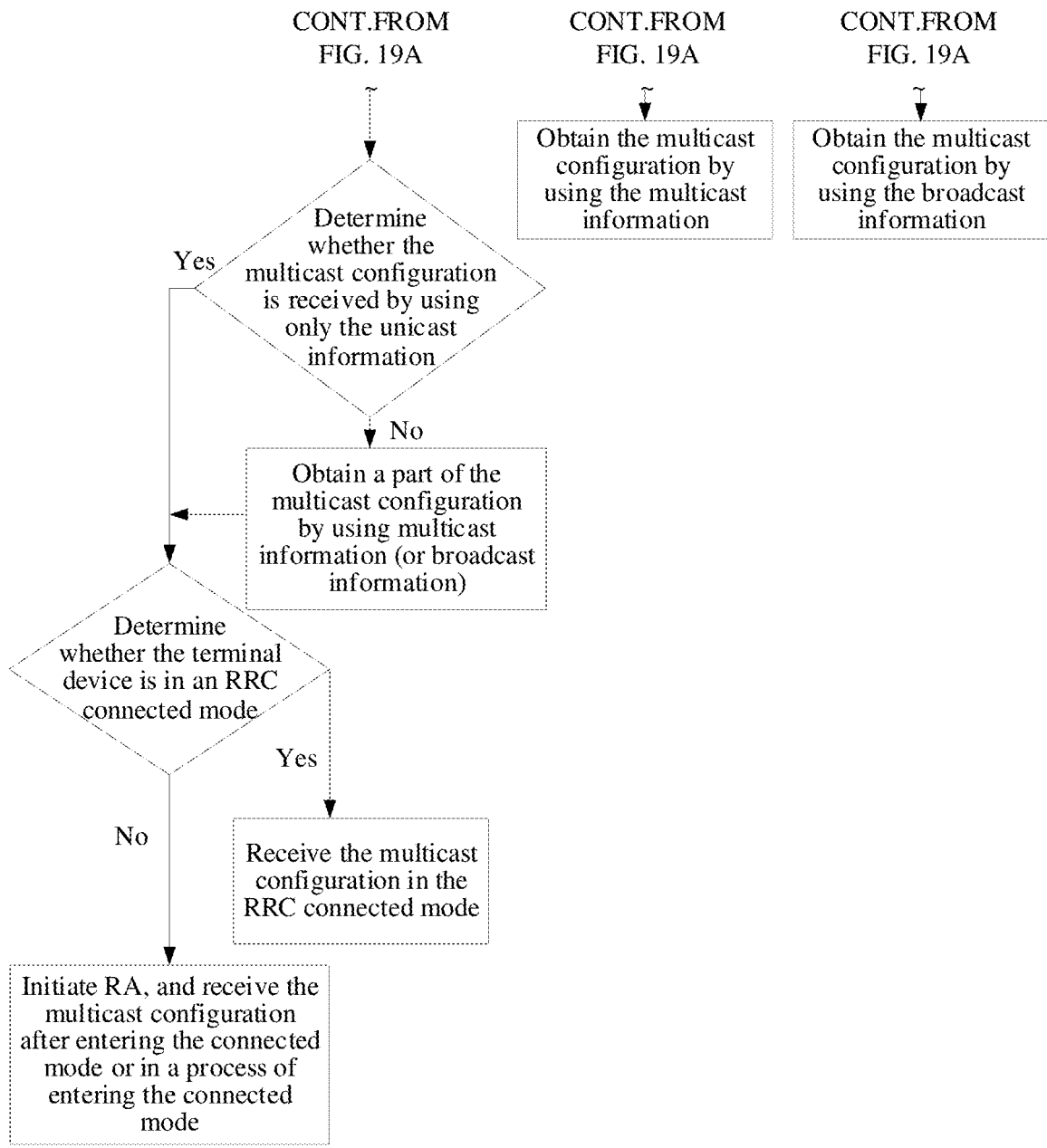

FIG. 19A and FIG. 19B are a logical block diagram corresponding to the procedure shown in FIG. 18. As shown in FIG. 19A and FIG. 19B, when the obtaining manner that is of the multicast configuration information of the multicast service and that is determined by the terminal device in S303 includes at least two of the first manner to the seventh manner, which one of the at least two obtaining manners may be used to obtain the multicast configuration information needs to be further determined, and then the multicast configuration information is obtained in a corresponding obtaining manner. In addition, in S304, when the obtaining manner of the multicast configuration information includes obtaining the multicast configuration information by using the unicast information and obtaining the multicast configuration information by using the multicast information and/or the broadcast information, the terminal device may receive the multicast configuration information sent by using the multicast information and/or the broadcast information (an RRC connection mode in which the multicast configuration information sent by using the multicast information and/or the broadcast information is received is not limited, and may be an RRC connected mode, an RRC idle mode, or an RRC inactive mode), and receive, in a connected mode, the multicast configuration information sent by using the unicast information. In addition, when the obtaining manner of the multicast configuration information is obtaining the multicast configuration information by using the unicast information, the terminal device may receive, in a connected mode, the multicast configuration information sent by using the unicast information. When receiving, in the connected mode, the multicast configuration information sent by using the unicast information, the terminal device may determine whether the terminal device is in the RRC connected mode. If the terminal device is in the RRC connected mode, the terminal device may wait for the multicast configuration information sent by the network device by using the unicast information. Otherwise, if the terminal device is not in the RRC connected mode (the terminal device is in the RRC idle mode or the RRC inactive mode), the terminal device may initiate random access, and obtain the multicast configuration information when entering the RRC connected mode through random access or in a process of entering the RRC connected mode.

Figure 20:
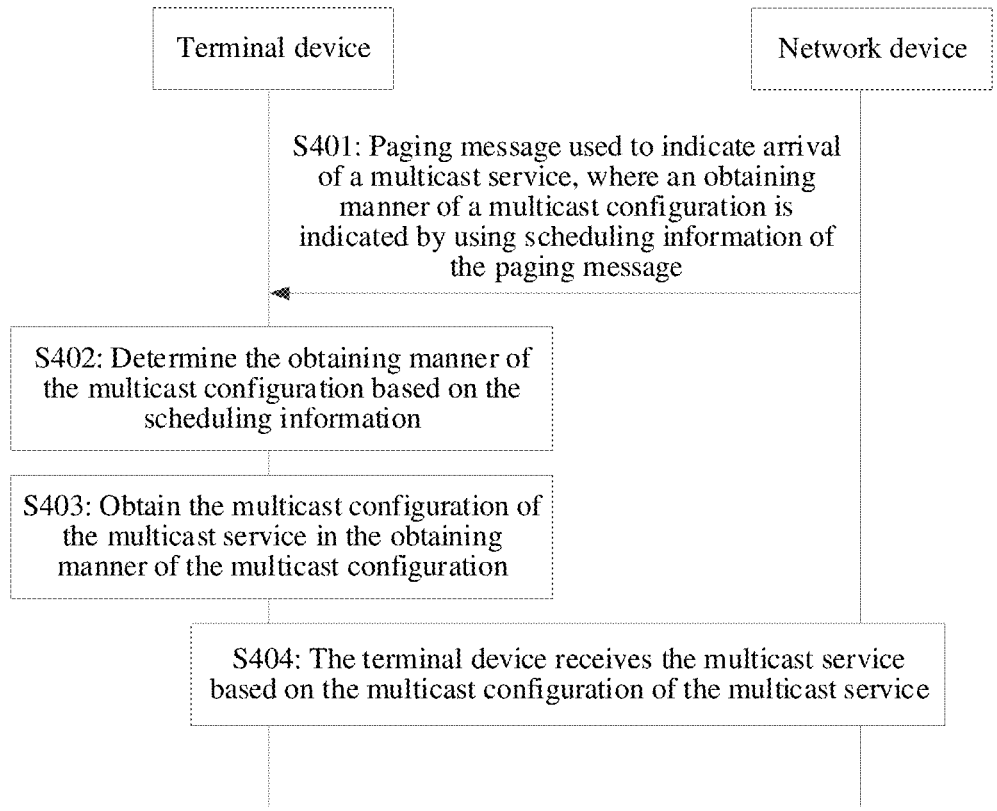
FIG. 20 is a schematic flowchart of another communication method according to an embodiment.

As shown in FIG. 20, in another communication method provided in an embodiment, a method for obtaining multicast configuration information by a terminal device may include the following steps.

S401: A network device sends a paging message used to indicate arrival of a multicast service and indicates an obtaining manner of multicast configuration information of the multicast service by using scheduling information (that is, first DCI) of the paging message.

The paging message may include information used to indicate arrival of the multicast service. It should be understood that the information used to indicate arrival of the multicast service may also be replaced with information used to indicate that data of the multicast service is to be sent, information used to indicate start of the multicast service, information used to indicate that data of a multicast service is to be sent on a network side, or the like.

Correspondingly, the terminal device receives the information used to indicate arrival of the multicast service, and therefore learns that the multicast service is to arrive (or is to be sent).

If the terminal device is interested in the multicast service, the terminal device determines whether multicast configuration information of the multicast service is received. If the multicast configuration information of the multicast service is not received, the terminal device needs to first obtain the multicast configuration information. On the contrary, the multicast service may be received by using an obtained unicast configuration.

For example, the network device may use a paging message to indicate arrival of the multicast service or may use a paging message to carry the information used to indicate arrival of the multicast service.

In an implementation, the scheduling information may carry indication information of the obtaining manner of the multicast configuration information, for example, 1-bit (or more) indication information.

In another implementation, the obtaining manner of the multicast configuration information may be determined based on a time-frequency resource that carries the scheduling information. For example, the terminal device may obtain a second correspondence, and the second correspondence is a correspondence between at least one time-frequency resource and a multicast configuration information obtaining manner. When the scheduling information is carried on a first time-frequency resource, the terminal device may determine, by using the second correspondence, a target obtaining manner corresponding to the first time-frequency resource.

S402: If the terminal device is interested in the multicast service, the terminal device determines the obtaining manner of the multicast configuration information based on the scheduling information.

If the obtaining manner of the multicast configuration information includes obtaining the multicast configuration information of the multicast service by using unicast information, the terminal device may determine an RRC connection mode of the terminal device. If the terminal device is currently in an RRC idle mode or an RRC inactive mode, the terminal device may initiate random access to the network device and may receive the multicast configuration information of the multicast service after entering an RRC connected mode or in a random access procedure.

If the obtaining manner of the multicast configuration information is obtaining the multicast configuration information by using broadcast information (or multicast information), the terminal device may receive the multicast configuration information by using the broadcast information. In this case, the multicast configuration information obtained by the terminal device may include at least one of a PDCP layer configuration parameter, an RLC layer configuration parameter, or a G-RNTI.

If the obtaining manner of the multicast configuration information includes obtaining the multicast configuration information by using unicast information and obtaining the multicast configuration information by using broadcast information (or multicast information), the terminal device may obtain a first identifier by using the broadcast information (or the multicast information), and obtain at least one of a PDCP layer configuration parameter, an RLC layer configuration parameter, or an LCH set corresponding to the identifier of the multicast service. In addition, the multicast configuration information obtained by the terminal device by using the unicast information may include the first identifier, and include at least one of a PUCCH configuration, a PDCP status report configuration, a BWP configuration, or a DAPS configuration. The first identifier is used to indicate that the multicast configuration information obtained by using the broadcast information and a configuration obtained by using the unicast information correspond to a same multicast service.

In addition, if the obtaining manner of the multicast configuration information includes the fourth manner, the sixth manner, or the seventh manner, that is, the manner in which the terminal device receives the multicast configuration information includes obtaining the multicast configuration information by using the unicast information, and includes obtaining the multicast configuration information by using the multicast information and/or the broadcast information, an RRC connection mode in which the terminal device obtains the multicast configuration information by using the multicast information and/or the broadcast information may be an RRC connected mode, an RRC idle mode, or an RRC inactive mode, and the terminal device needs to be in the RRC connected mode when obtaining the multicast configuration information by using the unicast information.

S403: The terminal device obtains the multicast configuration information in the obtaining manner of the multicast configuration information.

S404: The terminal device receives the multicast service based on the multicast configuration information of the multicast service.

Then, for example, S206 to S208 or S306 to S308 may be further performed to obtain modified multicast configuration information.

It should be understood that the procedure shown in FIG. 20 corresponds to an embodiment in which the information used to indicate arrival of the multicast service is carried in the paging message and the scheduling information of the paging message is used to indicate the obtaining manner of the multicast configuration information of the multicast service, to flexibly obtain multicast configuration information in different obtaining manners.

The following describes communication apparatuses for implementing the foregoing methods in the embodiments with reference to the accompanying drawings. Therefore, all the foregoing content may be used in the following embodiments. Repeated content is not described again.

Figure 21:
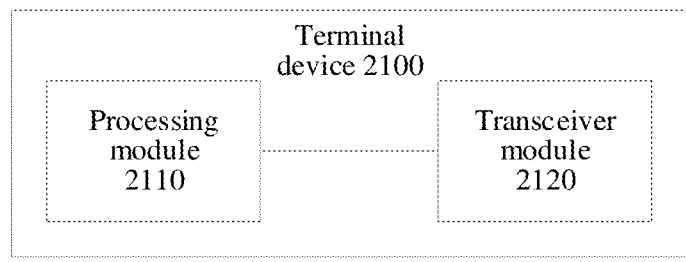
FIG. 21 is a schematic diagram of a structure of a communication apparatus according to an embodiment.

FIG. 21 is a schematic block diagram of a communication apparatus according to an embodiment. For example, the communication apparatus is a terminal device 2100 shown in FIG. 21.

The terminal device 2100 includes a processing module 2110 and a transceiver module 2120. For example, the terminal device 2100 may be a terminal device, or may be a chip used in the terminal device, or another combined device, component, or the like that has a function of the terminal device. When the terminal device 2100 is a terminal device, the transceiver module 2120 may be a transceiver, and the transceiver may include an antenna, a radio frequency circuit, and the like; and the processing module 2110 may be a processor, for example, a baseband processor, and the baseband processor may include one or more central processing units (central processing unit, CPU). When the terminal device 2100 is a component having the function of the terminal device, the transceiver module 2120 may be a radio frequency unit, and the processing module 2110 may be a processor, for example, a baseband processor. When the terminal device 2100 is a chip system, the transceiver module 2120 may be an input/output interface of a chip (for example, a baseband chip), and the processing module 2110 may be a processor of the chip system and may include one or more central processing units. It should be understood that the processing module 2110 in this embodiment may be implemented by a processor or a processor-related circuit component, and the transceiver module 2120 may be implemented by a transceiver or a transceiver-related circuit component.

For example, the processing module 2110 may be configured to perform all operations such as S101, S102, S203, S204, S207, S208, S303, S304, S307, S308, S402, and S403 other than sending and receiving operations performed by the terminal device in the embodiment shown in any one of FIG. 14 and FIG. 16 to FIG. 20, and/or configured to support another process of the technology described in the embodiments, for example, generate a message, information, and/or signaling to be sent by the transceiver module 2120, and process a message, information, and/or signaling received by the transceiver module 2120. The transceiver module 2120 may be configured to perform all receiving and sending operations such as S104, S201, S202, S205, S206, S209, S301, S302, S305, S306, S309, S401, and S404 performed by the terminal device in the embodiment shown in any one of FIG. 14 and FIG. 16 to FIG. 20, and/or configured to support another process of the technology described in the embodiments.

In addition, the transceiver module 2120 may be one function module, and the function module can complete both a sending operation and a receiving operation. For example, the transceiver module 2120 may be configured to perform all sending operations and receiving operations performed by the terminal device in the embodiment shown in any one of FIG. 14 and FIG. 16 to FIG. 20. For example, when performing a sending operation, the transceiver module 2120 may be considered as a sending module, and when performing a receiving operation, the transceiver module 2120 may be considered as a receiving module. Alternatively, the transceiver module 2120 may be two function modules. The transceiver module 2120 may be considered as a general term of the two function modules. The two function modules are a sending module and a receiving module. The sending module is configured to complete a sending operation. For example, the sending module may be configured to perform all sending operations performed by the terminal device in the embodiment shown in any one of FIG. 14 and FIG. 16 to FIG. 20. The receiving module is configured to complete a receiving operation. For example, the receiving module may be configured to perform all receiving operations performed by the terminal device in any embodiment in FIG. 14 and FIG. 16 to FIG. 20.

The processing module 2110 may obtain first information and may determine a target obtaining manner based on the first information. The target obtaining manner is used to obtain multicast configuration information, the multicast configuration information is used to receive a multicast service, and the first information includes at least one of an identifier of the multicast service, probabilities corresponding to different obtaining manners, level information of the terminal device, indication information of the target obtaining manner, information used to indicate that data of the multicast service is to be sent, or signal quality information. The transceiver module 2120 may obtain the multicast configuration information in the obtaining manner of the multicast configuration information, where the obtaining manner of the multicast configuration information includes one of a first manner, a second manner, a third manner, a fourth manner, a fifth manner, a sixth manner, or a seventh manner.

The first manner includes obtaining the multicast configuration information by receiving unicast information. The second manner includes obtaining the multicast configuration information by receiving multicast information. The third manner includes obtaining the multicast configuration information by receiving broadcast information. The fourth manner includes obtaining the multicast configuration information in two sub-manners: receiving unicast information and receiving multicast information. The fifth manner includes obtaining the multicast configuration information in two sub-manners: receiving multicast information and receiving broadcast information. The sixth manner includes obtaining the multicast configuration information in two sub-manners: receiving unicast information and receiving broadcast information. The seventh manner includes obtaining the multicast configuration information in three sub-manners: receiving unicast information, receiving multicast information, and receiving broadcast information.

The first information may include the identifier of the multicast service and the level information, and the processing module 2110 may determine that obtaining manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target obtaining manner from the eighth manner and the ninth manner based on the level information.

The first information may include the identifier of the multicast service, a probability of an eighth manner, and a probability of a ninth manner, and the processing module 2110 may determine that obtaining manners corresponding to the identifier include the eighth manner and the ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target obtaining manner from the eighth manner and the ninth manner based on the probability of the eighth manner and the probability of the ninth manner.

The first information may include the identifier of the multicast service and the signal quality information, and the processing module 2110 may determine that obtaining manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target obtaining manner from the eighth manner and the ninth manner based on the signal quality information.

The terminal device may obtain, based on a first correspondence, the target obtaining manner corresponding to the identifier, where the first correspondence includes a correspondence between at least one multicast service identifier and at least one multicast configuration information obtaining manner, the identifier is in the at least one multicast service identifier, and the target obtaining manner is in the at least one multicast configuration information obtaining manner.

The transceiver module 2120 may receive the first correspondence and/or the identifier of the multicast service from a network device.

The first correspondence may be carried in a SIB, an MCCH, a PDSCH message for paging, or a NAS message.

The transceiver module 2120 may receive third information from the network device, where the third information includes the indication information of the target obtaining manner.

The third information may further indicate the identifier of the multicast service.

The third information may be carried in first downlink control information from the network device, and the first downlink control information may be used to schedule a paging message; or the third information may be carried in a paging message from the network device.

The first information may include the information used to indicate that the data of the multicast service is to be sent, and the processing module 2110 may determine, based on a second correspondence, the target obtaining manner corresponding to a first time-frequency resource, where first downlink control information is transmitted by using the first time-frequency resource, the second correspondence is a correspondence between at least one time-frequency resource and at least one multicast configuration information obtaining manner, the first time-frequency resource is in the at least one time-frequency resource, and the target obtaining manner is in the at least one multicast configuration information obtaining manner; or determine, based on a third correspondence, the target obtaining manner corresponding to a first RNTI, where the first RNTI is an RNTI used to scramble first downlink control information, the third correspondence is a correspondence between at least one RNTI and at least one multicast configuration information obtaining manner, the first RNTI is in the at least one RNTI, and the target obtaining manner is in the at least one multicast configuration information obtaining manner. The first downlink control information is used to schedule a paging message, and the paging message includes the information used to indicate that the data of the multicast service is to be sent.

When the target obtaining manner includes the fourth manner, the fifth manner, the sixth manner, or the seventh manner, different pieces of configuration information obtained in sub-manners of the target obtaining manner may be different in at least one item. A configuration obtained in a sub-manner of each obtaining manner includes at least one of a G-RNTI, the identifier of the multicast service, a PDCP layer configuration parameter, an RLC layer configuration parameter, a logical channel set corresponding to the identifier of the multicast service, a first identifier, a PUCCH configuration, a PDCP status report configuration, a BWP configuration, and a DAPS configuration. The first identifier is used to associate different pieces of multicast configuration information separately obtained in different sub-manners.

Configuration information obtained in each sub-manner may include the first identifier.

The processing module 2110 may determine that the terminal device is in an RRC idle mode or an RRC inactive mode.

The transceiver module 2120 may further receive information used to indicate modification of the multicast configuration information; obtain modified multicast configuration information of the multicast service; and receive the multicast service based on the modified multicast configuration information.

The processing module 2110 may determine an obtaining manner of the modified multicast configuration information based on fourth information or fifth information, where the fourth information includes the first information; and the fifth information includes information from the network device.

Figure 22:
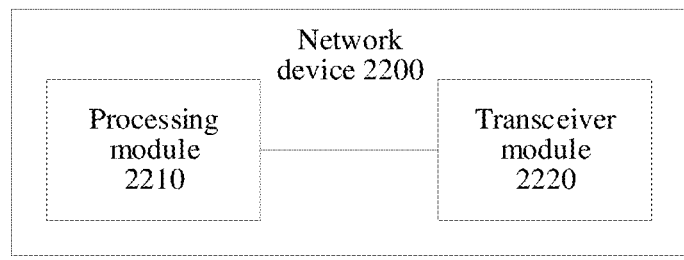
FIG. 22 is a schematic diagram of a structure of another communication apparatus according to an embodiment.

FIG. 22 is a schematic block diagram of another communication apparatus according to an embodiment. For example, the communication apparatus is a network device 2200.

The network device 2200 may include a processing module 2210 and a transceiver module 2220. For example, the network device 2200 may be the shown network device or may be a chip used in the network device, or another combined device, component, or the like that has a function of the network device. When the network device 2200 is a network device, the transceiver module 2220 may be a transceiver, and the transceiver may include an antenna, a radio frequency circuit, and the like; and the processing module 2210 may be a processor, and the processor may include one or more CPUs. When the network device 2200 is a component having the function of the network device, the transceiver module 2220 may be a radio frequency unit, and the processing module 2210 may be a processor, for example, a baseband processor. When the network device 2200 is a chip system, the transceiver module 2220 may be an input/output interface of a chip (for example, a baseband chip), and the processing module 2210 may be a processor of the chip system, and may include one or more central processing units. It should be understood that the processing module 2210 in this embodiment may be implemented by a processor or a processor-related circuit component, and the transceiver module 2220 may be implemented by a transceiver or a transceiver-related circuit component.

For example, the processing module 2210 may be configured to perform all operations other than sending and receiving operations performed by the network device in any embodiment shown in FIG. 14 or FIG. 16 to FIG. 20, for example, perform S302, or for another example, generate a message, information, and/or signaling to be sent by the transceiver module 2220, and/or process a message, information, and/or signaling received by the transceiver module 2220; and/or support another process of the technology described in the embodiments. The transceiver module 2220 may be configured to perform all receiving operations such as S101, S102, S201, S202, S301, and S401 performed by the network device in any embodiment shown in FIG. 14 or FIG. 16 to FIG. 20, and/or configured to support another process of the technology described in the embodiments, for example, receive a CSI report from a terminal device.

In addition, the transceiver module 2220 may be one function module, and the function module can complete both a sending operation and a receiving operation. For example, the transceiver module 2220 may be configured to perform all sending operations and receiving operations performed by the network device in any embodiment shown in FIG. 3 or FIG. 5 to FIG. 22. For example, when performing a sending operation, the transceiver module 2220 may be considered as a sending module, and when performing a receiving operation, the transceiver module 2220 may be considered as a receiving module. Alternatively, the transceiver module 2220 may be two function modules. The transceiver module 2220 may be considered as a general term of the two function modules. The two function modules are a sending module and a receiving module. The sending module is configured to complete a sending operation. For example, the sending module may be configured to perform all sending operations performed by the network device in any embodiment shown in FIG. 3 or FIG. 5 to FIG. 22. The receiving module is configured to complete a receiving operation. For example, the receiving module may be configured to perform all receiving operations performed by the network device in any embodiment shown in FIG. 3 or FIG. 5 to FIG. 7.

The processing module 2210 may obtain first information and may determine a target sending manner based on the first information. The transceiver module 2220 sends multicast configuration information in the target sending manner. The multicast configuration information is used by a terminal device to receive a multicast service. The first information includes at least one of an identifier of the multicast service, level information of the terminal device, indication information of the target sending manner, information used to indicate that data of the multicast service is to be sent, or signal quality information. The target sending manner includes at least one of a first manner, a second manner, a third manner, a fourth manner, a fifth manner, a sixth manner, or a seventh manner.

The first manner includes sending the multicast configuration information by using unicast information. The second manner includes sending the multicast configuration information by using multicast information. The third manner includes sending the multicast configuration information by using broadcast information. The fourth manner includes sending the multicast configuration information in two sub-manners: using unicast information and using multicast information. The fifth manner includes sending the multicast configuration information in two sub-manners: using multicast information and using broadcast information. The sixth manner includes sending the multicast configuration information in two sub-manners: using unicast information and using broadcast information. The seventh manner includes sending the multicast configuration information in three sub-manners: using unicast information, using multicast information, and using broadcast information.

The first information may include the identifier of the multicast service and the level information, and the processing module 2210 may determine that sending manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target sending manner from the eighth manner and the ninth manner based on the level information.

The first information may include the identifier of the multicast service and the signal quality information, and the processing module 2210 may determine that sending manners corresponding to the identifier include an eighth manner and a ninth manner, where the eighth manner and the ninth manner each are one of the first manner, the second manner, the third manner, the fourth manner, the fifth manner, the sixth manner, and the seventh manner, and the eighth manner is different from the ninth manner; and determine the target sending manner from the eighth manner and the ninth manner based on the signal quality information.

The first information may include the identifier of the multicast service, and the processing module 2210 may obtain, based on a first correspondence, the target sending manner corresponding to the identifier, where the first correspondence includes a correspondence between at least one multicast service identifier and at least one multicast configuration information sending manner, the identifier is in the at least one multicast service identifier, and the target sending manner is in the at least one multicast configuration information sending manner.

The transceiver module 2220 may send the first correspondence and/or the identifier of the multicast service.

The first correspondence may be carried in a SIB, an MCCH, a PDSCH message, or a NAS message.

The transceiver module 2220 may further send third information, where the third information includes indication information of a target obtaining manner, and the obtaining manner is corresponding to the sending manner.

The third information may further indicate the identifier of the multicast service.

The third information may be carried in first downlink control information, and the first downlink control information may be used to schedule a paging message; or the third information may be carried in a paging message.

The processing module 2210 may determine, based on a second correspondence, first downlink control information corresponding to the target sending manner, and the transceiver module 2220 may send the first downlink control information by using a first time-frequency resource. The second correspondence is a correspondence between at least one time-frequency resource and at least one multicast configuration information sending manner, the first time-frequency resource is in the at least one time-frequency resource, and the target sending manner is in the at least one multicast configuration information sending manner. Alternatively, the processing module 2210 may send first downlink control information scrambled by using a first RNTI, where a third correspondence is a correspondence between at least one RNTI and at least one multicast configuration information sending manner, the first RNTI is in the at least one RNTI, and the target sending manner is in the at least one multicast configuration information sending manner. The first downlink control information is used to schedule a paging message, and the paging message includes the information used to indicate that the data of the multicast service is to be sent.

When the target sending manner includes the fourth manner, the fifth manner, the sixth manner, or the seventh manner, different pieces of configuration information sent in sub-manners of the target sending manner may be different in at least one item. A configuration sent in a sub-manner of each sending manner includes at least one of a G-RNTI, the identifier of the multicast service, a PDCP layer configuration parameter, an RLC layer configuration parameter, a logical channel set corresponding to the identifier of the multicast service, a first identifier, a PUCCH configuration, a PDCP status report configuration, a BWP configuration, and a DAPS configuration. The first identifier is used to associate different pieces of multicast configuration information separately sent in different sub-manners.

Multicast configuration information sent in each sub-manner may include the first identifier.

The transceiver module 2220 may send information used to indicate modification of the multicast configuration information and may send modified multicast configuration information of the multicast service.

The processing module 2210 may determine a sending manner of the modified multicast configuration information based on fourth information or fifth information, where the fourth information includes the first information.

The transceiver module 2220 may send fifth information, where the fifth information is used to indicate an obtaining manner of the modified multicast configuration information.

An embodiment may further provide a communication apparatus. The communication apparatus may be a terminal device or may be a circuit. The communication apparatus may be configured to perform an action performed by the terminal device in the foregoing method embodiments.

Figure 23:
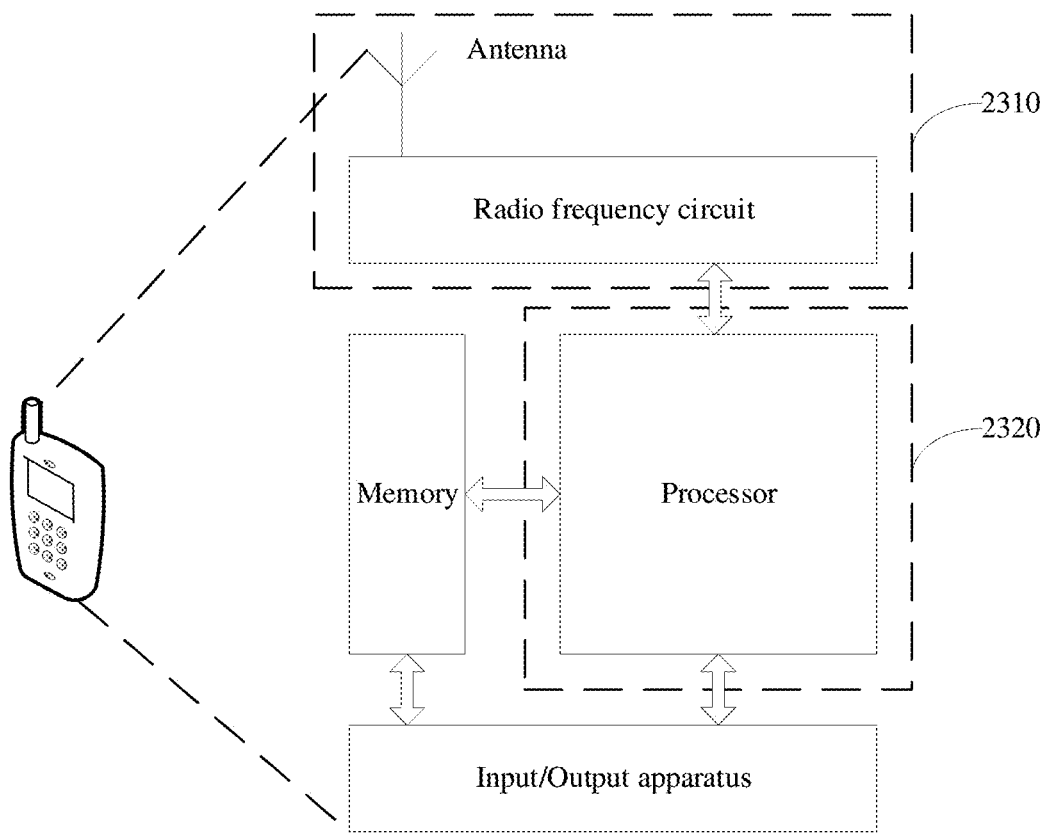
FIG. 23 is a schematic diagram of a structure of another communication apparatus according to an embodiment.

When the communication apparatus is a terminal device, FIG. 23 is a simplified schematic diagram of a structure of a terminal device. For ease of understanding and illustration, an example in which the terminal device is a mobile phone is used in FIG. 23. As shown in FIG. 23, the terminal device includes a processor, a memory, a radio frequency circuit, an antenna, and an input/output apparatus. The processor may be configured to: process a communication protocol and communication data, control the terminal device, execute a software program, process data of the software program, and the like. The memory may be configured to store the software program and data. The radio frequency circuit may be configured to: perform conversion between a baseband signal and a radio frequency signal and process the radio frequency signal. The antenna may be configured to receive/send a radio frequency signal in a form of an electromagnetic wave. The input/output apparatus, such as a touchscreen, a display, or a keyboard, may be configured to: receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 23 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments.

In this embodiment, the antenna and the radio frequency circuit that have receiving and sending functions may be considered as a transceiver unit of the terminal device (where the transceiver unit may be one function unit, and the function unit can implement a sending function and a receiving function; or the transceiver unit may include two function units: a receiving unit that can implement a receiving function and a sending unit that can implement a sending function), and the processor that has a processing function may be considered as a processing unit of the terminal device. As shown in FIG. 23, the terminal device includes a transceiver unit 2310 and a processing unit 2320. The transceiver unit may also be referred to as a transceiver machine, a transceiver, a transceiver apparatus, or the like. The processing unit may also be referred to as a processor, a processing board, a processing module, a processing apparatus, or the like. Optionally, a component for implementing the receiving function in the transceiver unit 2310 may be considered as a receiving unit, and a component for implementing the sending function in the transceiver unit 2310 may be considered as a sending unit. In other words, the transceiver unit 2310 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 2310 is configured to perform a sending operation and a receiving operation of the terminal device in the foregoing method embodiments, and the processing unit 2320 is configured to perform an operation other than the receiving and sending operations on the terminal device in the foregoing method embodiments.

For example, in an implementation, the processing unit 2320 may be configured to perform all operations such as S101, S102, S203, S204, S207, S208, S303, S304, S307, S308, S402, and S403 other than sending and receiving operations performed by the terminal device in the embodiment shown in any one of FIG. 14 and FIG. 16 to FIG. 20, and/or configured to support another process of the technology described in the embodiments, for example, generate a message, information, and/or signaling to be sent by the transceiver unit 2310, and process a message, information, and/or signaling received by the transceiver unit 2310. The transceiver unit 2310 may be configured to perform all receiving and sending operations such as S104, S201, S202, S205, S206, S209, S301, S302, S305, S306, S309, S401, and S404 performed by the terminal device in the embodiment shown in any one of FIG. 14 and FIG. 16 to FIG. 20, and/or configured to support another process of the technology described in the embodiments.

For example, the processing unit 2320 may perform an action similar to that performed by the processing module 2110, or the processing unit 2320 includes the processing module 2110. The transceiver unit 2310 may perform an action similar to that performed by the transceiver module 2120, or the transceiver unit 2310 includes the transceiver module 2120.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 24:
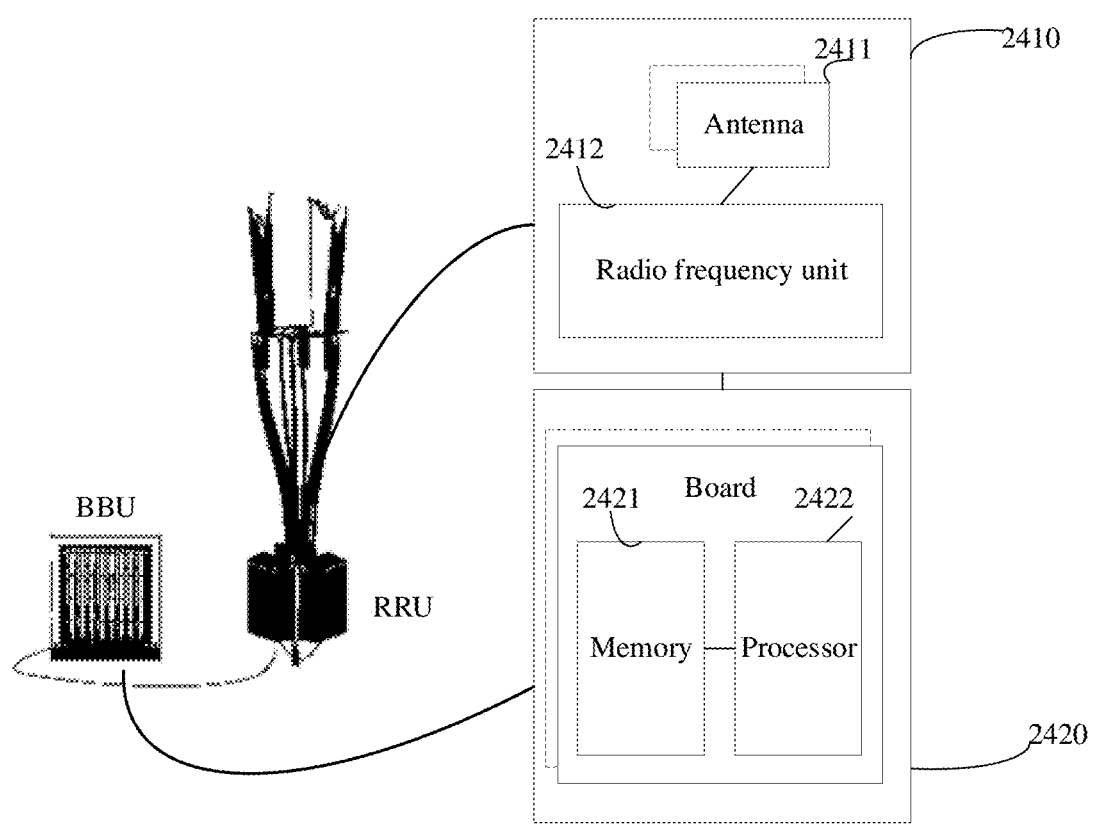
FIG. 24 is a schematic diagram of a structure of another communication apparatus according to an embodiment.

When the apparatus in this embodiment is a network device, the apparatus may be shown in FIG. 24. The apparatus may include one or more radio frequency units, such as a remote radio unit (RRU) 2410 and one or more baseband units (BBU) (which may also be referred to as a digital unit (DU)) 2420. The RRU 2410 may be referred to as a transceiver module. The transceiver module may include a sending module and a receiving module, or the transceiver module may be a module that can implement sending and receiving functions. The transceiver module may correspond to the transceiver module 2220 in FIG. 22, that is, the transceiver module may perform an action performed by the transceiver module 2220. Optionally, the transceiver module may also be referred to as a transceiver, a transceiver circuit, or the like, and may include at least one antenna 2411 and a radio frequency unit 2412. The RRU 2410 may be configured to: receive and send radio frequency signals and perform conversion between a radio frequency signal and a baseband signal. The BBU 2420 may be configured to perform baseband processing, control a base station, and the like. The RRU 2410 and the BBU 2420 may be physically disposed together, or may be physically separated, that is, in a distributed base station.

The BBU 2420 is a control center of the base station, may also be referred to as a processing module, may correspond to the processing module 2210 in FIG. 22, and may be configured to complete a baseband processing function, such as channel coding, multiplexing, modulation, and spectrum spreading. In addition, the processing module may perform an action performed by the processing module 2210. For example, the BBU (processing module) may be configured to control the base station to perform an operation procedure related to the network device in the foregoing method embodiments.

In an example, the BBU 2420 may include one or more boards, and a plurality of boards may jointly support a radio access network (for example, an LTE network) of a single access standard, or may separately support radio access networks (for example, an LTE network, a 5G network, or another network) of different access standards. The BBU 2420 further includes a memory 2421 and a processor 2422. The memory 2421 is configured to store necessary instructions and necessary data. The processor 2422 is configured to control the base station to perform a necessary action, for example, configured to control the base station to perform an operation procedure related to the network device in the foregoing method embodiments. The memory 2421 and the processor 2422 may serve one or more boards. In other words, a memory and a processor may be disposed on each board. Alternatively, a plurality of boards may share a same memory and a same processor. In addition, a necessary circuit may further be disposed on each board.

An embodiment may provide a communication system. The communication system may include the terminal device in the embodiments shown in FIG. 1 to FIG. 3, and include the network device in the embodiments shown in FIG. 1 to FIG. 3. Optionally, the terminal device and the network device in the communication system may perform the communication method shown in any one of FIG. 3 to FIG. 5.

An embodiment may further provide a non-transitory computer-readable storage medium. The non-transitory computer-readable storage medium stores a computer program. When the computer program is executed by a computer, the computer may implement a procedure related to the terminal device or the network device in any one of the foregoing method embodiments.

An embodiment may further provide a computer program product. The computer program product is configured to store a computer program. When the computer program is executed by a computer, the computer may implement a procedure related to the terminal device or the network device in any one of the foregoing method embodiments.

An embodiment may further provide a chip or a chip system. The chip may include a processor, and the processor may be configured to invoke a program or instructions in a memory, to perform a procedure related to the terminal device or the network device in any one of the foregoing method embodiments. The chip system may include the chip, and may further include another component such as a memory or a transceiver.

An embodiment may further provide a circuit. The circuit may be coupled to a memory, and may be configured to perform a procedure related to the terminal device or the network device in any one of the foregoing method embodiments. The chip system may include the chip, and may further include another component such as a memory or a transceiver.

It should be understood that the processor mentioned in the embodiments may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory mentioned in the embodiments may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of RAMs are available, such as a static random access memory (SRAM), a dynamic random access memory (DRAM), a synchronous dynamic random access memory (SDRAM), double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in the embodiments aims to include, but is not limited to, these memories and any memory of another proper type.

It should be understood that in the embodiments, sequence numbers of processes do not mean a sequence of execution. The sequence of execution of the processes should be determined according to functions and internal logic of the processes and should not constitute any limitation on an implementation process of the embodiments.

A person of ordinary skill in the art may be aware that, in combination with the examples described in the embodiments, modules and algorithm steps can be implemented by electronic hardware or a combination of computer software and electronic hardware. Whether the functions are implemented by hardware or software depends on applications. A person skilled in the art may use different methods to implement the described functions for each particular application, but it should not be considered that the implementation goes beyond the scope of the embodiments.

It may be understood by a person skilled in the art that, for convenience and brevity of description, for a working process of the foregoing described system, apparatus, and module, refer to a corresponding process in the foregoing method embodiments, and details are not described herein again.

In the several embodiments, it should be understood that the communication method and apparatus may be implemented in other manners. For example, the described apparatus embodiment is merely an example. For example, division into the modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The modules described as separate parts may or may not be physically separate, and parts displayed as modules may or may not be physical modules, may be located in one place, or may be distributed on a plurality of network units. Some or all of the units may be selected according to an actual requirement to achieve the objectives of the solutions in the embodiments.

In addition, function modules in the embodiments may be integrated into one processing module, or each module may exist alone physically, or two or more modules may be integrated into one module.

When the function is implemented in a form of a software function module and sold or used as an independent product, the function may be stored in a non-transitory computer-readable storage medium. Based on such an understanding, the embodiments essentially, or the part contributing to the conventional technology, or some of the solutions may be implemented in a form of a software product. The computer software product is stored in a non-transitory storage medium and includes several instructions for instructing a computer device (which may be a personal computer, a server, or a network device) to perform all or some of the steps of the methods described in the embodiments. The foregoing non-transitory computer-readable storage medium may be any usable medium that can be accessed by a computer. By way of example but not limitation, the non-transitory computer-readable medium may include a random access memory (RAM), a read-only memory (ROM), an electrically erasable programmable read-only memory (EEPROM), a compact disc read-only memory (CD-ROM), a universal serial bus flash disk, a removable hard disk or another compact disc storage, a magnetic disk storage medium or another magnetic storage device, or any other medium that can be used to carry or store expected program code in a form of instructions or a data structure and that can be accessed by a computer.

The foregoing descriptions are merely implementations. However, the scope of the embodiments is not limited thereto. Any change or replacement readily figured out by a person skilled in the art shall fall within the scope of the embodiments.

What is claimed is:

1. A communication method, applicable to a terminal device, the communication method comprising:
    obtaining first information;
    determining a target obtaining manner based on the first information, wherein the target obtaining manner is used to obtain multicast configuration information, the multicast configuration information is used to indicate the terminal device to receive a multicast service, and the first information comprises an identifier of the multicast service, probabilities corresponding to different obtaining manners, level information of the terminal device, indication information of the target obtaining manner, information used to indicate that data of the multicast service is to be sent, and signal quality information; and
    obtaining the multicast configuration information in the target obtaining manner, wherein
    the target obtaining manner comprises one of the following manners;
    a first manner in which the multicast configuration information is obtained by receiving unicast information;
    a second manner in which the multicast configuration information is obtained by receiving multicast information;
    a third manner in which the multicast configuration information is obtained by receiving broadcast information;
    a fourth manner in which the multicast configuration information is obtained in two sub-manners: receiving unicast information and receiving multicast information;
    a fifth manner in which the multicast configuration information is obtained in two sub-manners: receiving multicast information and receiving broadcast information;
    a sixth manner in which the multicast configuration information is obtained in two sub-manners: receiving unicast information and receiving broadcast information; or
    a seventh manner in which the multicast configuration information is obtained in three sub-manners: receiving unicast information, receiving multicast information, and receiving broadcast information.

2. The communication method according to claim 1, wherein the first information comprises the identifier and the level information, and determining the target obtaining manner based on the first information further comprises:
    determining that obtaining manners corresponding to the identifier comprise an eighth manner and a ninth manner, wherein the eighth manner and the ninth manner each are one of the first manner, the second manner, the third manner, the fourth manner, the fifth manner, the sixth manner, and the seventh manner, and the eighth manner is different from the ninth manner; and
    determining the target obtaining manner from the eighth manner and the ninth manner based on the level information.

3. The communication method according to claim 1, wherein the first information comprises the identifier, a probability of an eighth manner, and a probability of a ninth manner, and determining the target obtaining manner based on the first information further comprises:
    determining that obtaining manners corresponding to the identifier comprise the eighth manner and the ninth manner, wherein the eighth manner and the ninth manner each are one of the first manner, the second manner, the third manner, the fourth manner, the fifth manner, the sixth manner, and the seventh manner, and the eighth manner is different from the ninth manner; and determining the target obtaining manner from the eighth manner and the ninth manner based on the probability of the eighth manner and the probability of the ninth manner.

4. The communication method according to claim 1, wherein the first information comprises the identifier and the signal quality information, and determining the target obtaining manner based on the first information further comprises:
   determining that obtaining manners corresponding to the identifier comprise an eighth manner and a ninth manner, wherein the eighth manner and the ninth manner each are one of the first manner, the second manner, the third manner, the fourth manner, the fifth manner, the sixth manner, and the seventh manner, and the eighth manner is different from the ninth manner; and
   determining the target obtaining manner from the eighth manner and the ninth manner based on the signal quality information.

5. The communication method according to claim 1, wherein the first information comprises the identifier, and determining the target obtaining manner based on the first information further comprises:
   obtaining, based on a first correspondence, the target obtaining manner corresponding to the identifier, wherein the first correspondence comprises a correspondence between at least one multicast service identifier and at least one multicast configuration information obtaining manner, the identifier is in the at least one multicast service identifier, and the target obtaining manner is in the at least one multicast configuration information obtaining manner.

6. The communication method according to claim 5, further comprising:
   receiving the first correspondence and/or the identifier from a network device.

7. The communication method according to claim 6, wherein the first correspondence is carried in a system information block (SIB), a multicast control channel (MCCH), a physical downlink shared channel (PDSCH) for paging, or a non-access stratum (NAS) message.

8. The communication method according claim 1, further comprising:
   receiving third information from the network device, wherein the third information indicates the indication information.

9. The communication method according to claim 8, wherein the third information further comprises the identifier.

10. The communication method according to claim 8, wherein the third information is carried in first downlink control information from the network device, and the first downlink control information is used to schedule a paging message; or
   the third information is carried in a paging message from the network device.

11. A communication apparatus, comprising:
   a memory, configured to store instructions; and
   a processor, configured to invoke the instructions from the memory and run the instructions, so that the communication apparatus performs the communication method according to claim 1.

12. A communication method applicable to a network device, the communication method comprising:
   obtaining first information;
   determining a target sending manner based on the first information; and
   sending multicast configuration information in the target sending manner, wherein the multicast configuration information is used to indicate a terminal device to receive a multicast service, and the first information comprises an identifier of the multicast service, level information of the terminal device, indication information of the target sending manner, information used to indicate that data of the multicast service is to be sent, and signal quality information, wherein
   the target sending manner comprises at least one of the following manners:
   a first manner in which the multicast configuration information is sent by using unicast information;
   a second manner in which the multicast configuration information is sent by using multicast information;
   a third manner in which the multicast configuration information is sent by using broadcast information;
   a fourth manner in which the multicast configuration information is sent in two sub-manners: using unicast information and using multicast information;
   a fifth manner in which the multicast configuration information is sent in two sub-manners: using multicast information and using broadcast information;
   a sixth manner in which the multicast configuration information is sent in two sub-manners: using unicast information and using broadcast information; or
   a seventh manner in which the multicast configuration information is sent in three sub-manners: using unicast information, using multicast information, and using broadcast information.

13. The method according to claim 12, wherein the first information comprises the identifier and the level information, and determining the target sending manner based on the first information further comprises:
   determining that sending manners corresponding to the identifier comprise an eighth manner and a ninth manner, wherein the eighth manner and the ninth manner each are one of the first manner, the second manner, the third manner, the fourth manner, the fifth manner, the sixth manner, and the seventh manner, and the eighth manner is different from the ninth manner; and
   determining the target sending manner from the eighth manner and the ninth manner based on the level information.

14. The communication method according to claim 12, wherein the first information comprises the identifier and the signal quality information, and determining the target sending manner based on the first information further comprises:
   determining that sending manners corresponding to the identifier comprise an eighth manner and a ninth manner, wherein the eighth manner and the ninth manner each are one of the first manner, the second manner, the third manner, the fourth manner, the fifth manner, the sixth manner, and the seventh manner, and the eighth manner is different from the ninth manner; and
   determining the target sending manner from the eighth manner and the ninth manner based on the signal quality information.

15. The communication method according to claim 12, wherein the first information comprises the identifier, and determining the target sending manner based on the first information further comprises:
   obtaining, based on a first correspondence, the target sending manner corresponding to the identifier, wherein the first correspondence comprises a correspondence between at least one multicast service identifier and at least one multicast configuration information sending manner, the identifier is in the at least one multicast service identifier, and the target sending manner is in the at least one multicast configuration information sending manner.

16. The communication method according to claim 15, further comprising:
   sending the first correspondence and/or the identifier.

17. The communication method according to claim 16, wherein the first correspondence is carried in a SIB, an MCCH, a PDSCH for paging, or a NAS message.

18. The communication method according to claim 12, further comprising:
   sending third information, wherein the third information comprises the indication information.

19. The communication method according to claim 18, wherein the third information further comprises the identifier.

20. The communication method according to claim 18, wherein the third information is carried in first downlink control information, and the first downlink control information is used to schedule a paging message; or
   the third information is carried in a paging message.

* * * * *